US009921382B2

(12) United States Patent
Claessens et al.

(10) Patent No.: US 9,921,382 B2
(45) Date of Patent: Mar. 20, 2018

(54) TELECOMMUNICATIONS ENCLOSURE WITH DUAL EXTENDING CABLE PORT WALLS

(71) Applicant: CommScope Connectivity Belgium BVBA, Kessel-Lo (BE)

(72) Inventors: Bart Mattie Claessens, Hasselt (BE); Dirk Kempeneers, Aarschot (BE); Wouter Jan Renild Foulon, Leuven (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 0 days.

(21) Appl. No.: 15/180,731

(22) Filed: Jun. 13, 2016

(65) Prior Publication Data
US 2017/0052338 A1  Feb. 23, 2017

Related U.S. Application Data

(63) Continuation of application No. 14/232,461, filed as application No. PCT/EP2012/063328 on Jul. 6, 2012, now Pat. No. 9,366,837.
(Continued)

(51) Int. Cl.
*G02B 6/44* (2006.01)
*H02G 15/013* (2006.01)
(Continued)

(52) U.S. Cl.
CPC ......... *G02B 6/4447* (2013.01); *G02B 6/3897* (2013.01); *G02B 6/4446* (2013.01);
(Continued)

(58) Field of Classification Search
CPC .. H02G 15/013; H02G 15/113; H02G 15/117; G02B 6/4446; G02B 6/4447;
(Continued)

(56) References Cited

U.S. PATENT DOCUMENTS 6,232,553 B1 *  5/2001  Regen ............... H02G 3/083
                                                  174/350
6,362,427 B1 *  3/2002  Daoud ............... H02G 3/085
                                                  174/152 G
(Continued)

FOREIGN PATENT DOCUMENTS

EP     2 533 085 A1    12/2012
EP     2 533 086 A1    12/2012
(Continued)

OTHER PUBLICATIONS

International Search Report for International Application No. PCT/EP2012/063328 dated Apr. 25, 2014 (5 pages).
(Continued)

*Primary Examiner* — Akm Enayet Ullah
(74) *Attorney, Agent, or Firm* — Merchant & Gould P.C.

(57) ABSTRACT

Example telecommunications apparatus (100) include an enclosure (103) having an enclosure base (101) and a enclosure cover (102) that join together at a sealed interface. The enclosure cover (102) is latchable to the enclosure base (101). A splice tray assembly (106) is disposed within the interior (104) of the enclosure (103). The splice tray assembly (106) includes splice trays (150) mounted to a manager insert. A splitter (192) may be provided on the manager insert. The manager insert also may include a groove plate (160) latched to abase plate (180). One or more port assemblies (107-109) enable cables to enter and/or exit the enclosure (103) through sealed cable ports (145-147). The port assemblies (107-109) may provide anchors (214, 234) for cable strength members and/or organizers (243, 244, 253, 254) for fiber tubes.

22 Claims, 42 Drawing Sheets

Related U.S. Application Data

(60) Provisional application No. 61/506,378, filed on Jul. 11, 2011.

(51) Int. Cl.
  *H02G 15/113* (2006.01)
  *H02G 15/117* (2006.01)
  *G02B 6/38* (2006.01)

(52) U.S. Cl.
  CPC ......... *G02B 6/4454* (2013.01); *G02B 6/4457* (2013.01); *G02B 6/4478* (2013.01); *H02G 15/013* (2013.01); *H02G 15/113* (2013.01); *H02G 15/117* (2013.01)

(58) Field of Classification Search
  CPC .. G02B 6/4454; G02B 6/3897; G02B 6/4457; G02B 6/4478
  USPC .......................................... 385/136–139, 147
  See application file for complete search history.

(56) References Cited

U.S. PATENT DOCUMENTS

| | | | |
|---|---|---|---|
| 6,797,878 B1 | 9/2004 | Radelet | |
| 7,400,814 B1* | 7/2008 | Hendrickson | G02B 6/4441 385/134 |
| 7,496,268 B2* | 2/2009 | Escoto | G02B 6/4441 385/134 |
| 7,653,282 B2* | 1/2010 | Blackwell, Jr. | G02B 6/4451 385/134 |
| 8,005,333 B2 | 8/2011 | Mullaney et al. | |
| 8,213,760 B2* | 7/2012 | Rudenick | G02B 6/4455 385/134 |
| 8,648,258 B2* | 2/2014 | Drouard | G02B 6/3827 174/152 G |
| 8,917,966 B2* | 12/2014 | Thompson | G02B 6/4446 385/136 |
| 2009/0290844 A1 | 11/2009 | Mullaney et al. | |
| 2010/0189404 A1* | 7/2010 | Rudenick | G02B 6/4455 385/135 |
| 2011/0164854 A1* | 7/2011 | Desard | G02B 6/4455 385/135 |
| 2015/0137461 A1* | 5/2015 | Coenegracht | G02B 6/4444 277/618 |

FOREIGN PATENT DOCUMENTS

| | | |
|---|---|---|
| EP | 2 533 087 A1 | 12/2012 |
| EP | 2 533 385 A1 | 12/2012 |
| WO | 2010/047920 A2 | 4/2010 |

OTHER PUBLICATIONS

International Written Opinion for International Application No. PCT/EP2012/063328 dated Apr. 25, 2014 (11 pages).

\* cited by examiner

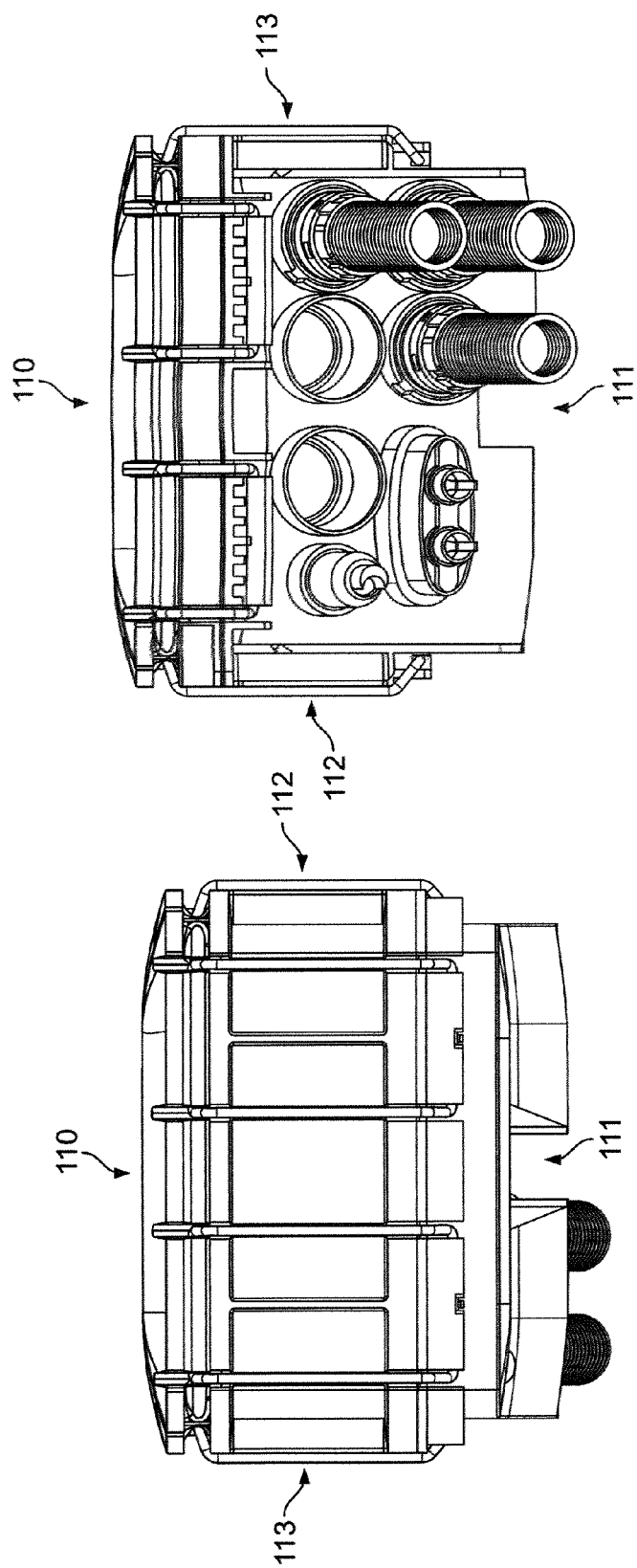

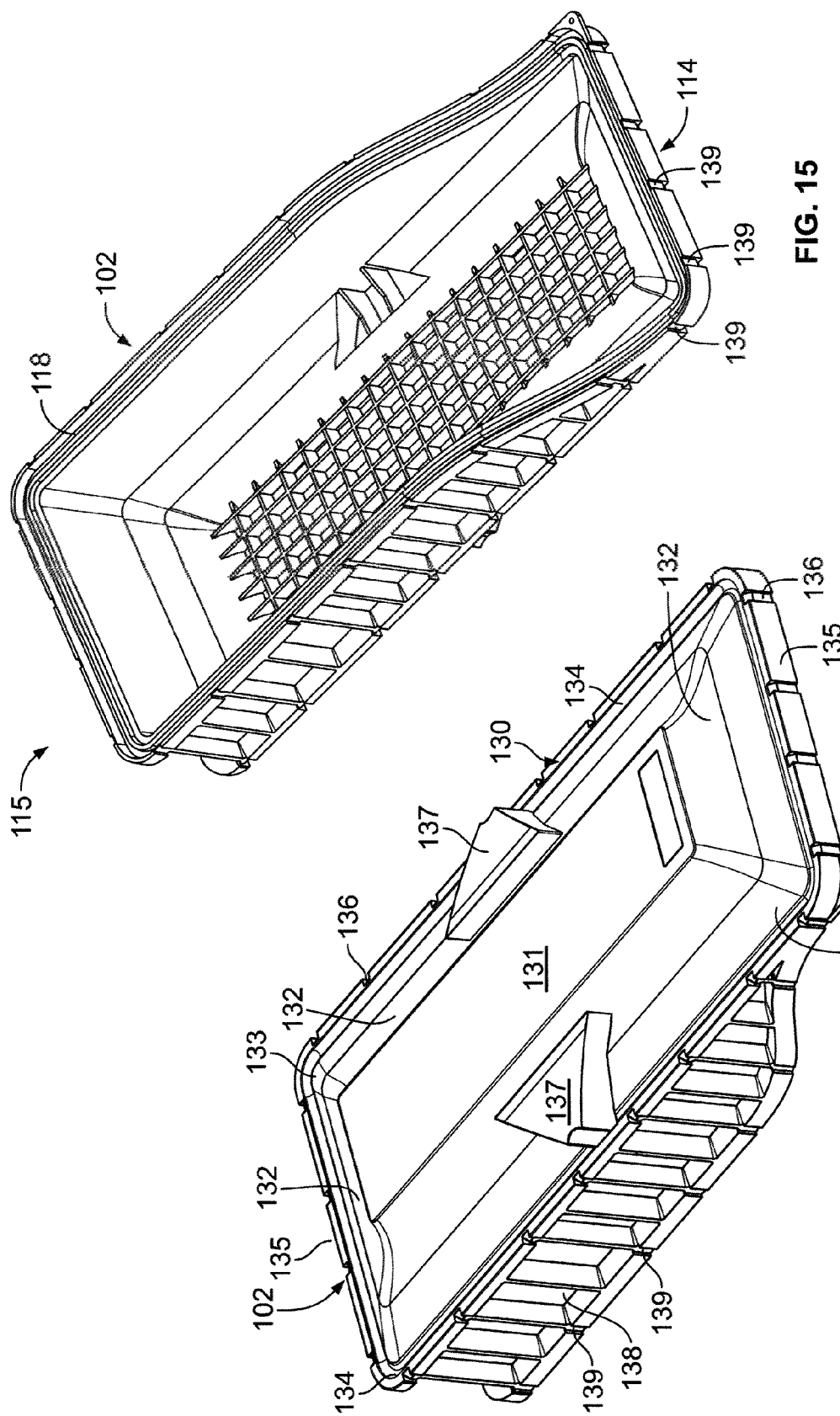

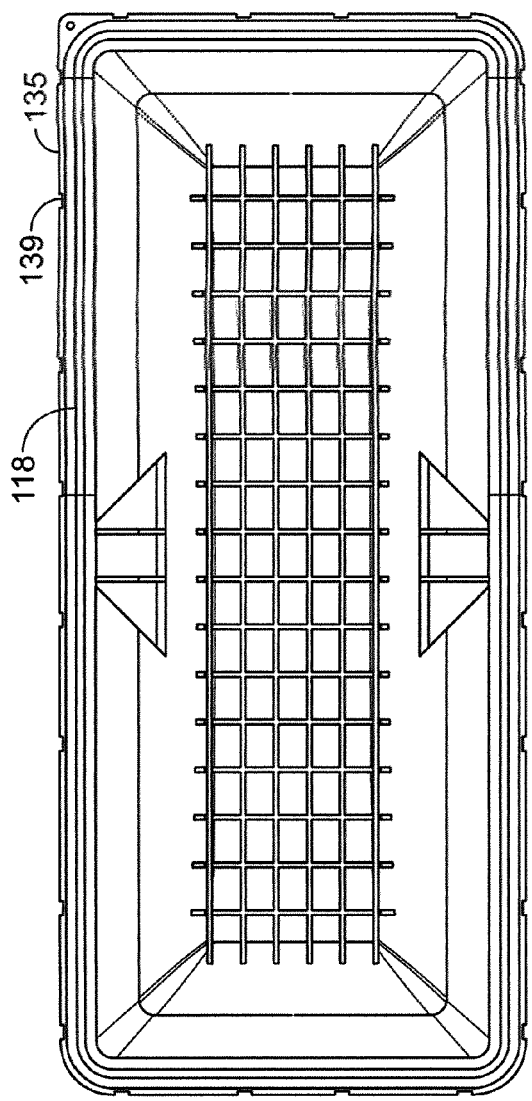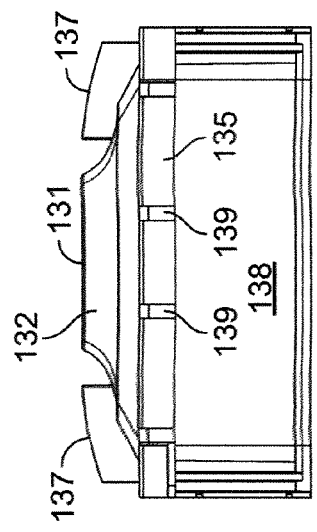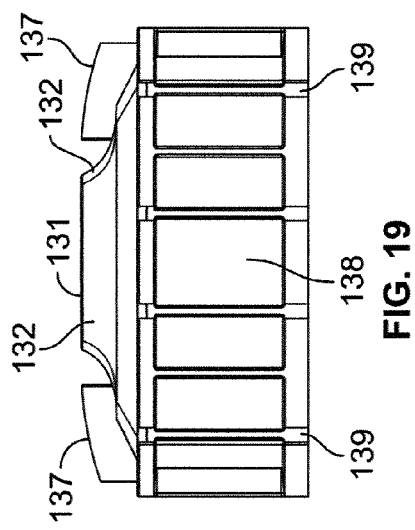

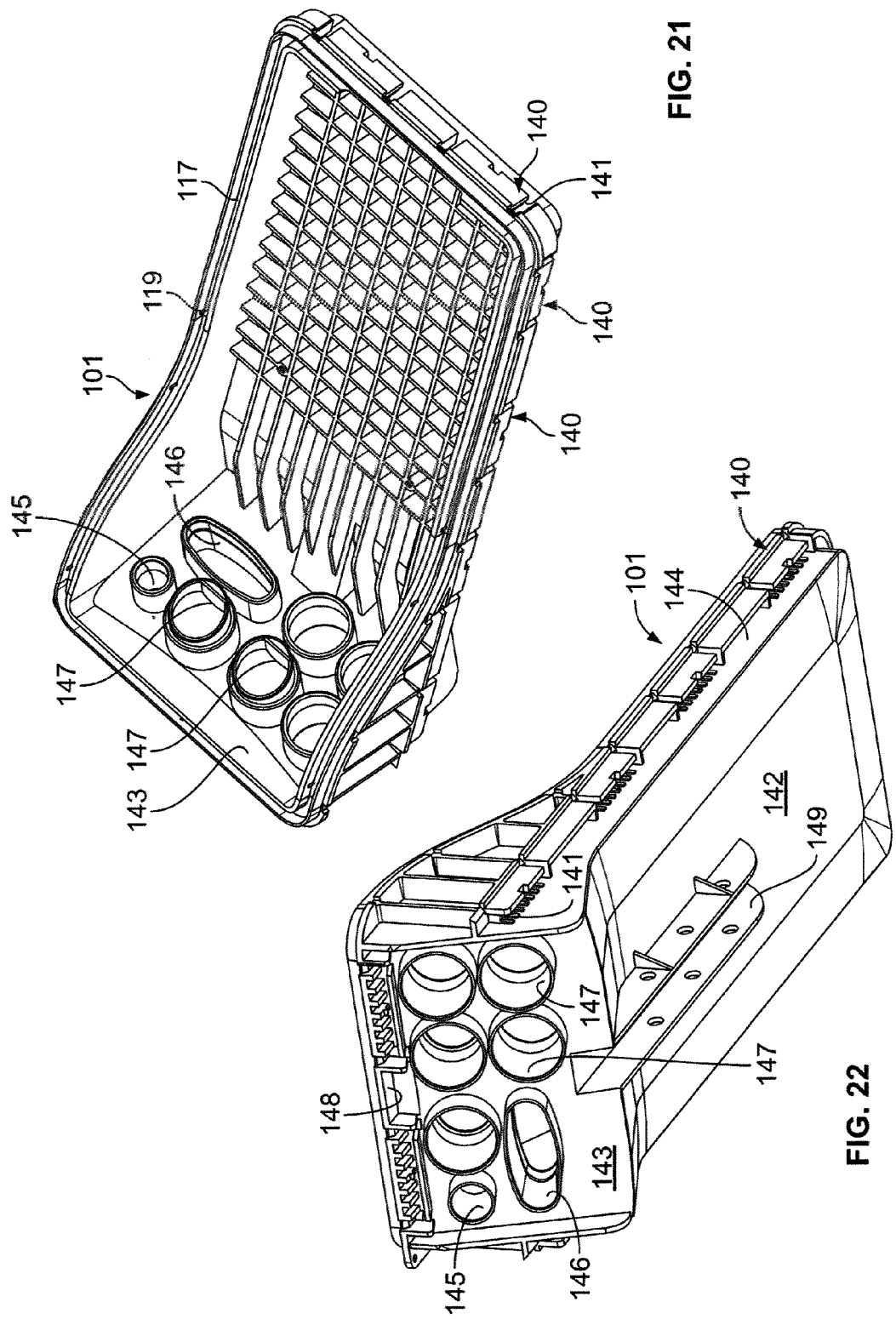

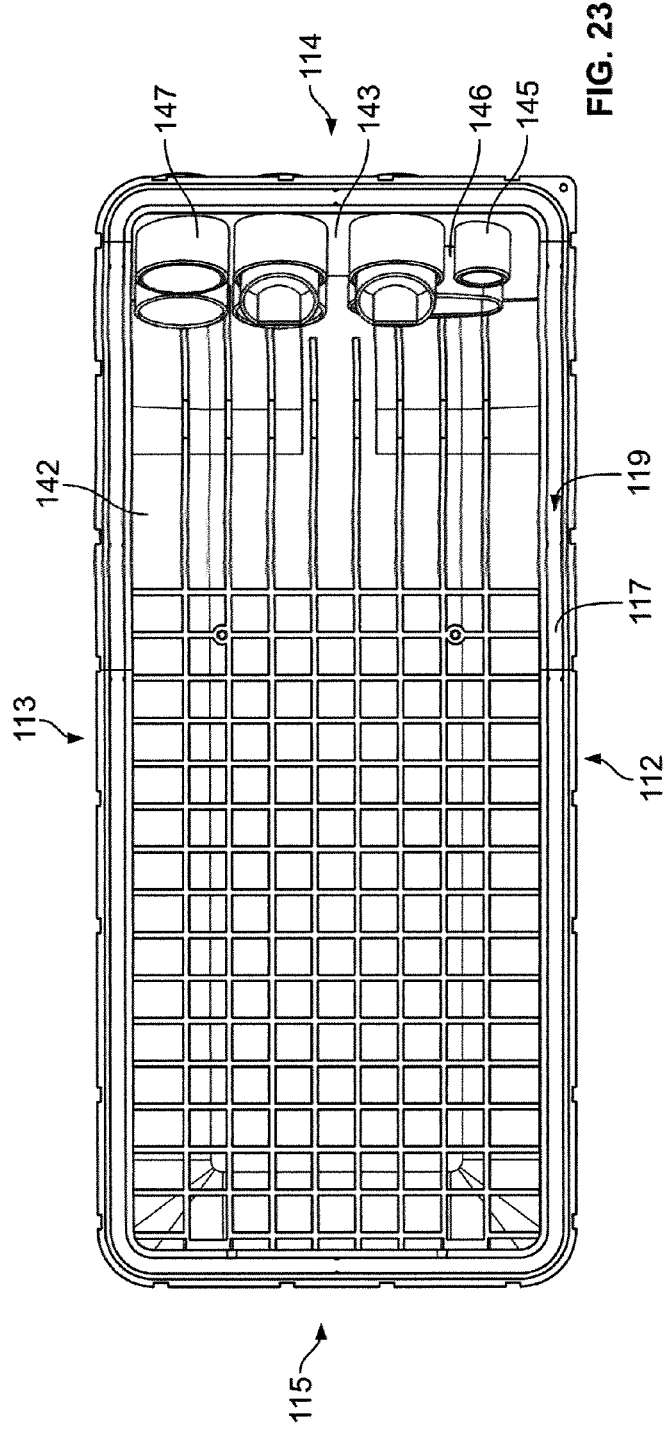
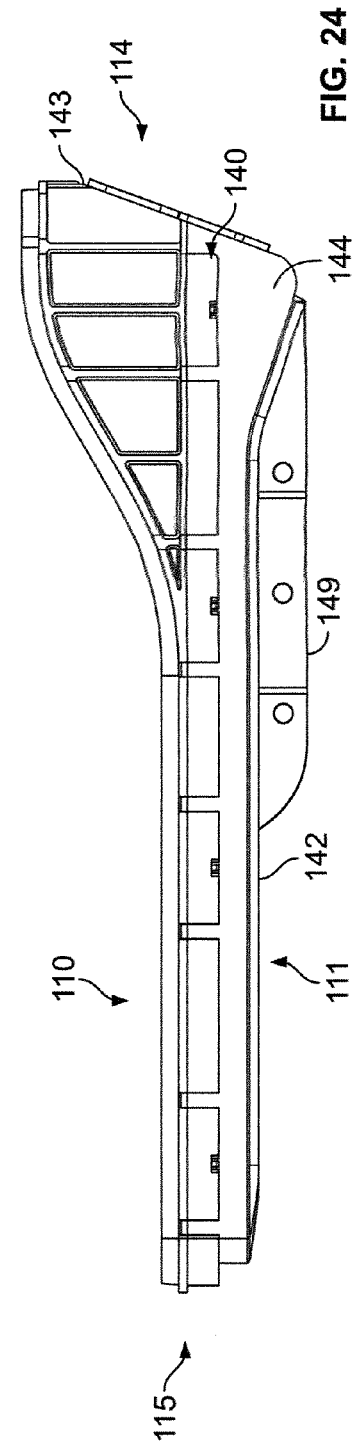

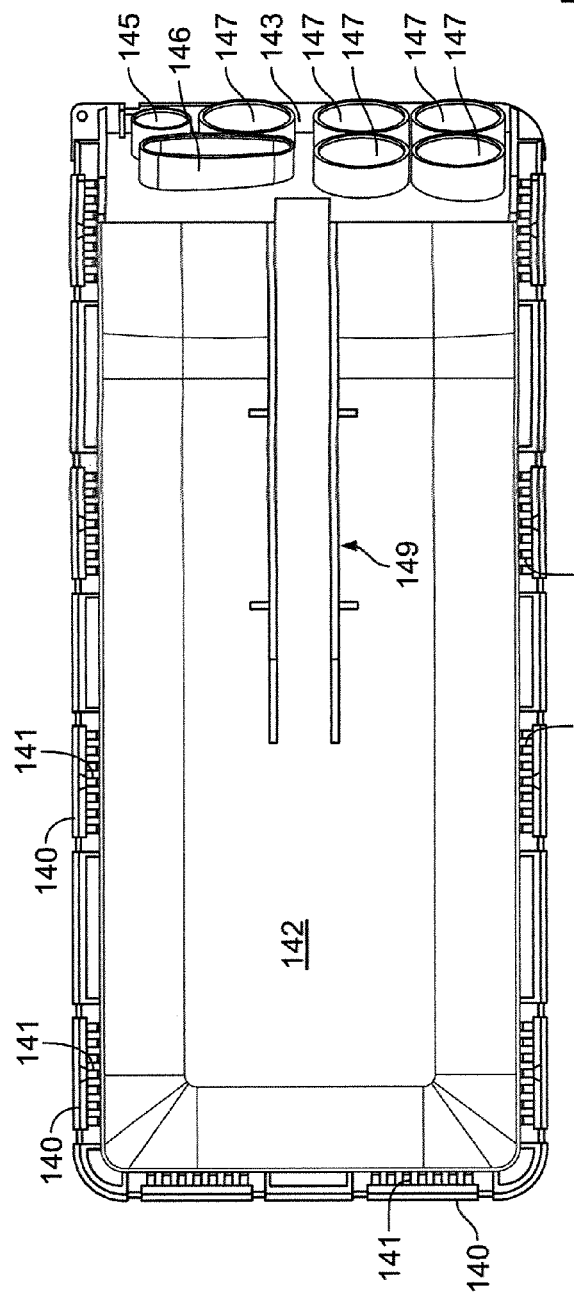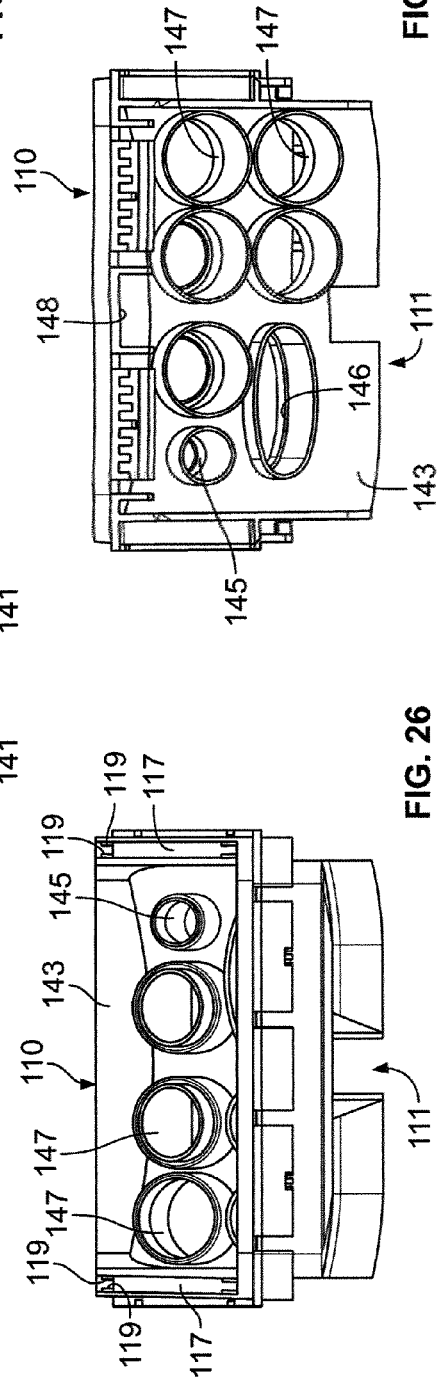

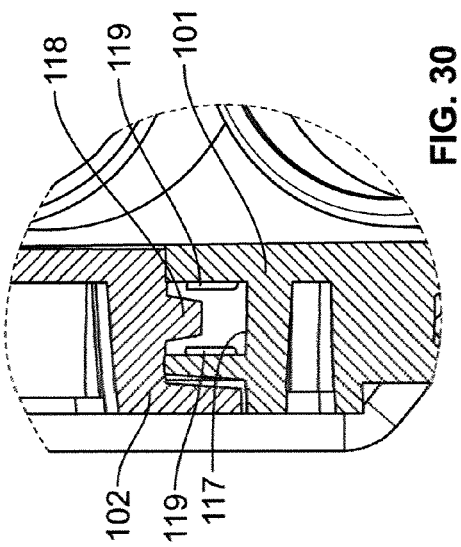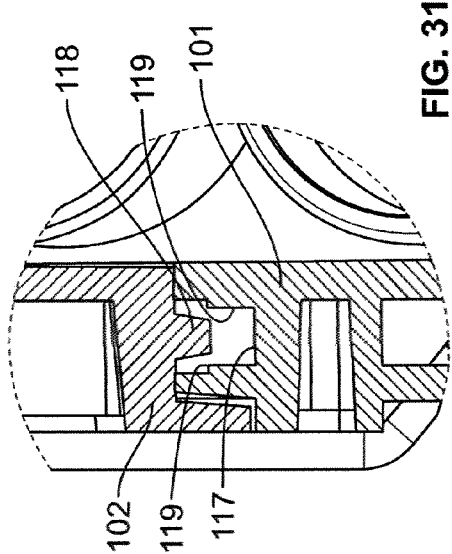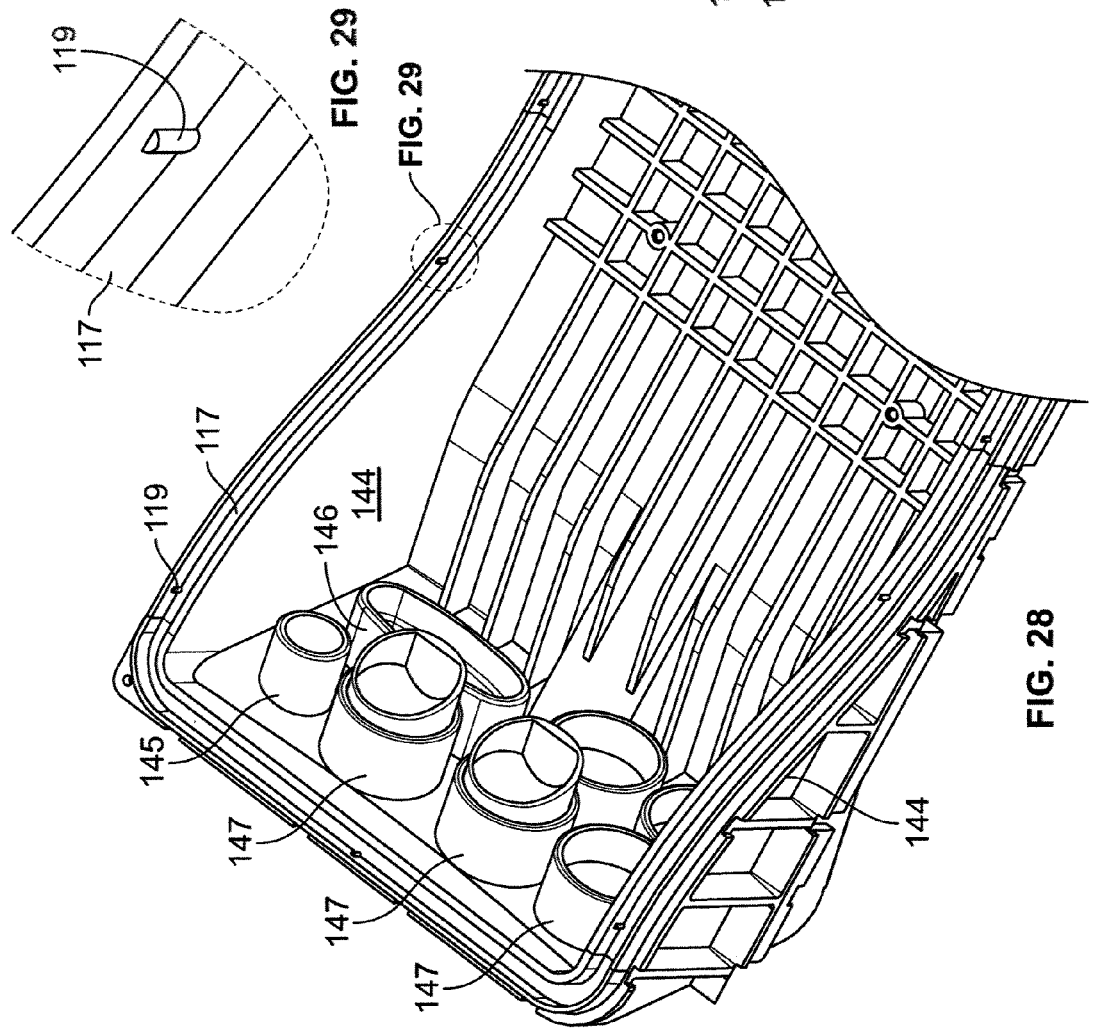

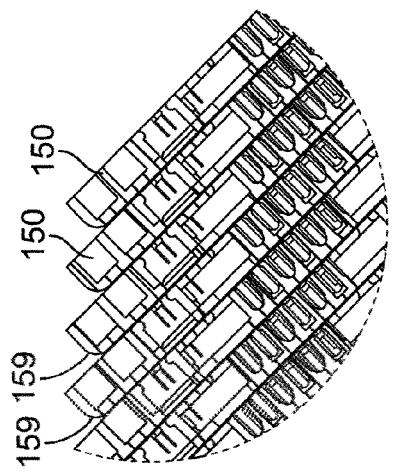
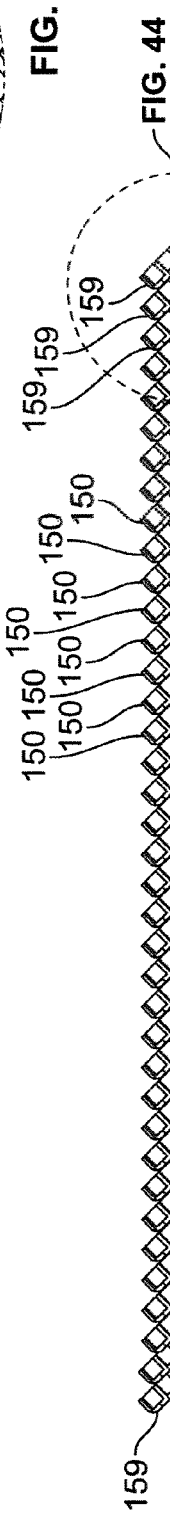
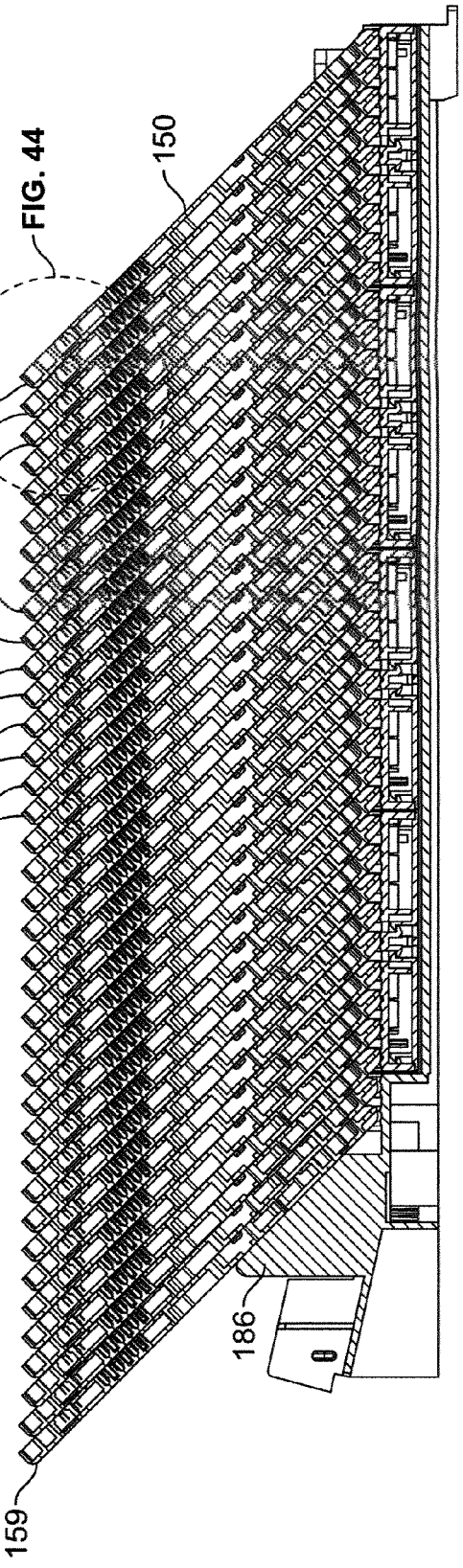
FIG. 44
FIG. 43

TELECOMMUNICATIONS ENCLOSURE WITH DUAL EXTENDING CABLE PORT WALLS

CROSS-REFERENCE TO RELATED APPLICATION

This application is a Continuation of U.S. application Ser. No. 14/232,461, filed 23 Apr. 2014, now U.S. Pat. No. 9,366,837, which is a National Stage of PCT/EP2012/063328, filed 6 Jul. 2012, which claims benefit of U.S. Provisional Application Ser. No. 61/506,378, filed on 11 Jul. 2011, and which applications are incorporated herein by reference. To the extent appropriate, a claim of priority is made to each of the above disclosed applications.

TECHNICAL FIELD

The present disclosure relates to telecommunications enclosures, and more particularly, to telecommunications enclosures including splice tray assemblies for fiber optic cables.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

SUMMARY

Aspects of the disclosure are directed to telecommunications apparatus including an enclosure having an enclosure base and an enclosure cover that join together at a sealed interface that extends about a perimeter of the enclosure. The enclosure has a first end positioned opposite from a second end and has a top side defined by the enclosure cover and a bottom side defined by the enclosure base. The enclosure has side walls that have lengths that extend from the first end to the second end and that have overall side wall heights that extends from the bottom side to the top side of the enclosure. The enclosure cover includes first side wall portions that cooperate with second side wall portions of the enclosure base to define the side walls. The first side wall portions define a majority of the overall side wall heights adjacent the first end of the enclosure and the second side wall portions define a majority of the side wall heights adjacent the second end of the enclosure.

Aspects of the disclosure also are directed to a seal interface between first and second enclosure pieces of an enclosure. The seal interface extends about a perimeter of the enclosure and includes first and second portions that are offset from one another so as to not be positioned along a common plane. In some implementations, the first portion is positioned along a first plane and the second portion is positioned along a second plane that is parallel to and offset from the first plane. In certain implementations, the seal interface includes a third portion that gradually transitions between the first and second planes.

Aspects of the disclosure also are directed to a telecommunications apparatus including an enclosure having an enclosure base and an enclosure cover that join together at a sealed interface that extends about a perimeter of the enclosure. The enclosure has a first end positioned opposite from a second end and has a top side defined by the enclosure cover and a bottom side defined by the enclosure base. The enclosure including a plurality of latches for securing the enclosure base and the enclosure cover together and for compressing the sealed interface. The latches are moveable between latched and unlatched positions. The latches include a plurality of latch lever handles that overhand the top side when the latches are in the latched position. In some implementations, the latches include wire clips that are pivotally connected to the latch lever handles and to the enclosure base. In certain implementations, the latch lever handles are trapezoidal in shape.

Aspects of the disclosure also are directed to a telecommunications apparatus including an enclosure defined at least in part by a first housing piece and a second housing piece. Fiber management trays are pivotally mounted within the enclosure. A resilient member is mounted to the first housing piece. The resilient member presses against the fiber management trays when the first and second housing pieces are secured together so as to resist pivotal movement of the fiber management trays when the enclosure is closed.

Aspects of the disclosure also are directed to a fiber management tray including a tray body defining a first optical fiber entrance/exit location and a second optical fiber entrance/exit location. The tray body also defines a plurality of fiber storage loop paths and a splice holder location. The tray body further includes a crossing location on a top side of the tray body for crossing a fiber receiving tube routed onto the tray body through the first optical fiber entrance/exit location and an optical fiber routed onto the tray body through the second optical fiber entrance/exit location. The crossing location includes a first surface for supporting the fiber receiving tube and a second surface for supporting the optical fiber, the second surface being recessed relative to the first surface.

Aspects of the disclosure also are directed to a fiber management device including a base having a front side and a back side; a plurality of fiber management trays pivotally mounted at the front side of the base; and an optical splitter mounted at the back side of the base. The optical splitter has first and second sets of output fibers that are looped about 180 degrees in opposite directions about a bend radius limiter before being passed through though-holes of the base to the fiber management trays at the front side of the base.

Aspects of the disclosure also are directed to a latch for an enclosure that includes a trapezoidal latch lever handle and a clip pivotally connected to a major side of the latch lever handle.

Aspects of the disclosure also are directed to a telecommunications apparatus including an enclosure defining a plurality of cable ports bounded by cable port walls, wherein a first portion of each cable port wall is disposed inside the enclosure and a second portion of each cable port wall is disposed outside of the enclosure.

Aspects of the disclosure also are directed to a fiber optic enclosure defining a cable port having an elongate transverse cross-sectional shape.

Aspects of the disclosure also are directed to an insert for insertion in a cable port of a fiber optic enclosure. The insert defines a central axis and a single cable receiving opening that has a center that is offset from the central axis.

Aspects of the disclosure also are directed to an insert adapted for insertion in a cable port. The insert includes a cable through-opening for receiving a telecommunications cable; a post about which a strength member of the cable can be wrapped; and a structure that can be cut by the strength member to form a retention slit.

Aspects of the disclosure also are directed to an insert adapted for insertion in a cable port. The insert includes a cable through-opening for receiving a telecommunications cable; a post about which a strength member of the cable can be wrapped; and a structure defining a retention slit for receiving the strength member.

Aspects of the disclosure also are directed to a tube manager including a ring, a cross-section spaced from the ring, and a plurality of arms connecting the ring and the cross-section. The cross-section defines apertures sized to receive loose fiber tubes. The arms extend from the ring to the cross-section without extending beyond either the ring or the cross-section.

Aspects of the disclosure also are directed to an insert adapted for insertion in a cable port. The insert includes a corrugated conduit for receiving a plurality of fiber tubes; a body; a first manager coupled to the body, and a second manager configured to couple together the body and the corrugated conduit. The first manager defines apertures through which the fiber tubes can be routed out of the insert. The second manager includes a cross-section defining apertures through which the fiber tubes can be routed. The second manager also includes inwardly extending feet having detents that fit within slots defined in the corrugated conduit.

BRIEF DESCRIPTION OF THE DRAWINGS

FIGS. 2-9 show various views of the enclosure assembly of FIG. 1 with the cover latched to the base in accordance with aspects of the disclosure;

FIGS. 14-20 show various views of the cover of the enclosure in accordance with aspects of the disclosure;

FIGS. 21-27 show various views of the base of the enclosure in accordance with aspects of the disclosure;

FIG. 28 is a partial view of the enclosure showing the cable port end;

FIG. 29 is an enlarged view of a portion of FIG. 28;

FIG. 30 is an enlarged cross-sectional view of a portion of the enclosure of FIGS. 2-9 in which a tongue of the cover extends into a gasket channel of the base at a location spaced from a retaining tab;

FIG. 31 is an enlarged cross-sectional view of a portion of the enclosure of FIGS. 2-9 in which a tongue of the cover extends into a gasket channel of the base at the retaining tab;

FIG. 43 is a side elevational view of the splice tray assembly of FIG. 40;

FIG. 44 is an enlarged view of a portion of FIG. 43 showing rounded edges of the splice trays in accordance with aspects of the disclosure;

DETAILED DESCRIPTION

Figure 1:
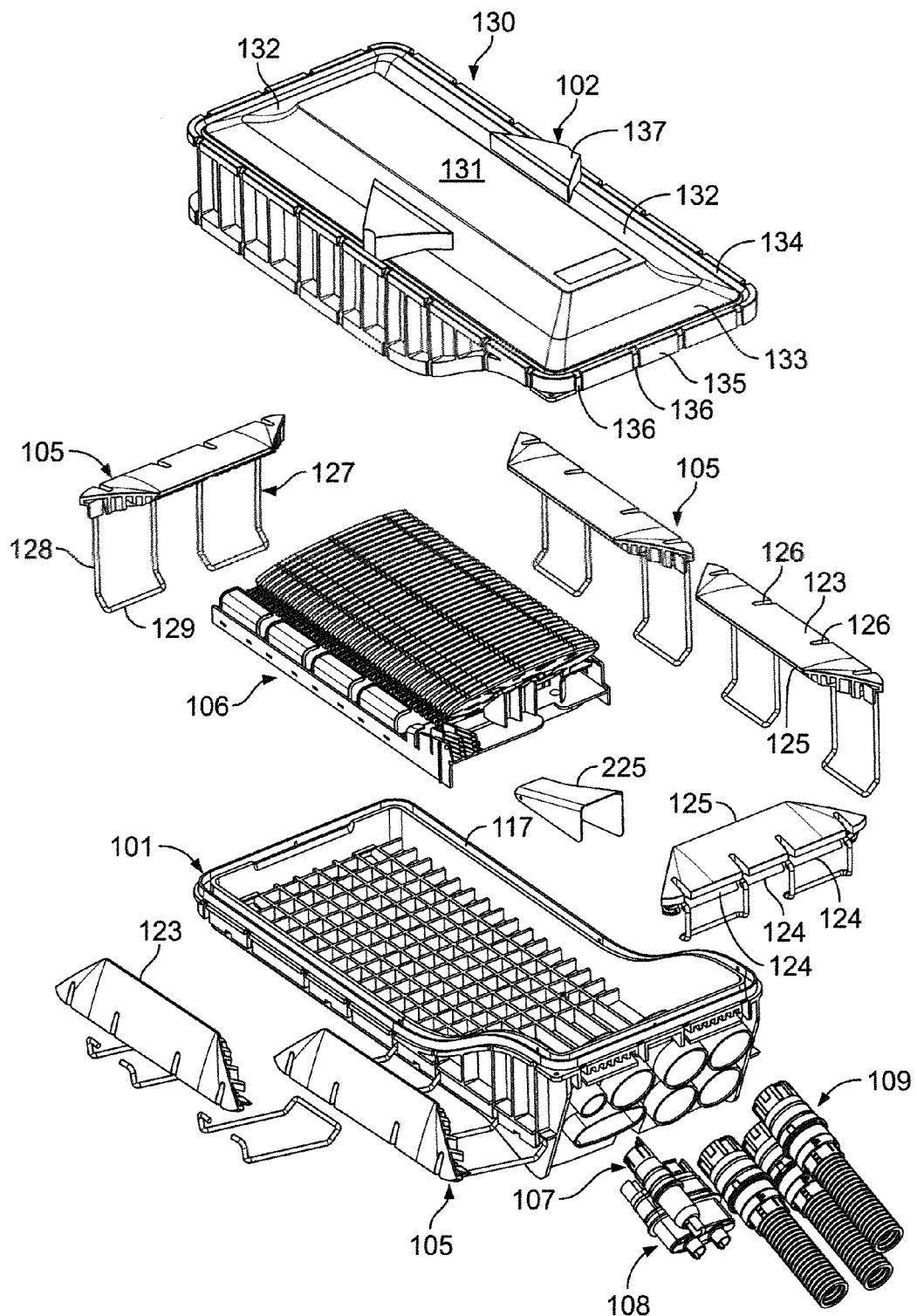
FIG. 1 is an exploded view of an example splice enclosure assembly including a base, a cover, a splice tray assembly that fits between the base and cover, and three types of port assemblies in accordance with aspects of the disclosure.

FIG. 1 is an exploded view of a splice enclosure assembly 100 including a base 101 and a cover 102 that cooperate to form an enclosure 103 that defines an interior 104. Latch arrangements 105 releasably secure the cover 102 in a closed position relative to the base 101. The latch arrangements 105 may be released to enable the cover 102 to be removed from the base 101. A splice tray assembly 106 is mounted within the interior 104 of the enclosure 103. Various cable port assemblies 107, 108, 109 are disposed in cable ports defined by the enclosure 103 to enable optical fiber cables to be routed into and out of the enclosure 103.

In particular, a first input cable port assembly 107, a second input cable port assembly 108, and a plurality of output cable port assemblies 109 are disposed at the enclosure 103. In the example shown, the enclosure 103 includes one first input cable port assembly 107, one second input cable port assembly 108, and five output cable port assemblies 109. In some implementations, the enclosure 103 may include multiple first cable port assemblies 107 and/or multiple second input cable port assemblies 108. In still other implementations, the enclosure 103 may include greater or fewer output cable port assembly 109.

As used herein, the terms "input" and "output" are used for convenience and are not intended to be exclusory. Optical signals carried over optical fibers may travel in either or both directions. Accordingly, optical fibers routed through either of the input cable port assemblies 107, 108 may carry input and/or output signals. Likewise, the optical fibers routed through the output cable port assemblies 109 may carry input and/or output signals.

The optical fibers routed into the enclosure 103 through the input cable port assemblies 107, 108 are optically coupled to the optical fibers routed into the enclosure 103 through the output cable port assemblies 109. For example, the optical fibers may be coupled together at the splice tray assembly 106 as will be disclosed in more detail herein. In certain implementations, one or more of the optical fibers also may be routed to a splitter (see FIG. 38) as will be disclosed in more detail herein. Fibers output from the splitter may be routed to the splice tray assembly 106.

As shown in FIGS. 2-9, the enclosure 103 has atop 110, a bottom 111, a first side 112, a second side 113, a first end 114, and a second end 115. The cable port assemblies 107-109 are disposed in cable ports at the first end 114 of the enclosure 103. The second end 115 of the enclosure 103 is generally solid (i.e., does not define cable ports). The base 101 forms the bottom 111 of the enclosure 103 and the cover 102 forms the top 110 of the enclosure 103. The base 101 forms the majority of the first end 114 of the enclosure 103 and the cover 102 forms the majority of the second end 115 of the enclosure 103. The base 101 and cover 102 cooperate to forms the sides 112, 113 of the enclosure 103.

The base 101 includes a bottom surface 142, a rear wall 143, and sidewalls 144 extending upwardly from the bottom surface 142 and forwardly of the rear wall 143 to a front wall. The sides 112, 113 of the base 101 (i.e., the sidewalls 144) are taller towards the first end 114 and shorter towards the second end 115 of the enclosure 103. The taller sides and first end 114 of the base 101 provide protection for the cable port assemblies 109 when the cover 102 is removed from the base 101. The shorter sides and second end 115 of the base 101 facilitate access to the splice tray assembly 106 when the cover 102 is removed from the base 101. In certain implementations, the side walls of the base 101 remain short along a majority of the length of the splice tray assembly 106. In one implementation, the side walls of the base 101 remain short along the length of the splice tray assembly 106.

Figure 32:
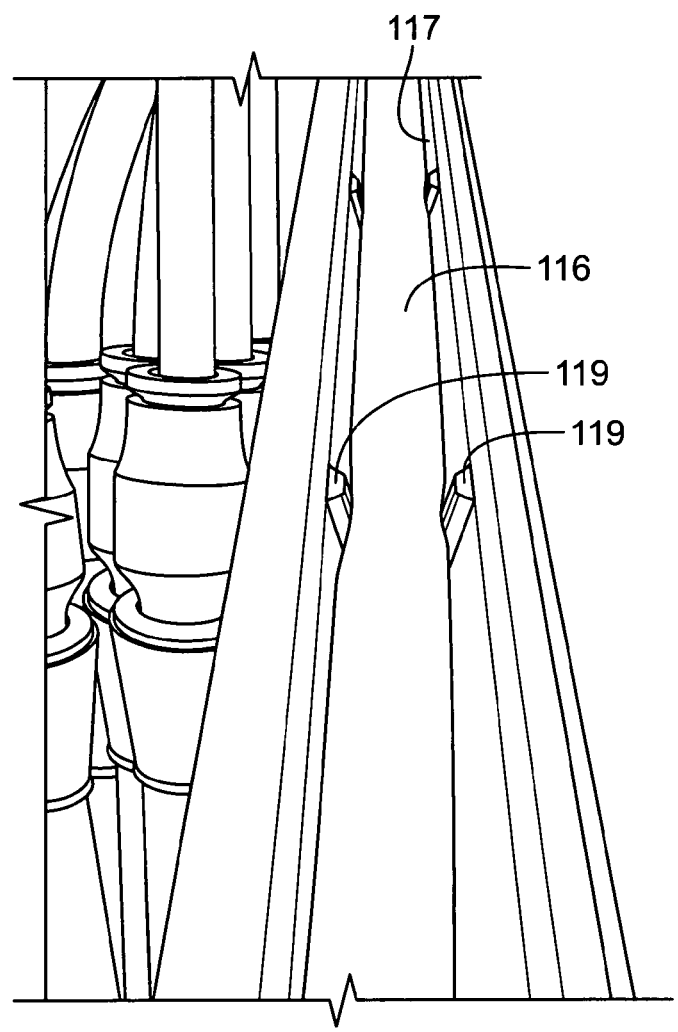
FIG. 32 is an enlarged view of a portion of the enclosure base with a gasket disposed in a gasket channel.
Figure 33:
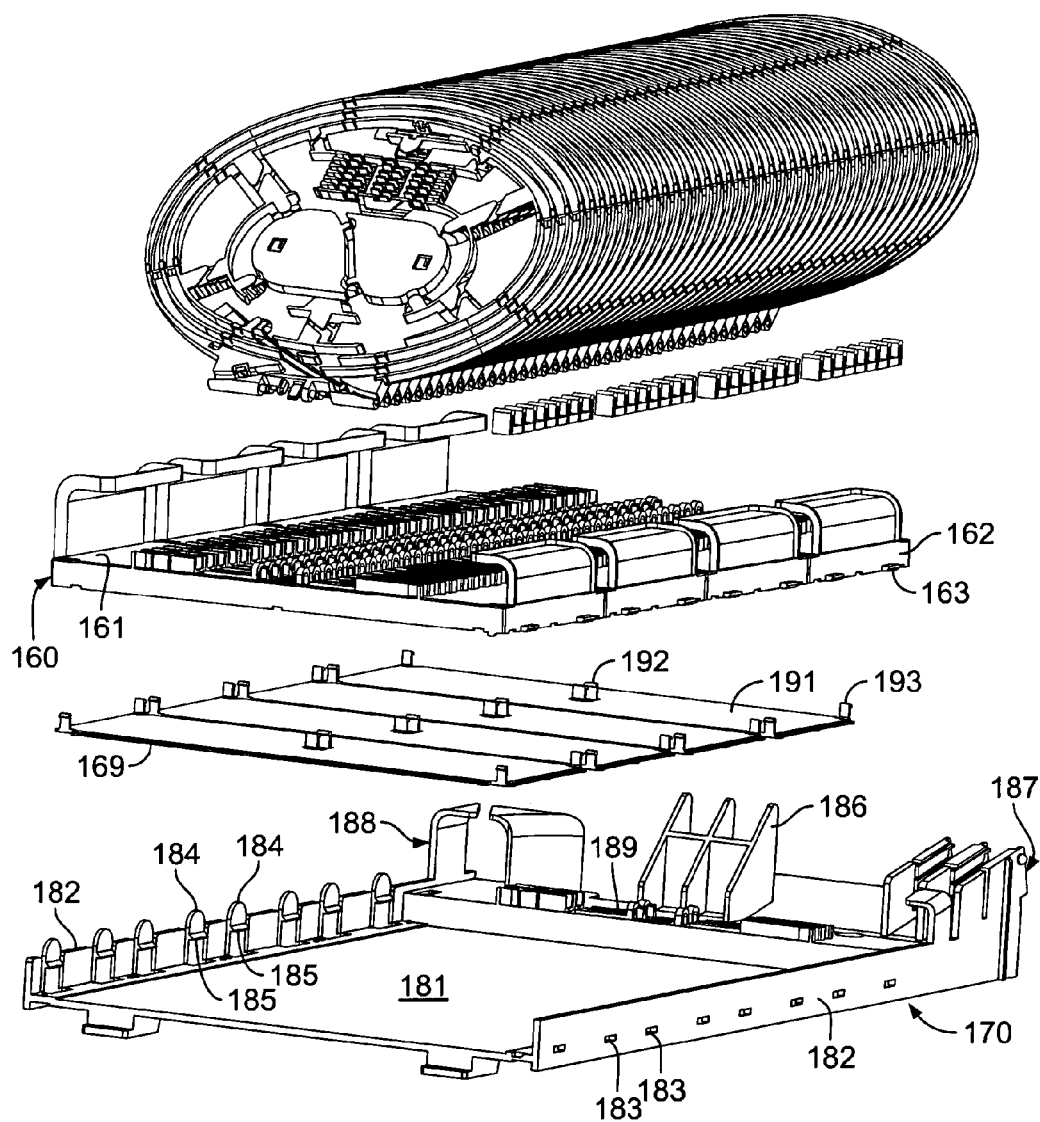
FIG. 33 is an exploded view of an example splice tray assembly suitable to be disposed within the enclosure of FIGS. 2-9.

A gasket or sealing ring 116 (FIG. 32) is disposed between the base 101 and the cover 102 around the perimeter of the enclosure 103. The gasket 116 inhibits dirt, water, or other contaminants from entering the enclosure 103 when the cover 102 is secured to the base 101 by the latches 105. In some implementations, the base 101 defines a gasket channel 117 in which the gasket 116 may seat. In certain implementations, the cover 102 forms a tongue 118 that extends downwardly into the cover in alignment with the gasket channel 117. When the cover 102 is disposed on the base 101, the tongue 118 compresses the gasket 116 in the channel 117. In other implementations, the cover 102 may define a second channel instead of the tongue 118 to accommodate the gasket 116. In still other implementations, the cover 102 may define the channel and the base 101 may define the tongue.

Figure 9:
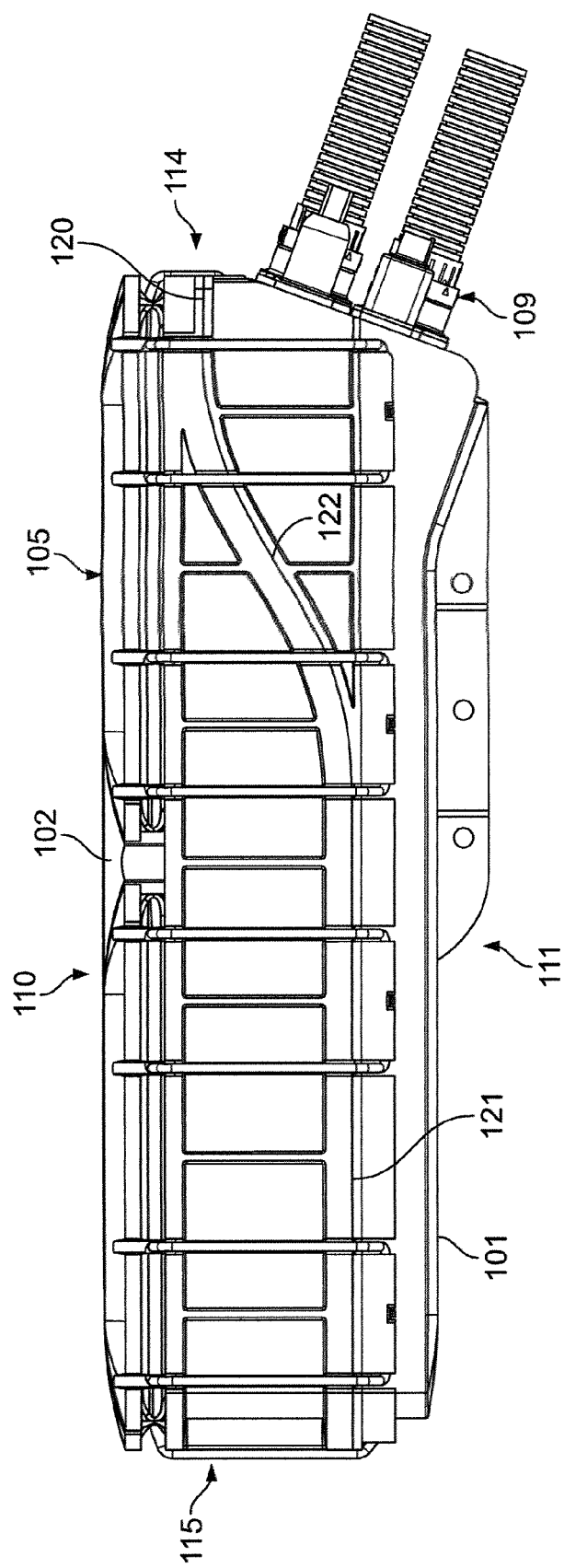

As shown in FIG. 9, the gasket channel 117 extends along the perimeter of the enclosure 103 in a non-planar route. The walls of the base 101 are higher at the first end 114 of the enclosure 103 and lower at the second end 115 of the enclosure 103. The higher walls at the first end 114 define a first plane along which a first section 120 of the gasket channel 117 extends and the lower walls at the second end 115 define a second plane along which a second section 121 of the gasket channel 117 extends. The base walls transition between the first and second planes to define a transitional section 122 of the gasket channel 117. In the example shown, the base walls transition on each side 112, 113 of the enclosure 103 to define two transitional sections 122.

In some implementations, the first section 120 of the gasket channel 117 defines a majority of the gasket channel 117. For example, the first section 120 of the gasket channel 117 extends along a majority of the lengths of the enclosure 103. In other implementations, the second section 121 and/or the transitional section 122 may define the majority of the gasket channel 117. In some implementations, the transitional section 122 has a non-planar contour. For example, in the example shown, the transitional section 122 is contoured in a convex slope (see FIG. 9). In other implementations, the transitional section 122 is planar, but angled relative to the first and second planes.

In some implementations, the gasket channel 117 defines tabs 119 (FIGS. 28-32) that aid in retaining the gasket 116 within the gasket channel 117. For example, the tabs 119 may aid in retaining the gasket 118 in the transitional section 122 of the channel 117. Two opposing tabs 119 extend inwardly from sides of the channel 117 at spaced locations along the channel 117. In some implementations, the tabs 119 are rounded. In other implementations, the tabs 119 may have any suitable shape (e.g., triangular, rectangular, etc.). In certain implementations, the tabs 119 extend between a bottom of the channel 117 and a top of the channel 117. In the example shown, the tabs 119 extend at a non-orthogonal angle relative to the bottom surface of the channel 117.

As shown in FIGS. 1 and 12-14, the cover 102 is secured to the base 101 using latching arrangements 105. For example, in certain implementations, each latching arrangement 105 is configured to releasably latch the cover 102 to the base 101. Each latching arrangement 105 includes a clip member 123 and at least one tensioning member 127. In the example shown, each clip member 123 includes two tensioning members 127. One end of the tensioning member 127 couples to the base 101 and the opposite end of the tensioning member 127 attaches to the clip member 123 (e.g., through a passage or recesses in the clip member 123).

Figure 12A:
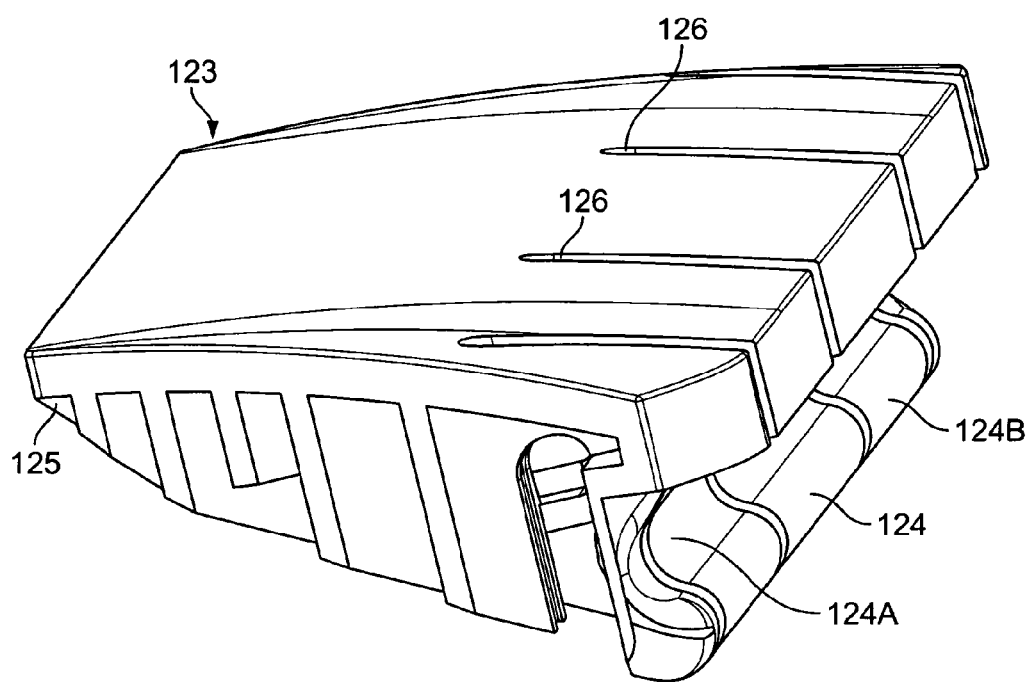
FIG. 12A is an enlarged view of an example clip member that forms part of a latching arrangement that holds the cover to the base in accordance with aspects of the disclosure.
Figure 12B:
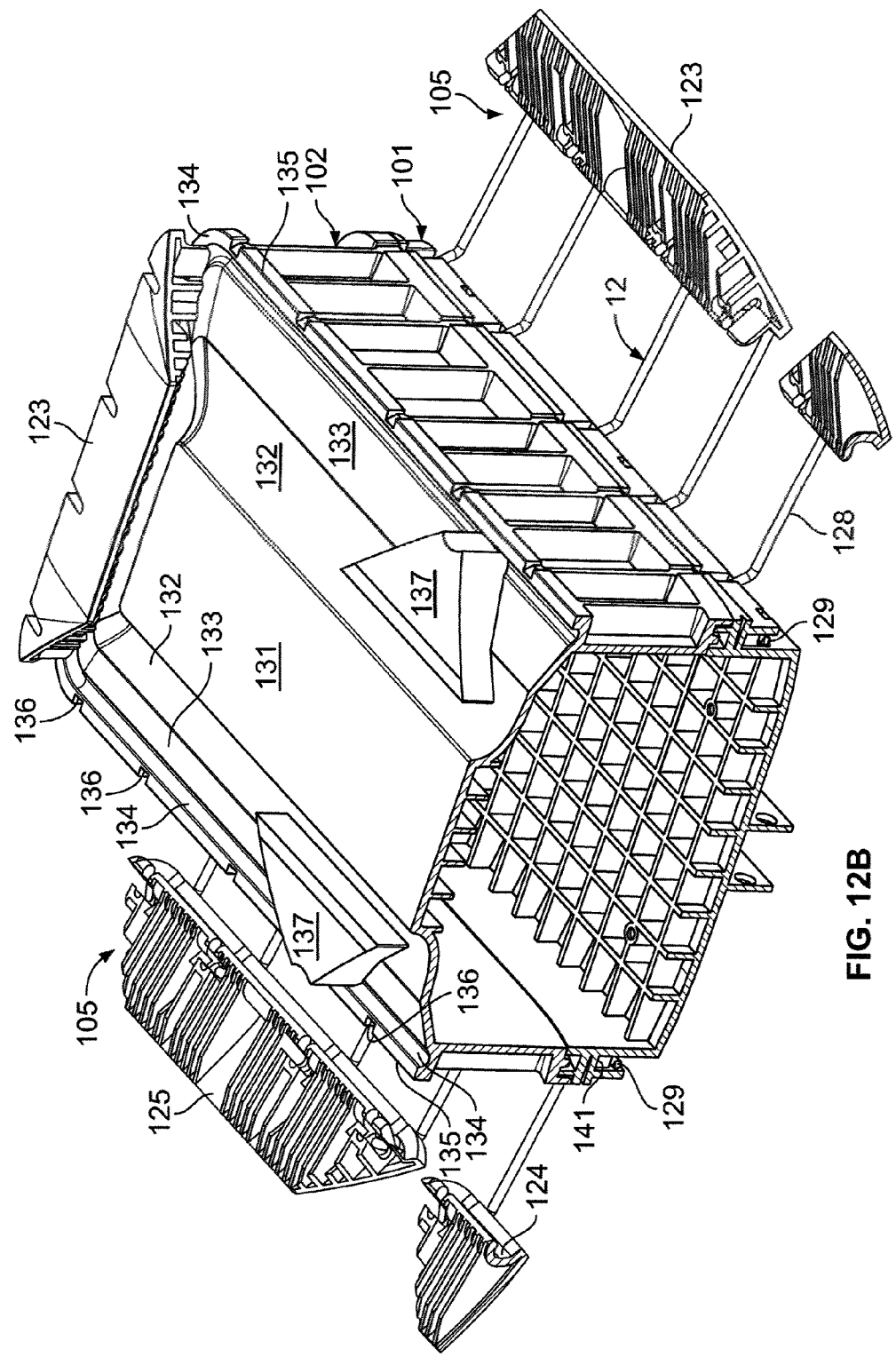
FIG. 12B is a partial view of the enclosure of FIGS. 2-9 with the splice assembly removed and some of the latching members moved to the released/lowered positions in accordance with aspects of the disclosure.
Figure 12C:
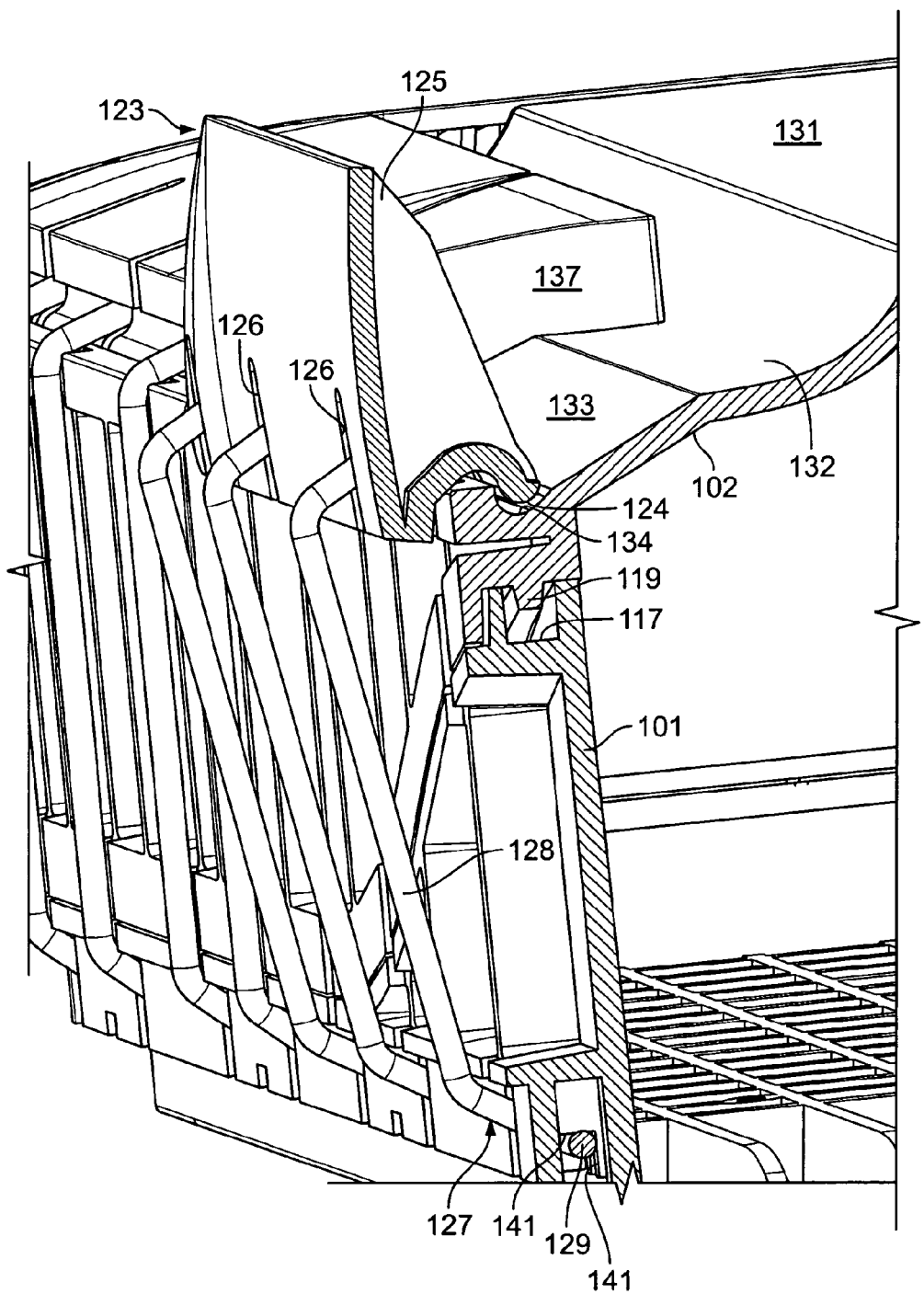
FIG. 12C is an enlarged view of a portion of the enclosure of FIGS. 2-9 with one of the clip members of a latching arrangement pivoted to a raised position in accordance with aspects of the disclosure.
Figure 13:
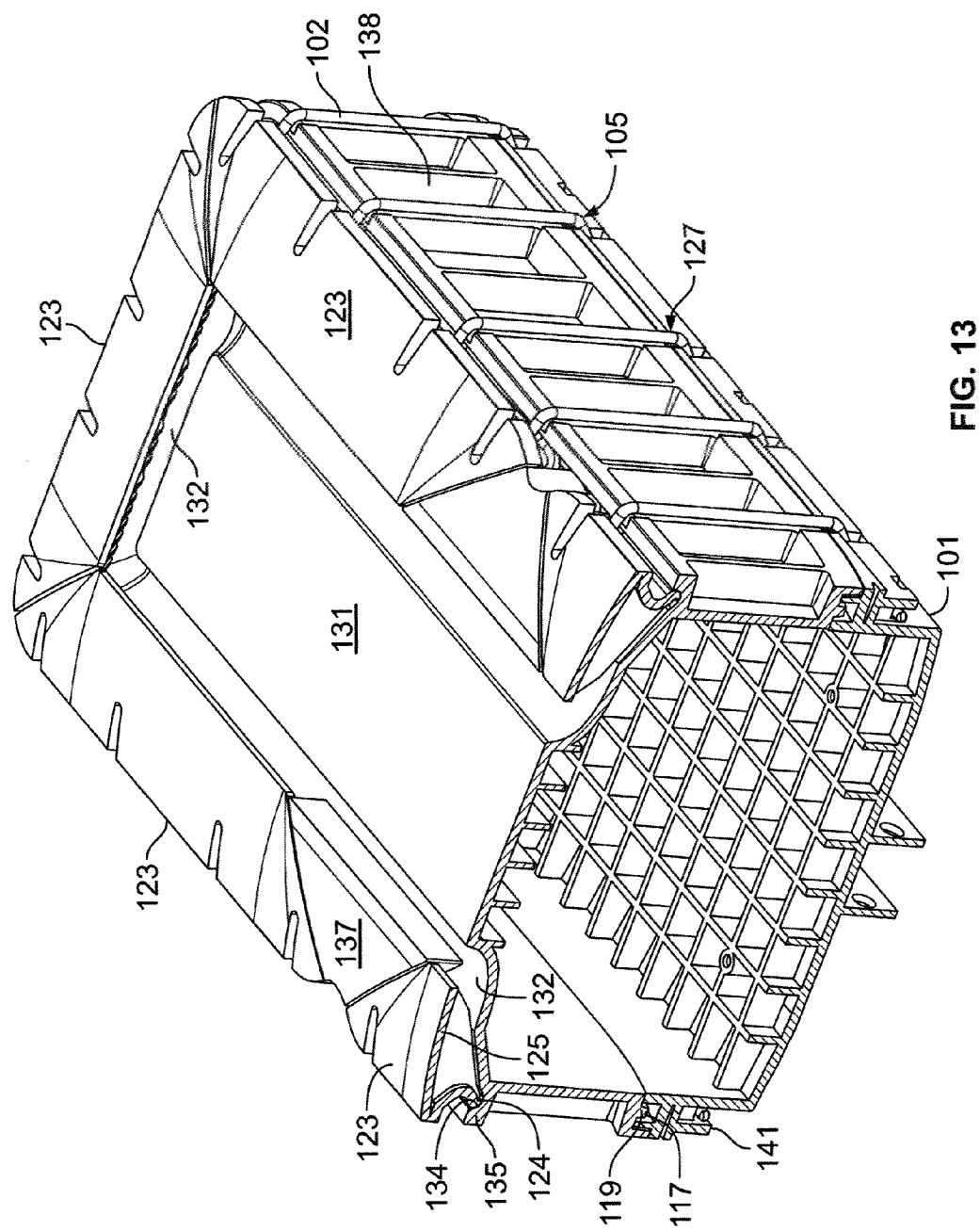
FIG. 13 is a transverse cross-section of the enclosure of FIGS. 2-9 shown with the splice tray assembly removed.
Figure 16:
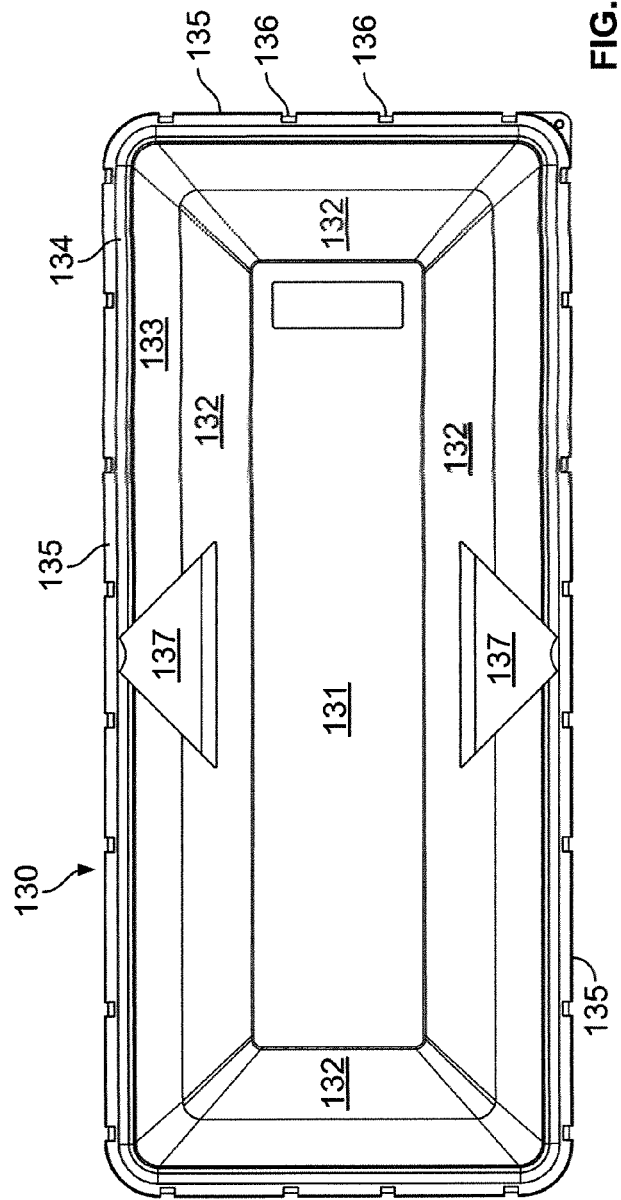
Figure 17:
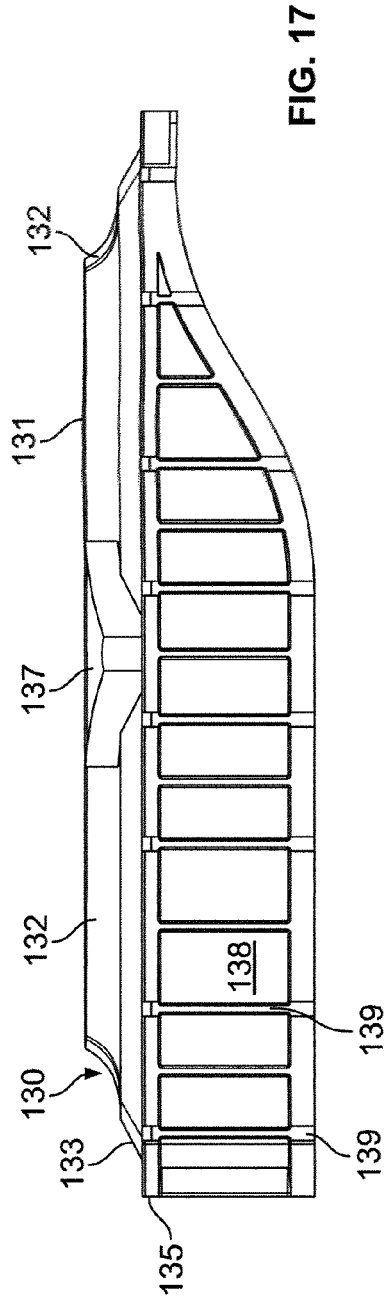

In certain implementations, the tensioning member 127 is configured to pivot relative to the base 101 to move the clip member 123 between a lowered position (FIG. 12B) and a raised position (see FIGS. 12C and 13). The tensioning member 127 also is configured to pivot relative to the clip member 123 to enable the clip member 123 to latch to the cover 102. In particular, the clip member 123 is configured to rotate relative to the tensioning member 127 between an unlatched position (see FIG. 12C) and a latched position (FIG. 13) as will be discussed in more detail herein.

In some implementations, at least one latching member 105 is disposed at each side of the enclosure 103. In certain implementations, the clip members 123 of the latching members 105 cover a majority of the perimeter of the cover 102. In the example shown, two latching members 105 are disposed at each side 112, 113 of the enclosure and one latching member 105 is disposed at each end 114, 115 of the enclosure 103 (e.g., see FIG. 2). In other implementations, however, a greater or lesser number of latching members 105 may be disposed at each side 112, 113 and/or end 114, 115. In some implementations, the clip member 123 has a generally trapezoidal shape with the abutment section 124 being formed at the longer side and the grip section 125 being formed at the shorter side. Adjacent latching members 105 form miter joints at the corners of the enclosure 103.

As shown in FIG. 14, the cover 102 is configured to receive the latching members 105. The cover 102 includes sidewalls 138 extending downwardly from a top surface 130. The top surface 130 has a central raised surface 131 that is surrounded on all four sides by an inner channel 132. A raised outer surface 133 bounds the channel 132 on all four sides of the top surface 130. An outer channel 134 surrounds the raised outer surface 133 and an outer lip 135 bounds the outer channel 134. Vertical notches 136 are defined at spaced intervals in the outer lip 135. The vertical notches 136 lead to vertical recesses 139 defined in the sidewalls 138. The notches 136 and recesses 139 are sized and shaped to accommodate the tensioning members 127. Two raised structures 137 are disposed on opposite sides 112, 113 of the top surface 130. Each of the raised structures 137 extends from the perimeter of the enclosure 103 to the inner channel 132. The raised structures 137 are shaped to accommodate the shape of the clip members 123 when the clip members 123 are latched to the cover 102. In the example shown, the raised structures 137 have angled sides that extend along the angled sides of the adjacent clip members 123 (see FIG. 13).

The clip members 123 of the latching members 105 are configured to fit with the cover 102. Each clip member 123 includes an abutment section 124, a grip section 125, and notches 126 (see FIG. 12A). In some implementations, the grip section 125 is disposed on an opposite side of the clip member 123 from the abutment section 124. The notches 126 are disposed on the same side of the clip member 123 as the abutment surface 124. In certain implementations, the abutment section 124 defines a generally S-shaped contour (see FIG. 12A). For example, the abutment section 124 defines a concave section 124A extending downwardly from the top surface of the clip member 123 and a convex surface 124B extending downwardly from the concave surface 124A.

The tensioning member 127 of each latching member 105 includes two legs 128 connected at a first end 129. In certain implementations, the legs 128 of the spring members 127 are connected at both ends. The first end 129 of the tensioning member 127 is disposed within a downward facing recess 141 in the base 101 (see FIGS. 12B and 12C). The recess 141 enables the legs 128 of the tensioning member 127 to be pivoted about the first end 129 between the latching position and the released position. The second end of the tensioning member 127 extends into the clip member 123 to enable the clip member 123 to pivot about the second end.

To latch the cover 102 to the base 101, the legs 128 of the tensioning member 127 are pivoted upwardly until the clip member 123 is moved to a position adjacent the cover 102. The clip member 123 is positioned so the convex section 124B of the abutment section 124 is disposed in the outer channel 134 of the top surface 130 of the cover 102 and the grip section 125 extends upwardly from the top surface 130 (see FIG. 12C). The outer lip 135 fits within the concave section 124A of the abutment section 124 of the clip member 123. When the abutment section 124 is disposed in the outer channel 134, a user pushes the grip section 125 towards the top surface 130 of the cover 102, thereby causing the clip member 123 to pivot about the convex surface 124B of the abutment section 124.

When the clip member 123 has been pivoted into the latched position (FIG. 13), the grip section 125 is disposed over the inner channel 132. The clip member 123 tapers inwardly from the abutment section 124 towards the grip section 125. Accordingly, the grip section 125 is spaced upwardly a distance from the surface of the inner channel 132. The distance is sufficient to allow a user to grasp the grip section 125 by inserting fingers into the space above the inner channel 132. Accordingly, a user may unlatch the clip member 123 from the cover 102 by lifting the grip section 105, thereby causing the clip member 123 to pivot about the convex surface 124B of the abutment section 124 until the grip section 125 extends upwardly from the cover 102.

FIGS. 33-46 illustrate an example implementation of the splice tray assembly 106 in isolation from the enclosure 103. The splice tray assembly 106 includes a base plate 180 on which one or more groove plates 160 are disposed. Each groove plate 160 is configured to hold one or more splice trays 150. In certain implementations, the base plate 180 also may be configured to hold one or more splice trays 150. In the example shown, the base plate 180 is configured to hold two splice trays 150 and four groove plates 160. Each groove plate 160 in the illustrated embodiment holds nine splice trays 150. In other implementations, however, the base plate 180 may hold a greater or lesser number of groove plates 160 and each groove plate 160 may hold a greater or lesser number of splice trays 150.

Figure 34:
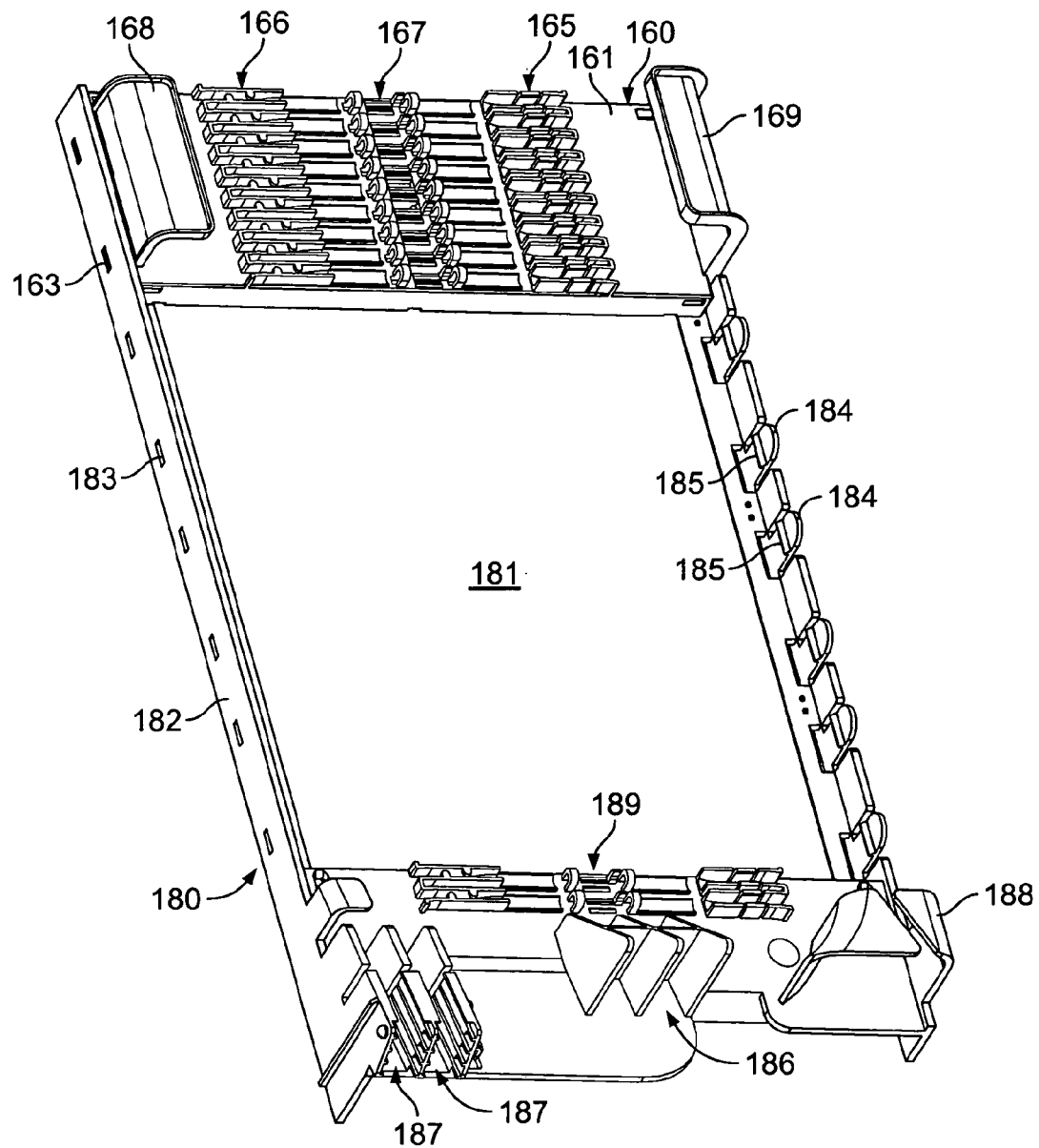
FIG. 34 is a top perspective view of a base plate of the example splice tray assembly of FIG. 34.

As shown in FIG. 34, the base plate 180 includes side walls 182 extending upwardly from a bottom surface 181. One of the side walls 182 defines a plurality of apertures 183 and the other of the side walls 182 defines a plurality of resilient tabs 184. Each of the tabs 184 has a latch 185 extending inwardly from the tab 184. Each latch 185 defines a ramp tapering outwardly as the ramp extends towards the bottom surface 181. Each latch 185 defines a shoulder facing the bottom surface 181. Each tab 184 is configured to flex outwardly to move the latch 185 away from the apertures 183. Each tab 184 may be moved independently from the other tabs 184.

The base plate 180 includes a first retention arrangement 187 at which one or more first optical fibers may enter the base plate 180 and a second retention arrangement 188 at which one or more second optical fibers may enter the base plate 180. In certain implementations, the first and second retention arrangements 187, 188 are located on opposite sides of the base plate 180. In certain implementations, the first and second retention arrangements 187, 188 are located on a common end of the base plate 180. The first retention arrangement 187 defines channels through which optical fiber cables or fibers thereof pass. In certain implementations, the channels of the first retention arrangement 187 are ramped downwardly towards the bottom surface 181. The second retention arrangement 188 includes retaining fingers that form a through-channel. In certain implementations the retaining fingers are spaced apart sufficient to form a gap at the top of the second retention arrangement 188.

In some implementations, the base plate 180 is configured to support the splice trays 150. For example, in certain implementations, the base plate 180 also defines a rest 186 that will be described in more detail herein. In certain implementations, the base plate 180 defines one or more splice tray mounting structures 189 at each of which a splice tray 150 may be pivotally attached. In certain implementations, the splice tray mounting structures 189 are disposed on a platform raised above the bottom surface 181. In the example shown, the base tray 180 includes two splice tray mounting structures 189 disposed on a raised platform adjacent the rest 186.

Figure 39:
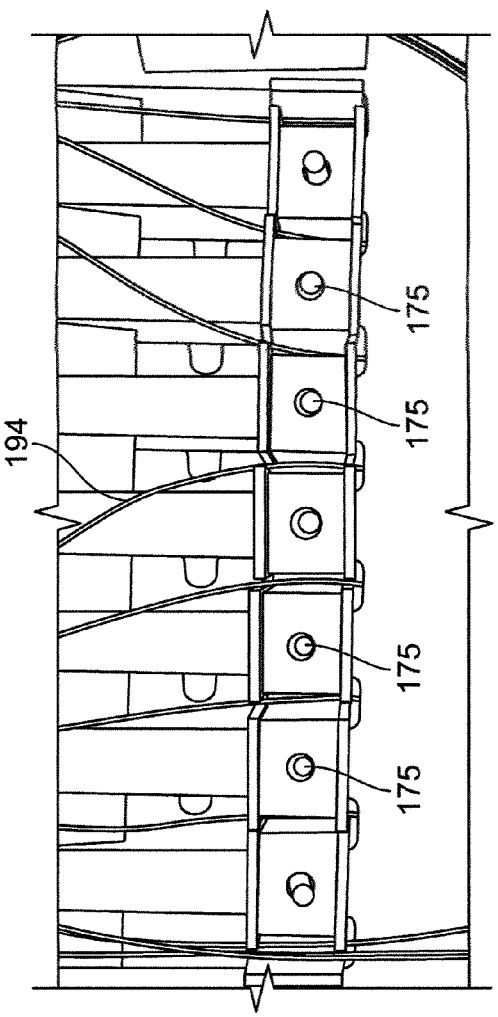
FIG. 39 is an enlarged view of a portion of FIG. 38.
Figure 40:
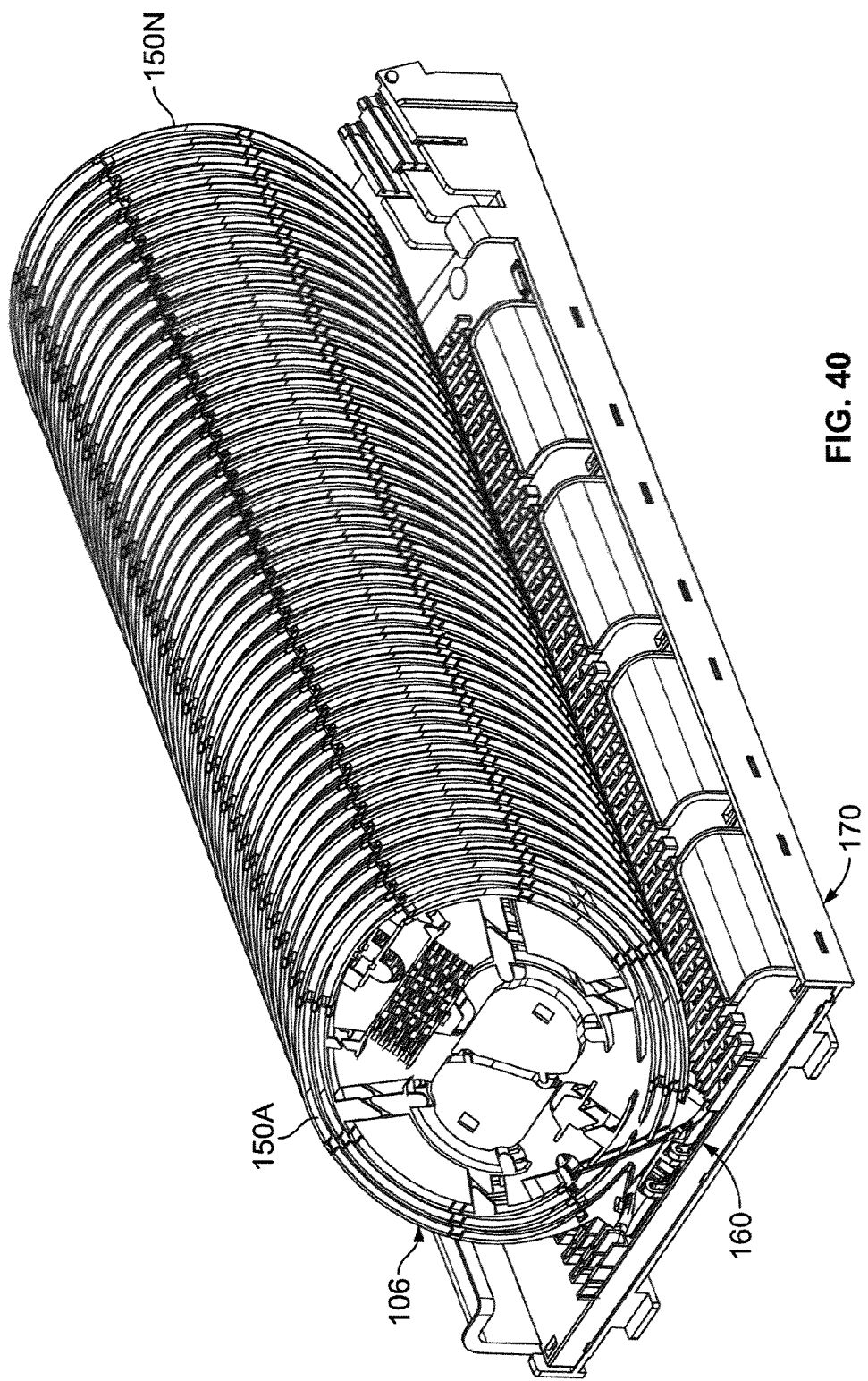
FIG. 40 is a top perspective view of the assembled splice tray assembly of FIG. 33.
Figure 41:
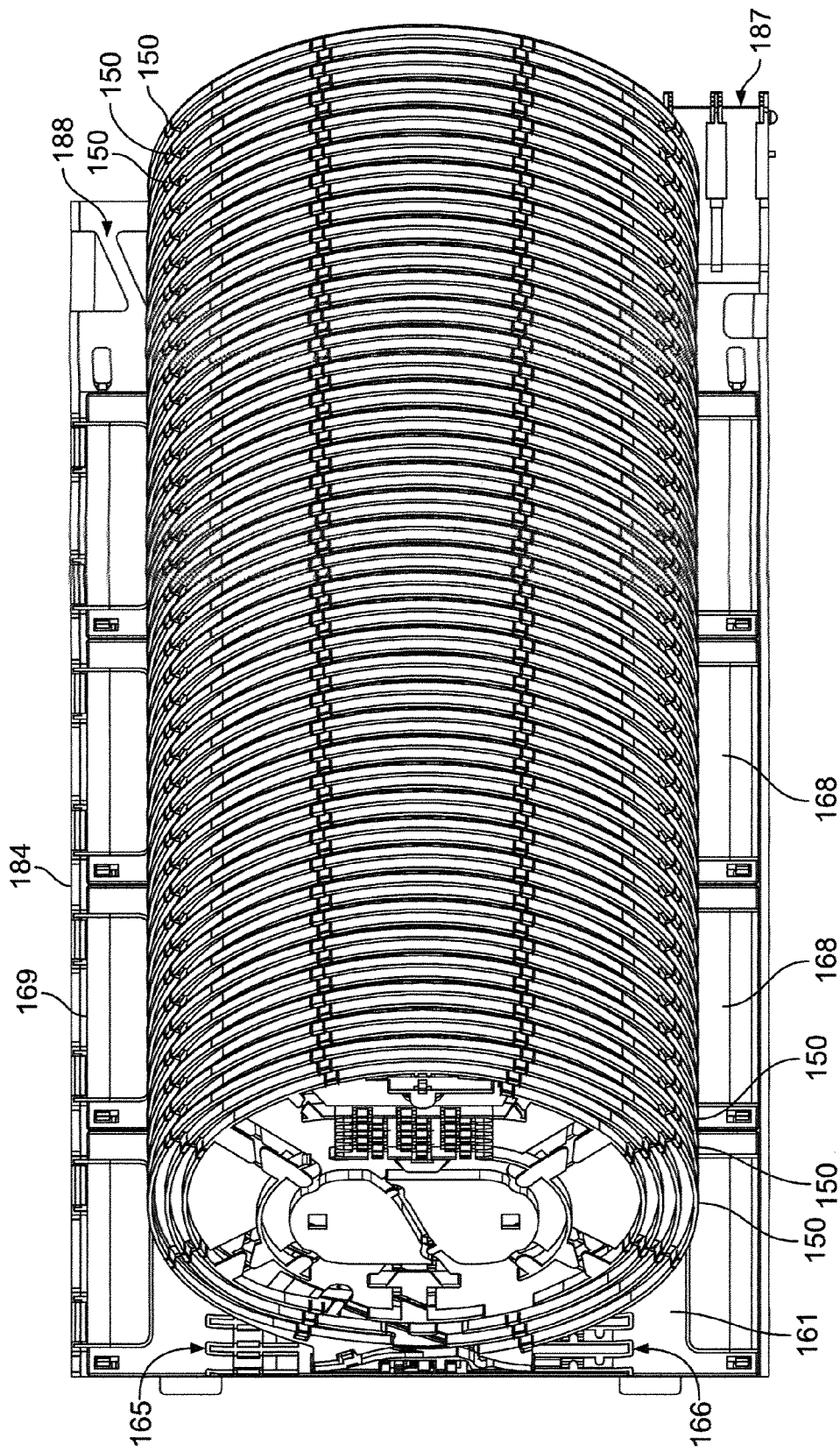
FIG. 41 is a top plan view of the splice tray assembly of FIG. 40.
Figure 42:
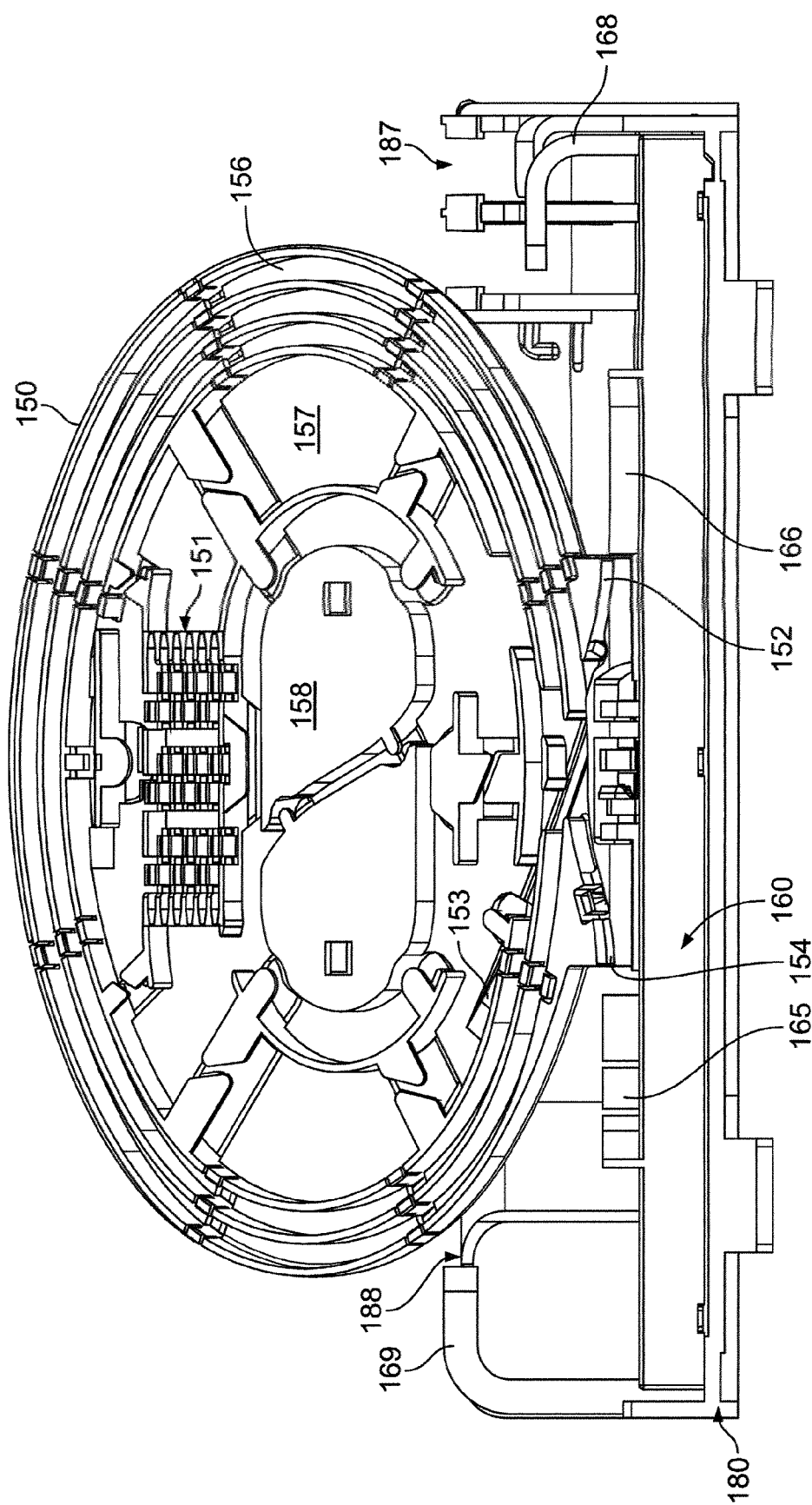
FIG. 42 is a front elevational view of the splice tray assembly of FIG. 40.

One or more groove plates 160 (FIGS. 35-39) may be coupled to the base plate 180 (e.g., see FIGS. 40-42). Each groove plate 160 includes a base 161 having side walls 162. In some implementations, a single groove plate 160 is sized to extend over a majority of the length of the base plate 180. In other implementations, however, multiple groove plates 160 are disposed along the length of the base plate 180 (see FIG. 33). Each groove plate 160 is sized so that the exterior surfaces of the side walls 162 abut the interior surfaces of the base plate side walls 182 when the groove plate 160 is disposed on the base plate 180. Latching tabs 163 (FIG. 33) are disposed on one of the side walls 162 and latching shoulders 164 (FIG. 35) are disposed on the other of the side walls 162.

To attach the groove plate 160 to the base plate 180, the latching tabs 163 of the groove plate 160 are inserted into the apertures 183 of the base plate 180. The side of the groove plate 160 defining the latching shoulders 164 is then pivoted downwardly towards the flexible tabs 184 of the base plate 180. As the groove plate 160 is pivoted, the latching shoulders 164 ride over the ramp defined by the latches 185 of the flexible tabs 184, thereby flexing the tabs 184 outwardly. When the groove plate 160 has been pivoted sufficiently for the latching shoulders 164 to clear the latches 185, the flexible tabs 184 snap back into position so that the shoulders of the latches 185 abut the latching shoulders 164 of the groove plate 160. To release the groove plate 160 from the base plate 180, a user flexes the tabs 184 outwardly from the groove plate 160 until the latching shoulders 164 of the groove plate 160 clear the shoulders of the latches 185 of the tabs 184.

Each groove plate 160 includes one or more splice tray mounting structures 167 at which splice trays 150 may be pivotally coupled to the groove plate 160. In certain implementations, the splice tray mounting structures 167 are disposed in a row down the center of the groove plate 160. Each groove plate 160 also includes structures for guiding the optical fibers from the base plate 180 to the splice trays 150. For example, in certain implementations, each groove plate 160 includes a tube routing guides 165 and a fiber routing guides 166 for each splice tray mounting structure 167. In other implementations, each groove plate 160 may include two tube routing guides, two fiber routing guides, or no guides.

Figure 35:
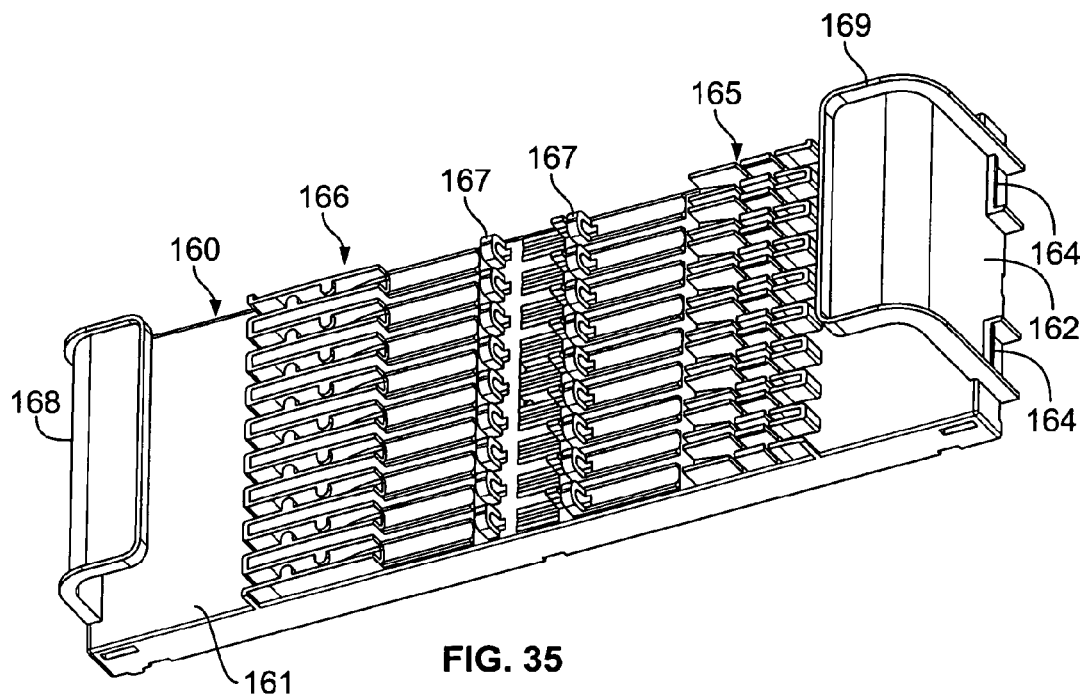
FIG. 35 is a top perspective view of an example groove plate of the example splice tray assembly of FIG. 34.
Figure 36:
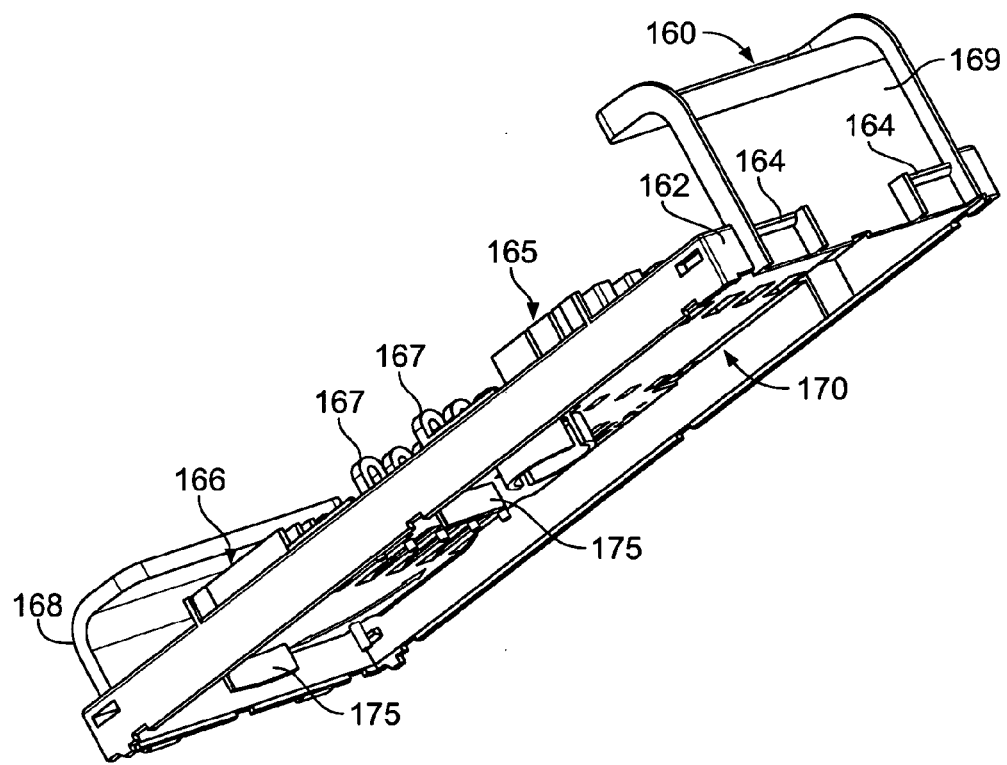
FIG. 36 is a bottom perspective view of the example groove plate of FIG. 35.
Figure 37:
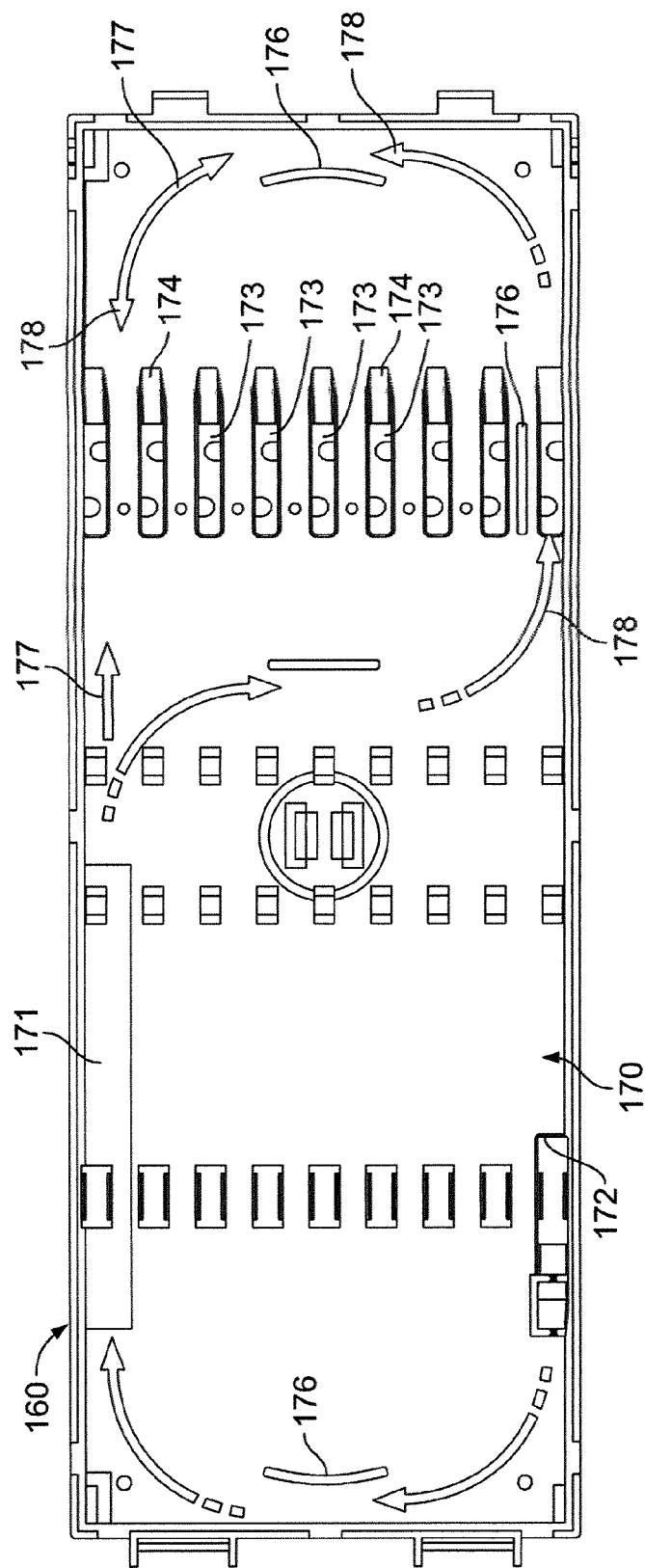
FIG. 37 is a bottom plan view of the example groove plate of FIG. 35.

In the example shown in FIG. 35, the fiber routing guides 166 are disposed in a row on one side of the splice tray mounting structures 167 and the tube routing guides 165 are disposed in another row an opposite side of the splice tray mounting structures 167. In certain implementations, each groove plate 160 includes one or more curved flanges extending upwardly from the sides 162 of the groove plate 160. In some implementations, a shorter curved flange 168 is disposed at the side 162 of the groove plate 160 adjacent the fiber routing guides 166 and a taller curved flange 169 is disposed at the side 162 of the groove adjacent the tube routing guides 165.

As shown in FIG. 41, when the groove plate 160 is coupled to the base plate 180, the first retention arrangement 187 of the base plate 180 aligns with a fiber routing channel defined across the groove plates 160 between the shorter curved flanges 168 and the fiber routing guides 166. The second retention arrangement 188 of the base plate 180 aligns with a tube routing channel defined across the groove plates 160 between the taller curved flanges 169 and the tube routing guides 165. The curved flanges 168, 169 aid in guiding the optical fibers along the routing channels to the splice tray 150.

Figure 38:
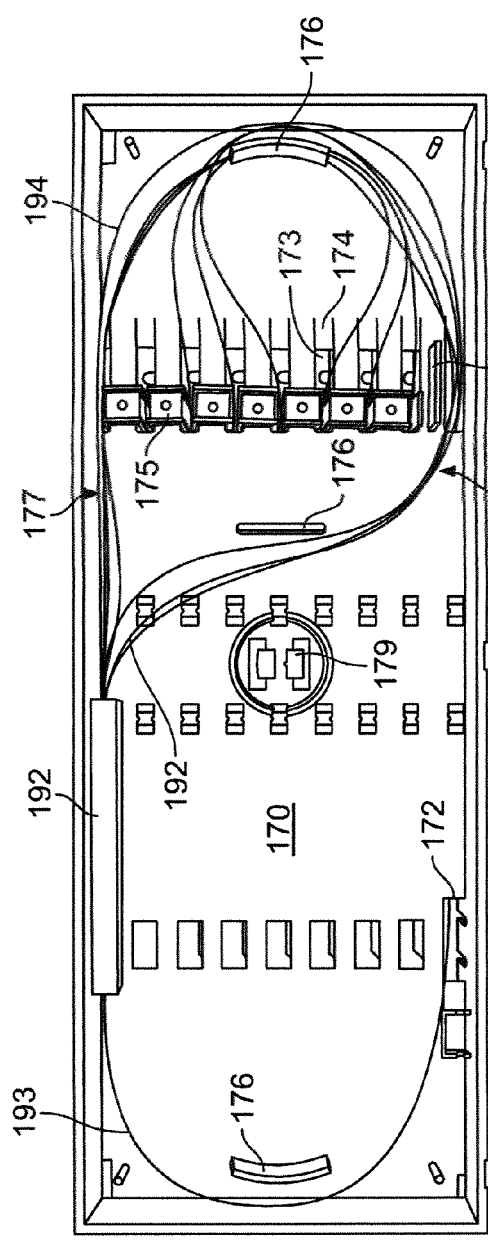
FIG. 38 shows a splitter disposed in a bottom pocket of the groove plate shown in FIG. 37 with optical fibers extending to and from the splitter.

In some implementations, one or more of the fibers received at the first retention arrangement 187 may be routed to an optical splitter 192 at which optical signals carried by the fibers 193 are split onto a plurality of optical fibers 194. FIG. 38 shows one example optical splitter 192 disposed at a splitter mounting area 171 in a cavity 170 defined in the bottom of the groove plate 160. In the example shown, a single splitter 192 is disposed t the splitter mounting area 171. In other implementations, however, greater or fewer splitters 192 may be disposed in the cavity 170. In the example shown, the splitter 192 is positioned at one end of the groove plate 160.

An input aperture 172 is defined through the top surface 161 of the groove plate 160. Splitter input fibers 193 are routed from the top surface 161 of the groove plate 160, through the input aperture 172, to the splitter 192. In the example shown, the input aperture 172 is defined at an opposite end of the groove plate 160 from the optical splitter 192. In certain implementations, the input aperture 172 is disposed at one of the fiber routing guides 166 of the groove plate 160. In certain implementations, one or more bend radius limiters 176 may be provided between the input aperture 172 and the optical splitter 192 to inhibit excessive bending of the splitter input fiber 193 as the splitter input fiber 193 is routed through the cavity 170.

One or more output apertures 173 also are defined through the top surface 161 of the groove plate 160. The output apertures 173 are disposed at an opposite side of the groove plate 160 from the input aperture 172 and splitter 192. In the example shown, the output apertures 173 are disposed in a row extending between opposite ends of the groove plate 160. Each of the apertures 173 is elongated in the direction extending between the sides 162 of the groove plate 160. In certain implementations, the top surface 161 defines ramps 174 leading to the output apertures 173. In the example shown, nine output apertures 173 extend through the top surface 161. In other implementations, however, the top surface 161 can define greater or fewer output apertures 173. In certain implementations, the output apertures 173 are disposed at two or more of the tube routing guides 167 of the groove plate 160.

Two or more splitter output fibers 194 extend from the splitter 192 towards the output apertures 173. One or more bend radius limiters 176 are provided to aid in routing the splitter output fibers 194 around the cavity 170 to the output apertures 173. In some implementations, the bend radius limiters 176 are positioned to provide a first routing path 177 that extends from the splitter 192, along a first end of the groove plate 160, past the row of output apertures 173, around a bend radius limiter 176 towards a second end of the groove plate 160, and towards the output apertures 173. In some implementations, the bend radius limiters 176 are positioned to provide a second routing path 178 that extends from the splitter 192, towards the second end of the groove plate 160, along the second end past the row of output apertures 173, around a bend radius limiter 176 towards the first end of the groove plate 160, and towards the output apertures 173.

In the example shown, the splitter output fibers 194 routed to the output apertures 173 located at the second end of the groove plate 160 follow the first routing path 177 and the splitter output fibers 194 routed to the output apertures 173 located at the first end of the groove plate 160 follow the second routing path 176 (e.g., see FIG. 38). As shown in FIGS. 38 and 39, in certain implementations, a retaining arrangement 175 is disposed at each output aperture 173. Each retaining arrangement 175 defines a slit aligned with the output aperture 173 that guides the respective splitter output fiber 194 through the aperture 173 and onto the top surface 161 of the groove plate 160 (see FIG. 39).

Each groove plate 160 includes one or more splice tray mounting arrangement 167 at which the splice trays 150 are mounted. In certain implementations, each splice tray mounting arrangement 167 include a hinge mount through which a hinge-pin of a corresponding splice tray 150 is inserted to pivotally couple to the groove plate 160. The base plate 180 also may include one or more such splice tray mounting arrangement 189. Optical fibers received at the base plate 180 are routed over the groove plates 160 to the splice trays 150.

Figure 45:
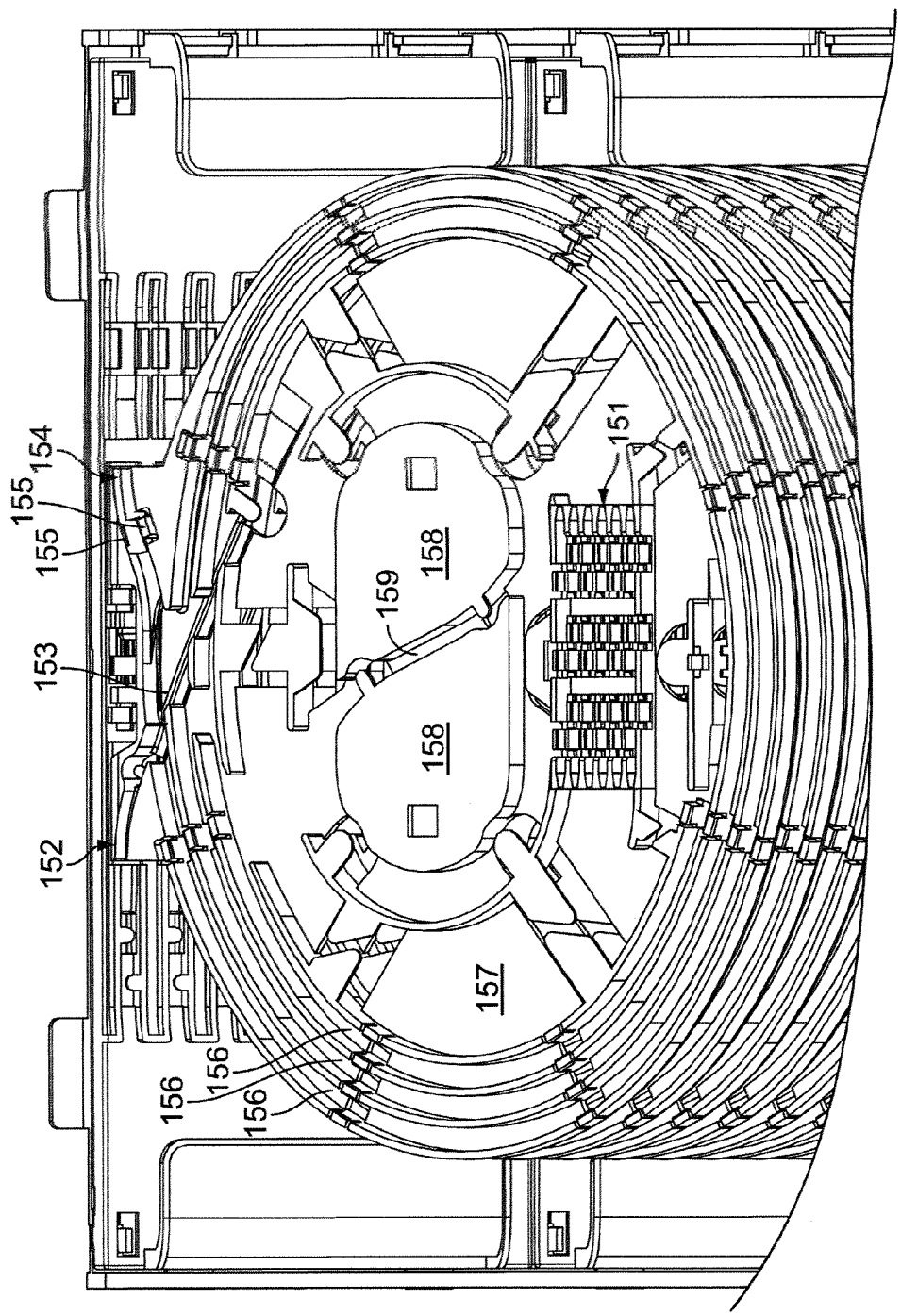
FIG. 45 is a partial view of the splice tray assembly of FIG. 41.
Figure 46:
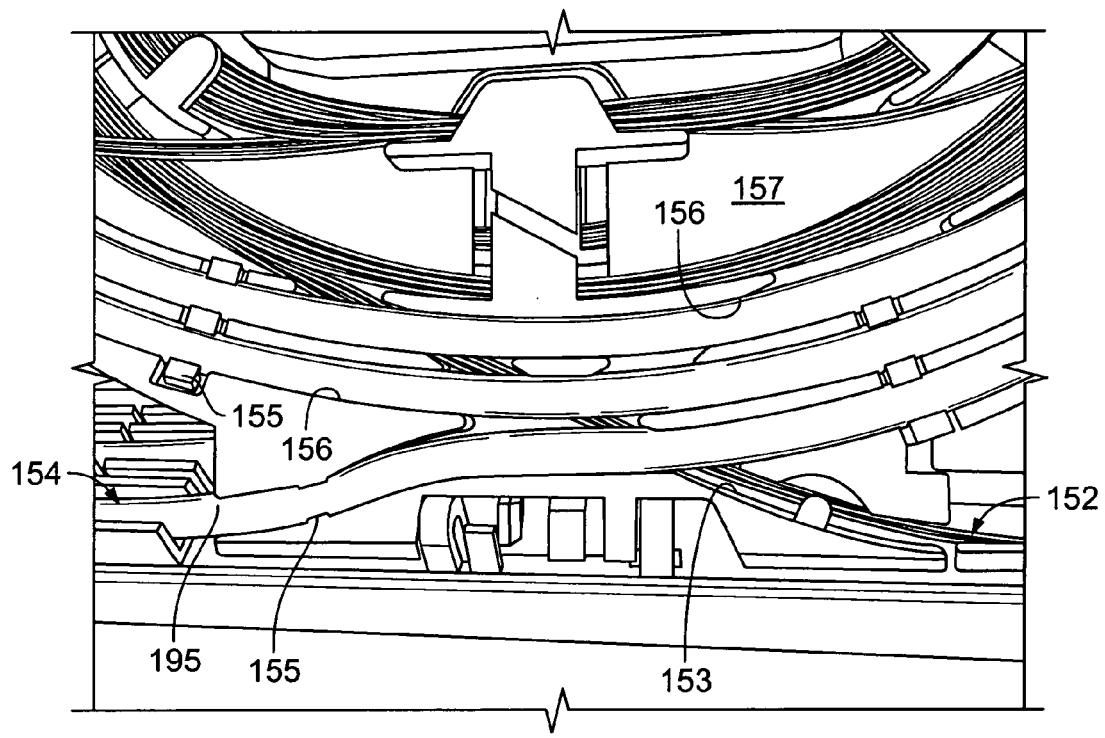
FIG. 46 is a partial view of an example splice tray showing optical fibers routed onto the example splice tray in accordance with aspects of the disclosure.

FIG. 45 shows an example splice tray 150 suitable for use with the groove plate 160 and/or base plate 180 described above. The front of each splice tray 150 includes a splice area 151 at which two or more optical fibers may be optically coupled together. Each splice tray 150 also includes a first entrance 152 through which at least a first optical fiber enters the splice tray 150 and a second entrance 154 through which at least a second optical fiber enters the splice tray 150. In certain implementations, the entrances 152, 154 are located adjacent the hinge pin of the splice tray 150, but face in different directions. For example, the first entrance 152 of each splice tray 150 may be aligned with a corresponding one of the fiber routing guides 166 and the second entrance 154 may be aligned with a corresponding one of the tube routing guides 165.

The first entrance 152 guides the fibers onto the splice tray 150 along a first direction and the second entrance 154 guides the fibers onto the splice tray 150 along a second direction. The optical fibers entering the splice tray 150 at the second entrance 154 cross the optical fibers entering the splice tray 150 from the first entrance 152. To facilitate the interactions of these fibers, a recessed channel 153 is provided at the first entrance 152. Accordingly, any fibers routed through the second entrance 154 cross over any fibers routed through the first entrance 152 and the recessed channel 153.

The front of each splice tray 150 also includes a first routing channel 157 for the fibers extending through the first entrance 152 and a second routing channel 156 for the fibers extending through the second entrance 154. The routing channels 156, 157 guide the fibers from the entrances 152, 154 to the splice area 151. In certain implementations, the first routing channel 157 extends from the first entrance 152, along a recessed channel 153, and into the first routing channel 157 that guides fibers around one or more spool 158 disposed at a central portion of the splice tray 150. In the example shown, the first routing channel 157 wraps around two fiber spools separated through the middle by a slit to enable the fibers to be wound in a "Figure 8" configuration.

The second routing channel 156 extends from the second entrance 154, across a top of the recessed channel 153, and into a helical outer channel located at an outer edge of the splice tray 150. The helical channel 156 guides the fibers around the splice tray 150 and opens into the first routing channel 156 in an opposite direction from the first entrance 152. In some implementations, the optical fibers routed onto the splice tray from the second entrance 154 are disposed in a loose tube 195 (see FIG. 46). One or more retaining fingers 155 are provided at the second entrance 154 and along the helical routing channel 156 to aid in retaining the tube 195.

In the example shown in FIG. 40, the splice trays 150 are disposed in a row with a first splice tray 150A at a first end and another splice tray 150N at a second end. Each splice tray 150 is pivotally mounted to the respective groove plate 160 or base 180 so that each splice tray 150 may be separately pivoted between a rest position and an unblocking position. When in the rest position, each of the splice trays 150 is oriented so that the front of the tray 150 generally faces towards the first splice tray 150A. In certain implementations, the front of the splice tray 150 also faces at least partially upwardly away from the respective groove plate 160 or base plate 180. When in the unblocking position, each of the splice trays 150 is oriented so that the front of the tray 150 faces generally downwardly towards the respective groove plate 160 or base plate 180.

In the example shown in FIGS. 40-43, all of the splice trays 150 are disposed in the rest position. Each splice tray 150 rests on the splice tray 150 behind it. The rear of the splice tray 150N at the second end of the row abuts the rest 186 of the base plate 180. The rest 186 maintains the splice trays 150 in the rest position. The first splice tray 150A is accessible to a user. No splice tray 150 blocks access to the first splice tray 150A and the front of the first splice tray 150A faces partially upwardly. In some implementations, the splice trays define a rounded edge 159. For example, as shown in FIG. 44, the perimeter along the rear side of each splice tray 150 may have a rounded contour 159. The rounded contour may enhance the movement of the splice trays 150 between the rest and unblocking positions.

To access a select splice tray 150 from further along in the row, all of the splice trays 150 located in front of the selected splice tray 150 are moved to the unblocking position and the selected splice tray 150 remains in the rest position. Accordingly, no splice trays 150 will block access to the selected splice tray 150 and the front of the selected splice tray 150 faces partially upwardly.

The splice tray assembly 106 is configured to be disposed within the base 101 so that the row of splice trays 150 extends between the first end 114 and the second end 115 of the enclosure 103 (see FIG. 1). In the example shown, the splice trays 150 are oriented so that the front of each splice tray 150 faces generally towards the second end 115 of the enclosure when in the rest position. In certain implementations, the front of each splice tray 150 also faces partially towards the cover 102 when in the rest position. In other implementations, however, the splice trays 150 may be oriented to face generally in a different direction relative to the enclosure 103.

Figure 10:
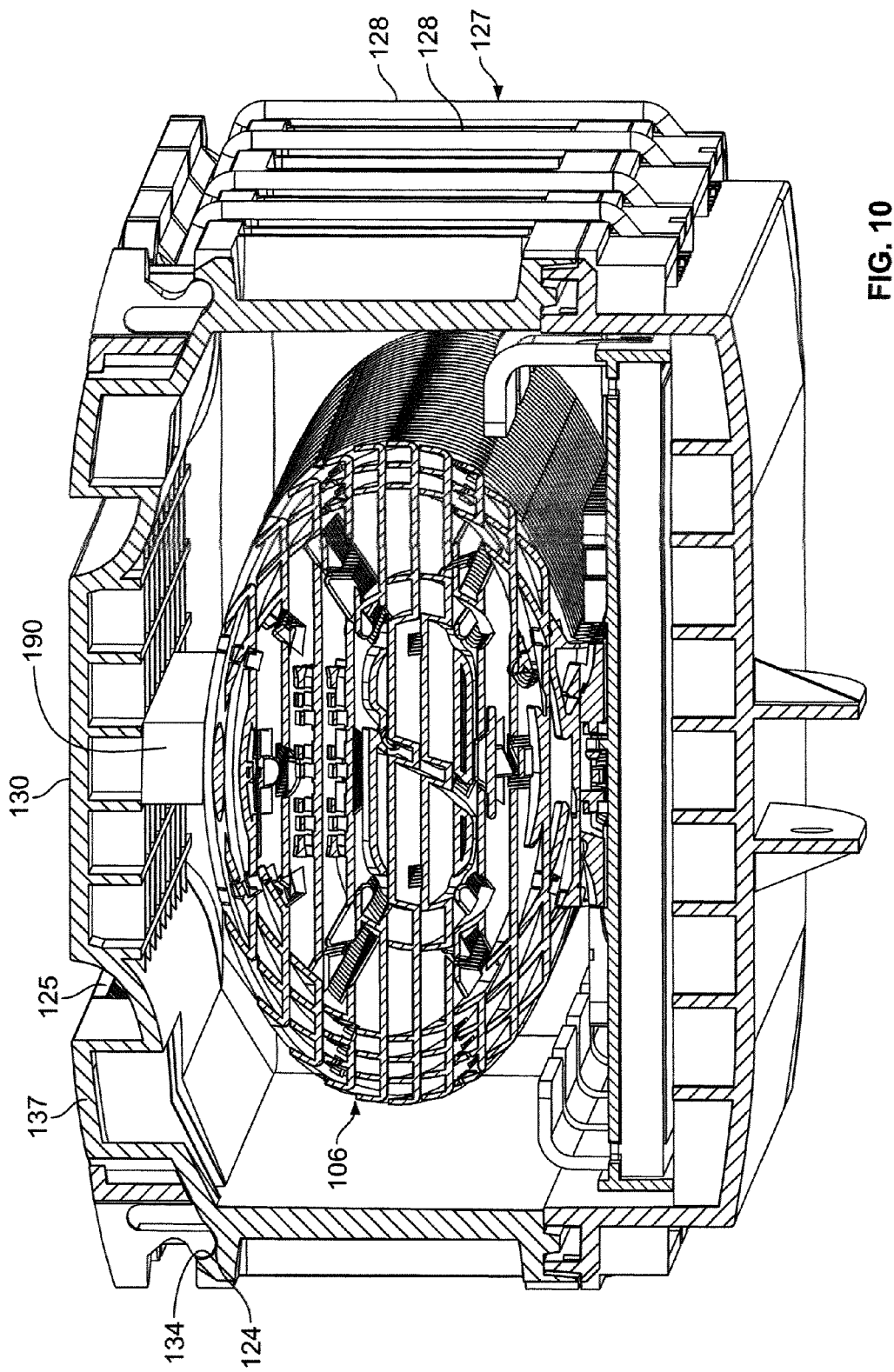
FIG. 10 is a transverse cross-sectional view of the enclosure assembly of FIGS. 2-9 looking towards a second end of the enclosure so that portions of an example splice tray assembly are visible.
Figure 11:
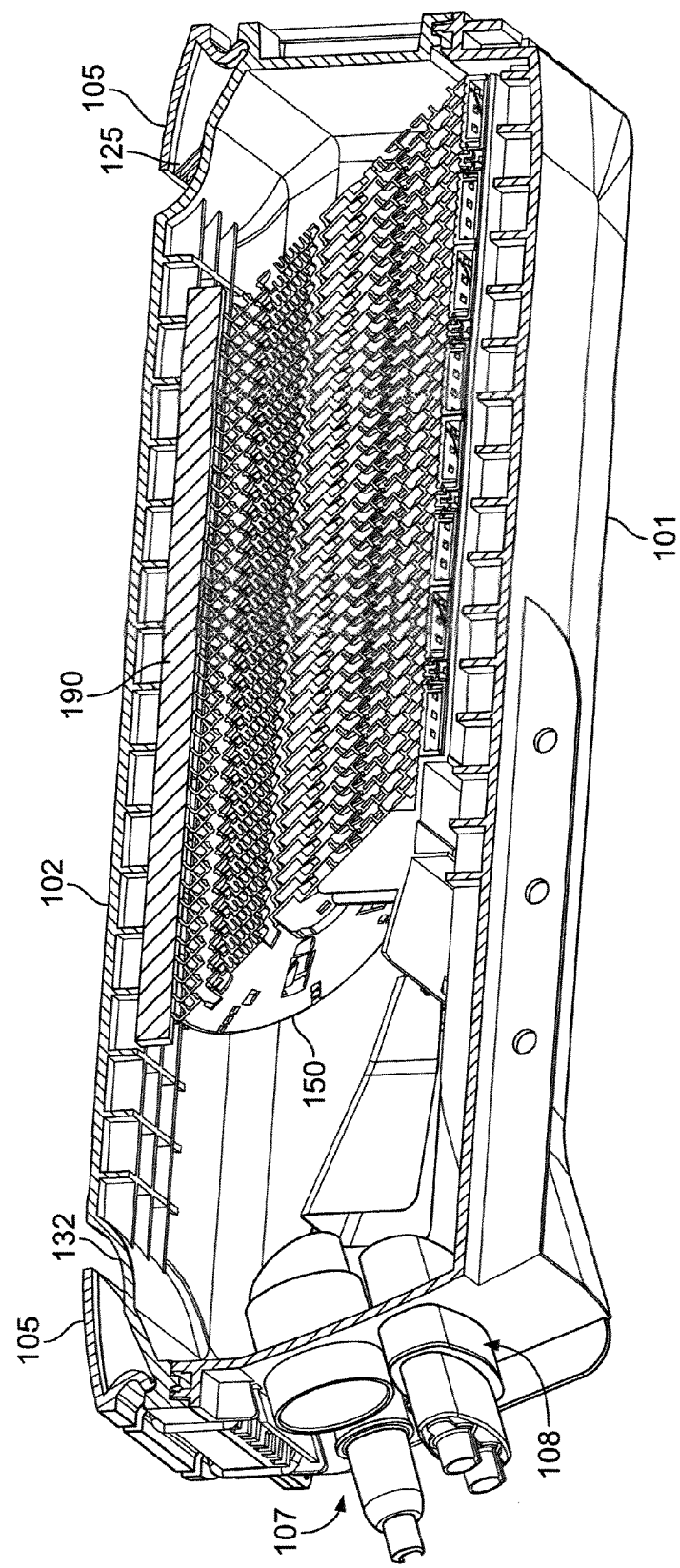
FIG. 11 is a longitudinal cross-sectional view of the enclosure assembly of FIGS. 2-9 looking towards a first side of the enclosure so that portions of the example splice tray assembly are visible.

As shown in FIGS. 10 and 11, a cushioning strip 190 may be disposed beneath the cover 102 to aid in retaining the splice trays 150 in the rest position while the cover 102 is attached to the base 101. The cushioning strip 190 extends along the length of the platform 130 of the cover 102 between the first end 114 and the second end 115. The cushioning strip 190 is sufficiently thick to contact the tops of the splice trays 150 when the splice trays 150 are disposed in rest positions and the cover 102 is attached to the base 101. In certain implementations, the cushioning strip 190 is formed from foam or resin. In other implementations, however, the cushioning strip 190 may be formed from any resilient material or material otherwise capable of retaining the splice trays 150 in position.

Referring to FIGS. 47-61, optical fibers are routed to the splice assembly 106 in the enclosure 103 via cable ports 145-147. Ducts 200 extend through the first end 114 of the base 101 to define the cable ports 145-147. For example, a first duct 201 extends through the first end 114 at the first side 112 to define the round input port 145; a second duct 202 extends through the first end 114 at the first side 112 to define the oblong input port 146; and multiple ducts 203 extend through the first end 114 at the second side 113 to define the output ports 147. In the example shown, five ducts 203 extend through the first end 114 to define the five output ports 147. One of the output ducts 203 is located at the first side 112 of the base 101 above the second duct 202.

Figure 47:
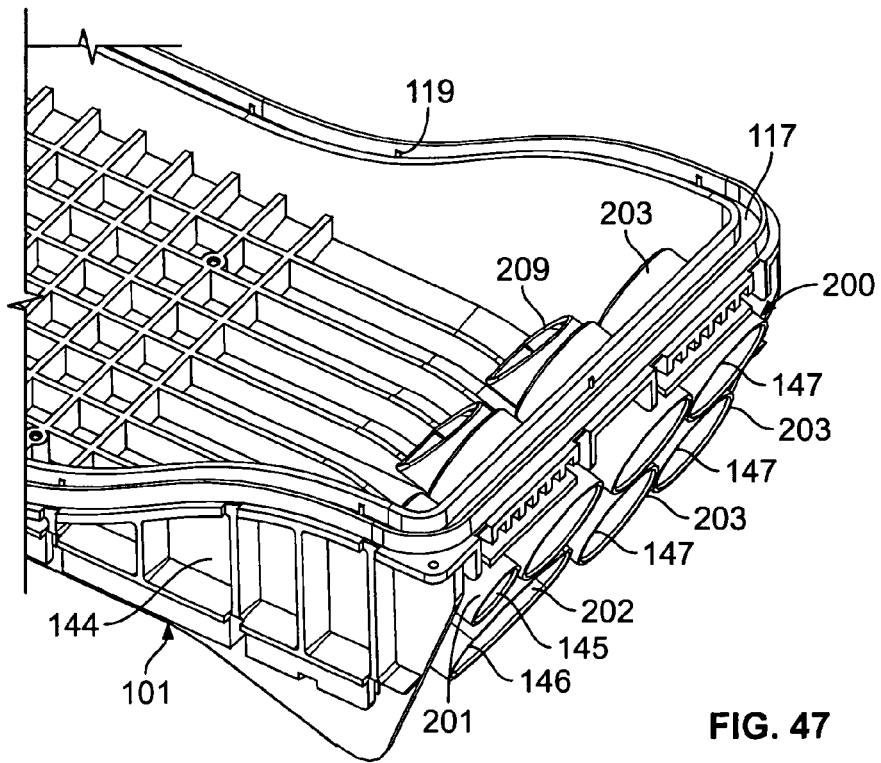
FIG. 47 is a partial view of a first end of the enclosure base showing the cable ports.
Figure 48:
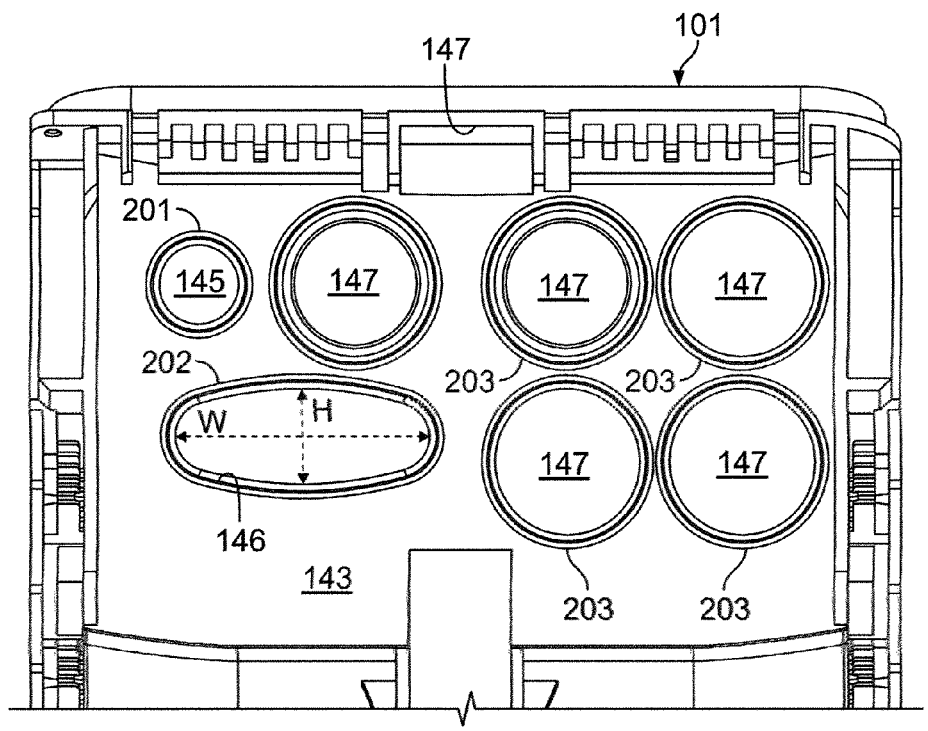
FIG. 48 is a front elevational view of the enclosure base of FIGS. 21-27.
Figure 49:
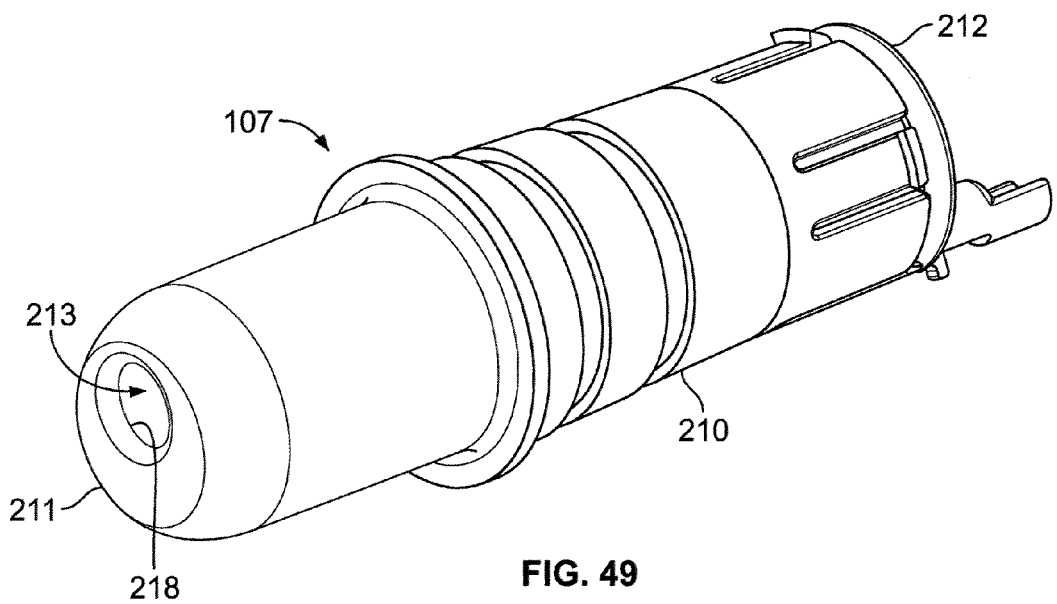
FIGS. 49 and 50 are perspective views of a first type of port assembly suitable for use with the enclosure of FIG. 1.
Figure 50:
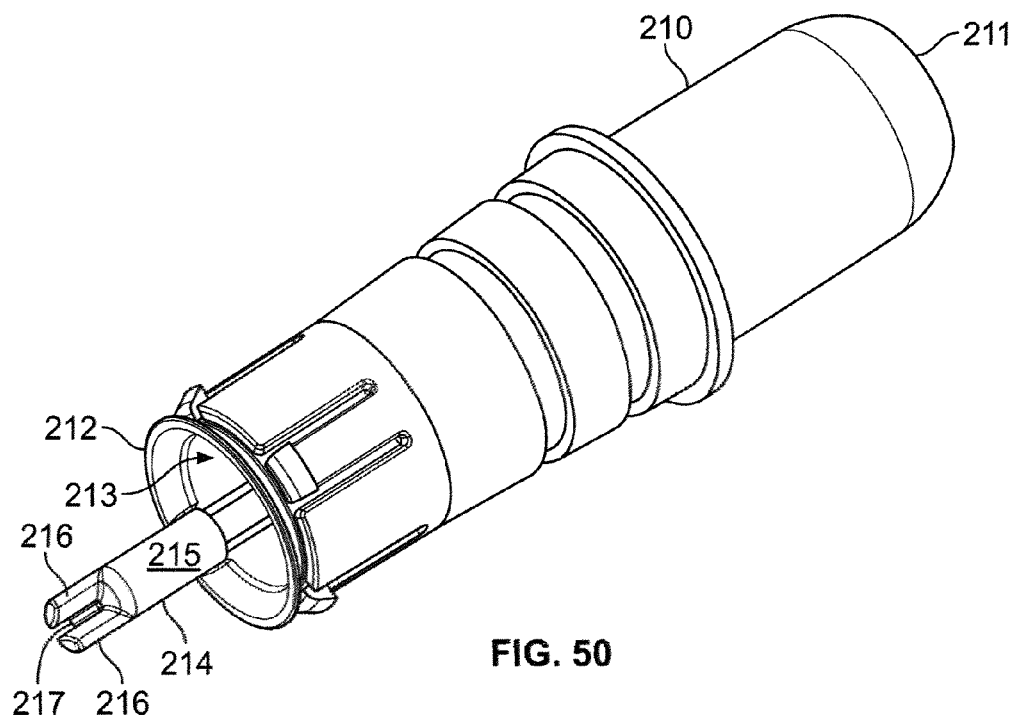

As shown in FIG. 47, each of the ducts 200 has a first end extending partially into the interior 104 of the enclosure 103 and a second end extending partially out of the enclosure 103. By disposing a portion of each duct 200 within the enclosure interior 104, an overall length of the enclosure 103 is reduced as compared to an enclosure having ducts 200 extending only outside of the enclosure 103. In some implementations, about half of each duct 200 is disposed within the interior 104 and about half is disposed outside of the enclosure 103. In other implementations, a majority of each duct 200 may be disposed within the interior 104 or outside of the enclosure 103.

In some implementations, a tear-off sealing member 209 is disposed in one or more of the ducts 200. Each sealing member 209 extends across the duct 200 to inhibit contaminants from entering the enclosure 103. The sealing members 209 are connected to the ducts with weak webs or other frangible connections that facilitate removing the sealing members 209 from the ducts 200. Accordingly, the sealing members 209 temporally seal the ducts 200 until the cable port is needed. In certain implementations, the sealing members 209 are configured to tear away cleanly (e.g., using pliers). Additional information pertaining to example implementations of the sealing members 209 is provided in Exhibit A, which is attached to the end of this disclosure. The disclosure of Exhibit A is hereby incorporated herein by reference in its entirety.

In some implementations, the first duct 201 and the output ducts 203 are round. However, the first duct 201 is smaller than the output ducts 203. In some implementations, the first duct 201 is sized to receive one input cable having one or more optical fibers and the output ducts 203 are sized to receive multiple tubes of optical fibers from one or more optical cables. In certain implementations, the second duct 202 is generally oblong. In some implementations, the second duct 202 is sized to receive two input cables, each having one or more optical fibers. The second duct 202 has a height H that is less than a width W (see FIG. 48). In certain implementations, the height H is less than half of the width W. In other implementations, however, each of the ducts 200 may be sized to receive greater or fewer fiber optic cables.

Figure 2:
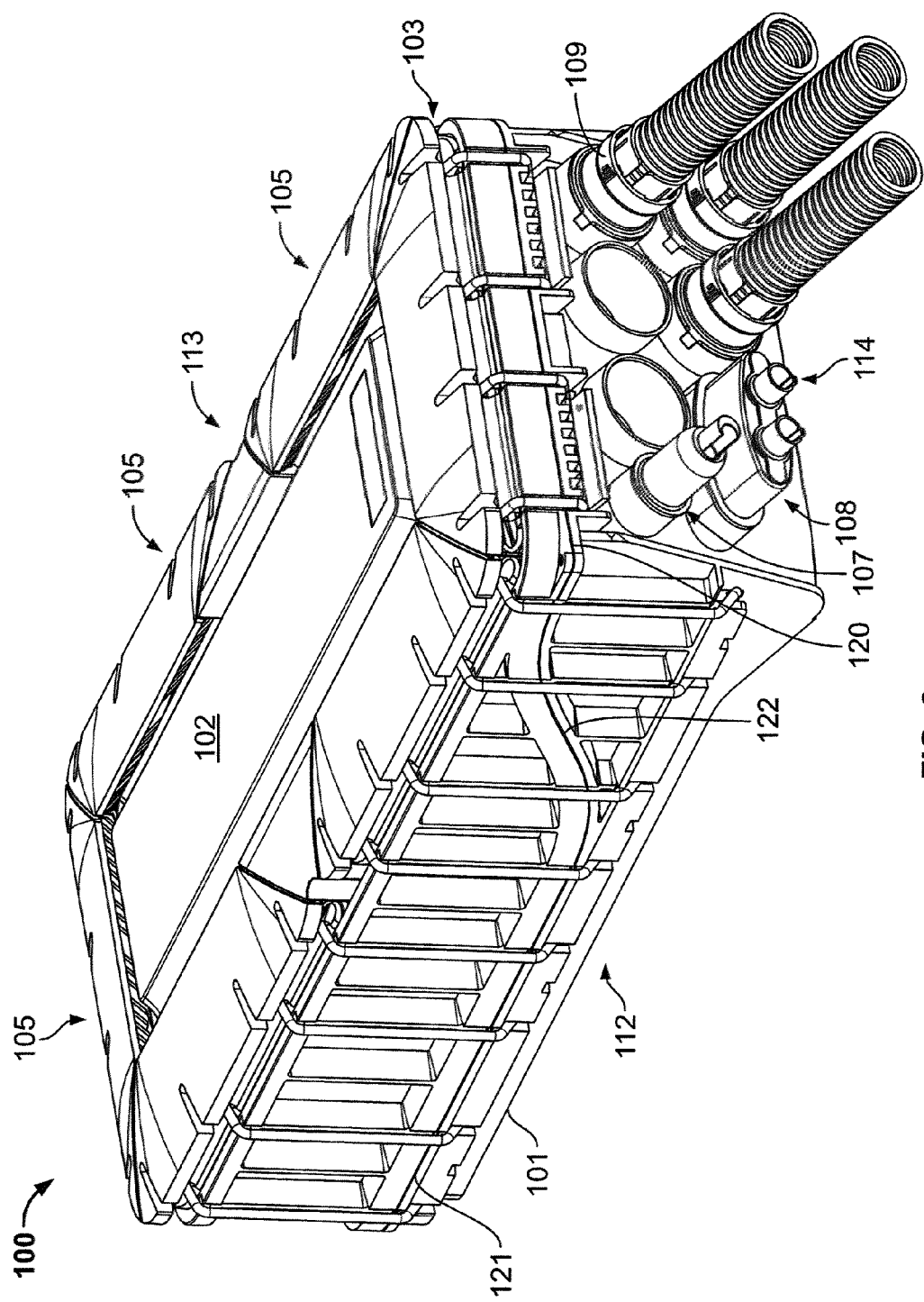
Figure 3:
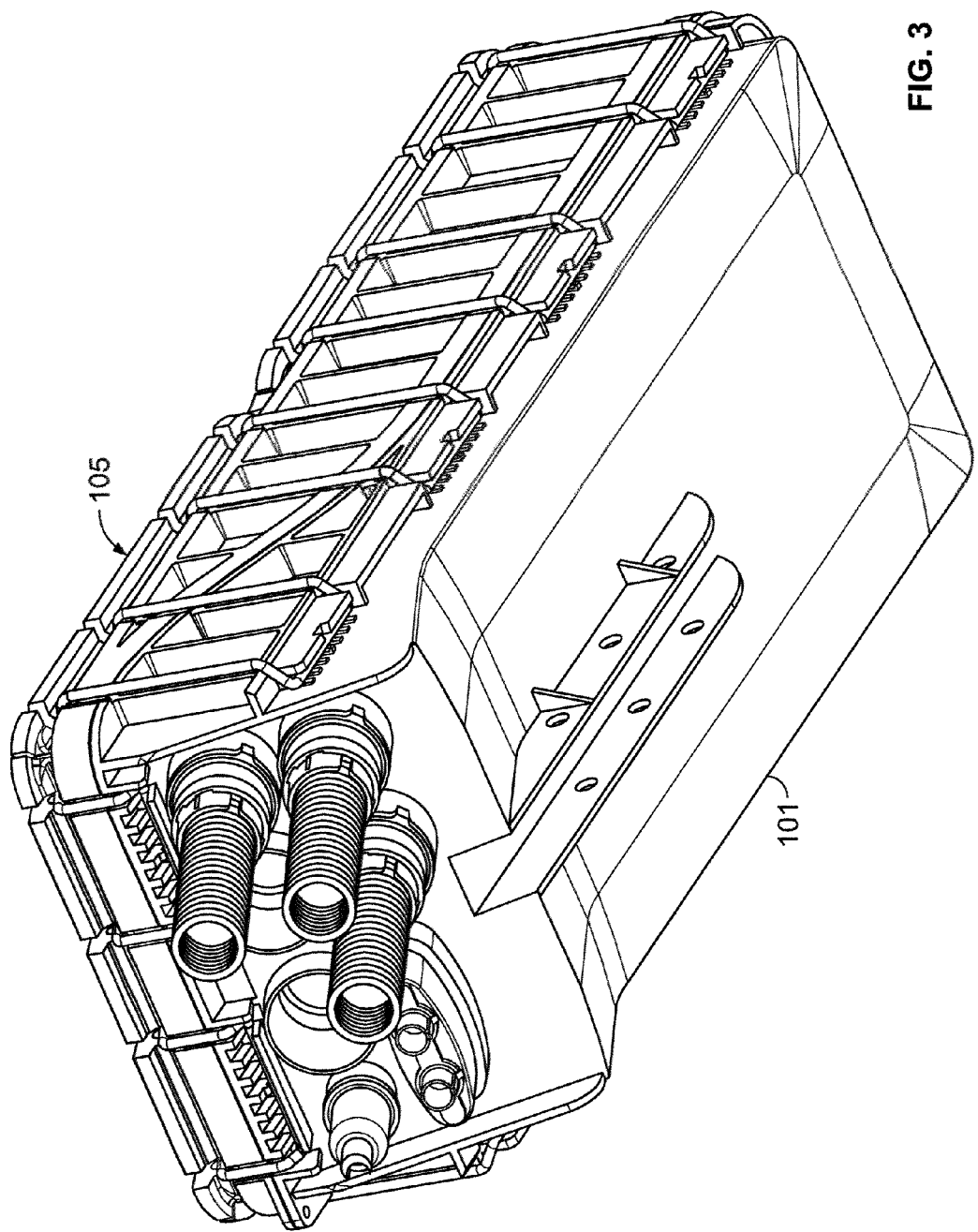
Figure 4:
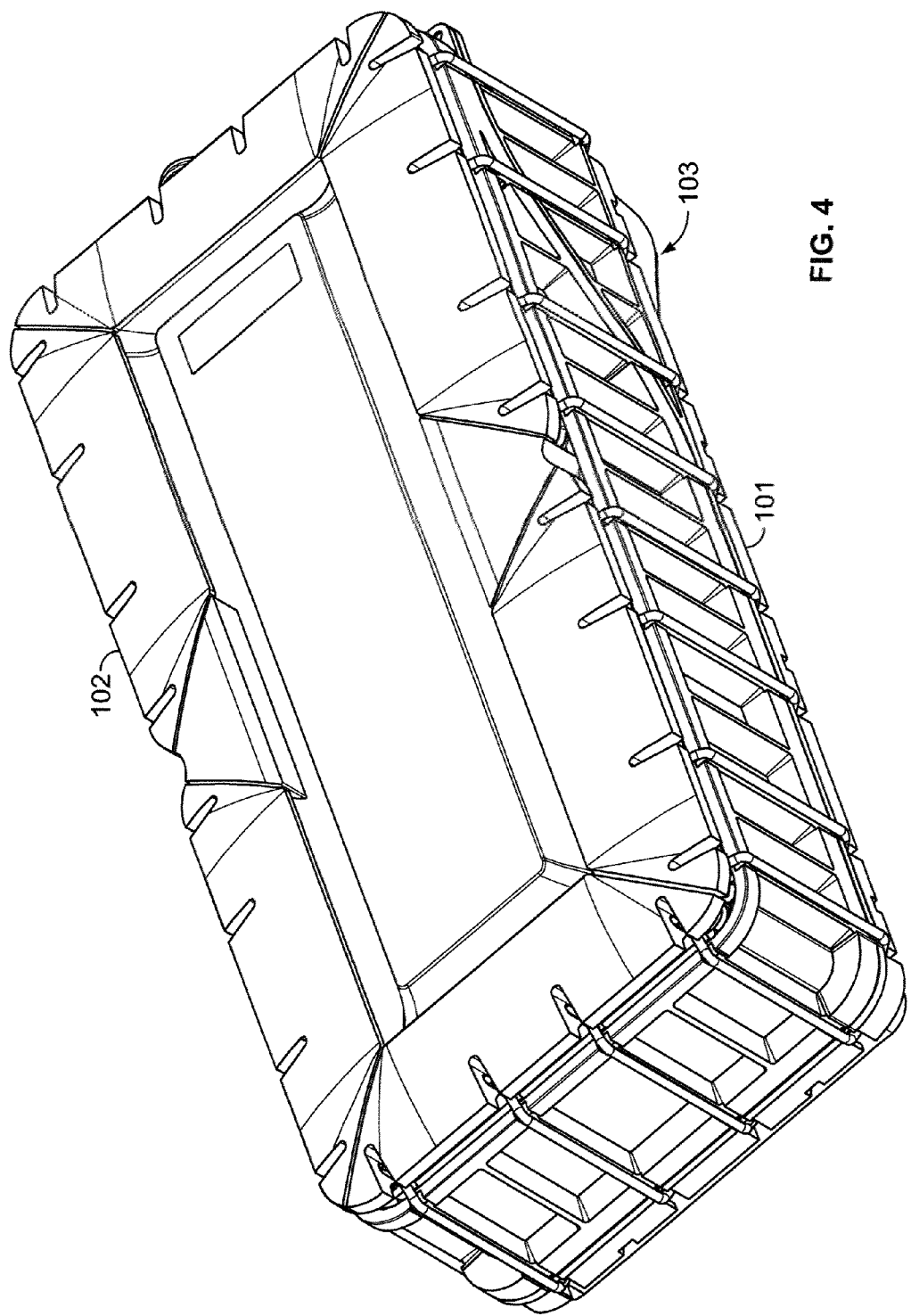
Figure 5:
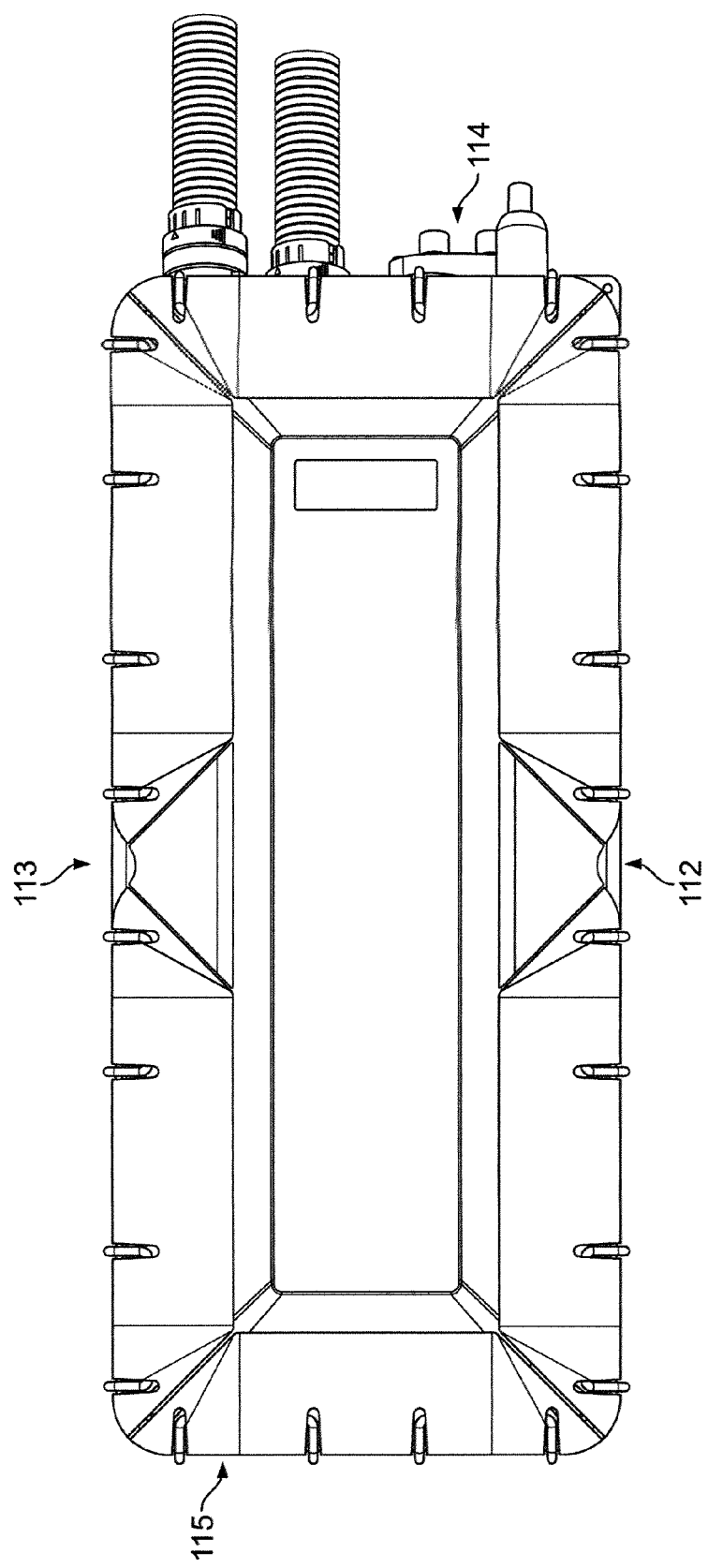
Figure 6:
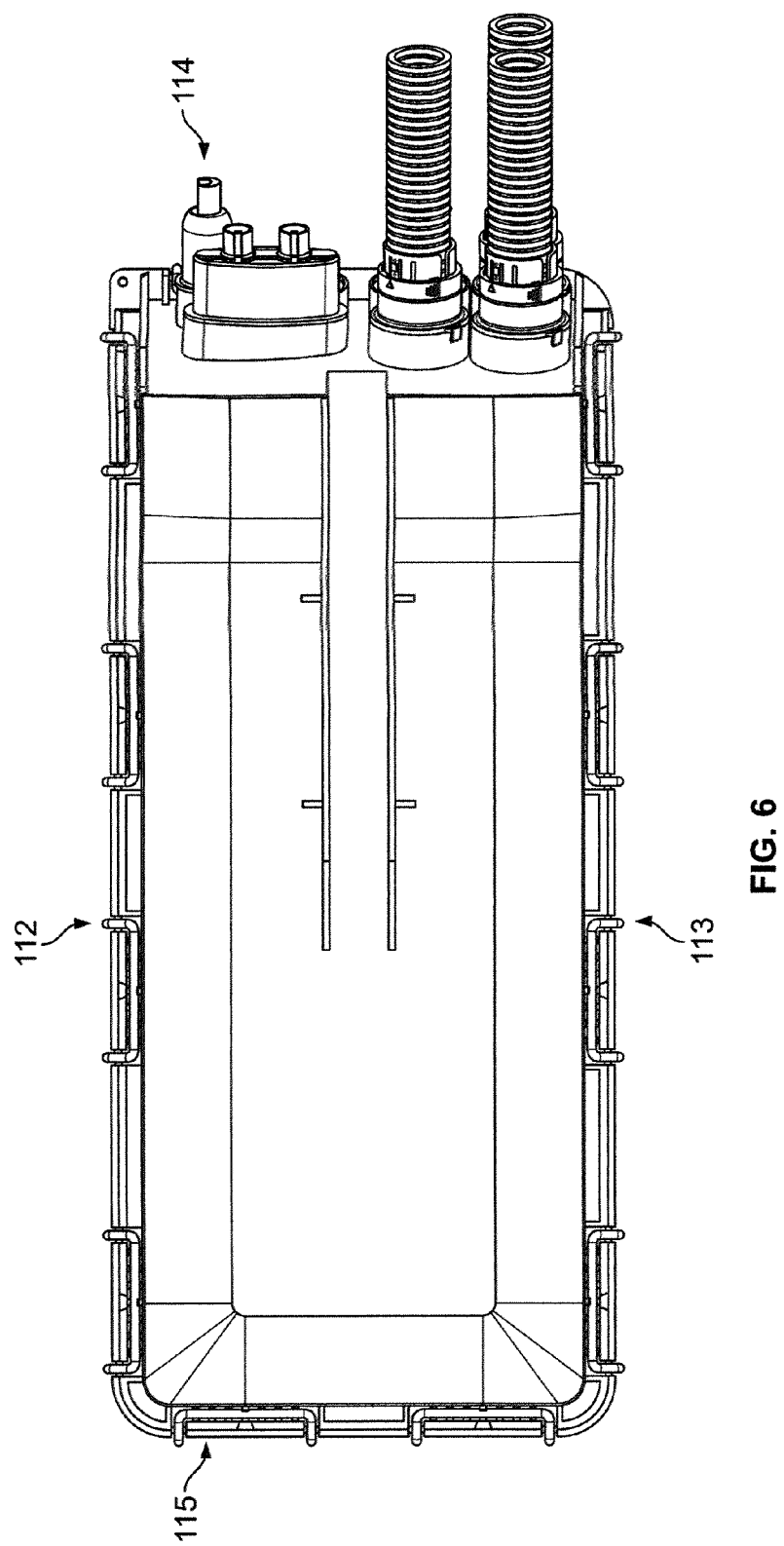

FIGS. 49-53 show a first example port assembly 107 that is suitable for sealing one or more fiber optic cables entering the enclosure through the round input port 145. The first example port assembly 107 includes a body 210 extending between a first end 211 and a second end 212. The port body 210 defines a through passage 213 extending between the first and second ends 211, 212. As shown in FIGS. 2 and 3, the port body 210 is disposed within the cable port 145 defined by the first duct 201 at the first end 114 of the base 101. The first end 211 of the port body 210 extends outwardly from the duct 201 and the second end 212 of the port body 210 extends into the interior 104 of the enclosure 103 from the duct 201. Cables passing through the first example port assembly 107 are routed through a guide member 225 (FIGS. 1 and 11) to the first retention arrangement 187 of the base plate 180 of the splice tray assembly 106.

Figure 51:
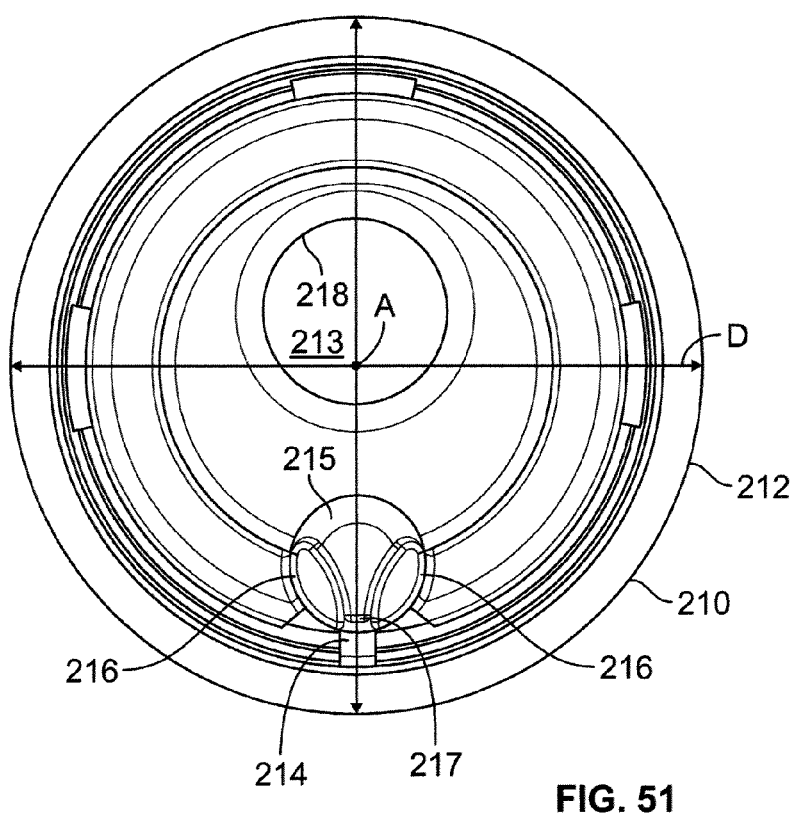
FIG. 51 is an elevational end view of the port assembly of FIG. 49.

An aperture 218 is defined at the first end 211 of the port body 210. Fiber optic cables entering the enclosure 103 are routed through the aperture 218 at the first end 211 of the port body 210, through the passage 213, and out through the second end 212 of the port body 210. As shown in FIG. 51, the aperture 218 is not aligned with a central longitudinal axis A of the port body 210. Rather, the aperture 218 is offset from the central longitudinal axis A. A strength member retaining arrangement 214 is disposed at the second end 212 of the port body 210. The retaining arrangement 214 is offset from the central longitudinal axis A of the port body 210 in a different direction than the aperture 218.

Figures 52, 53:
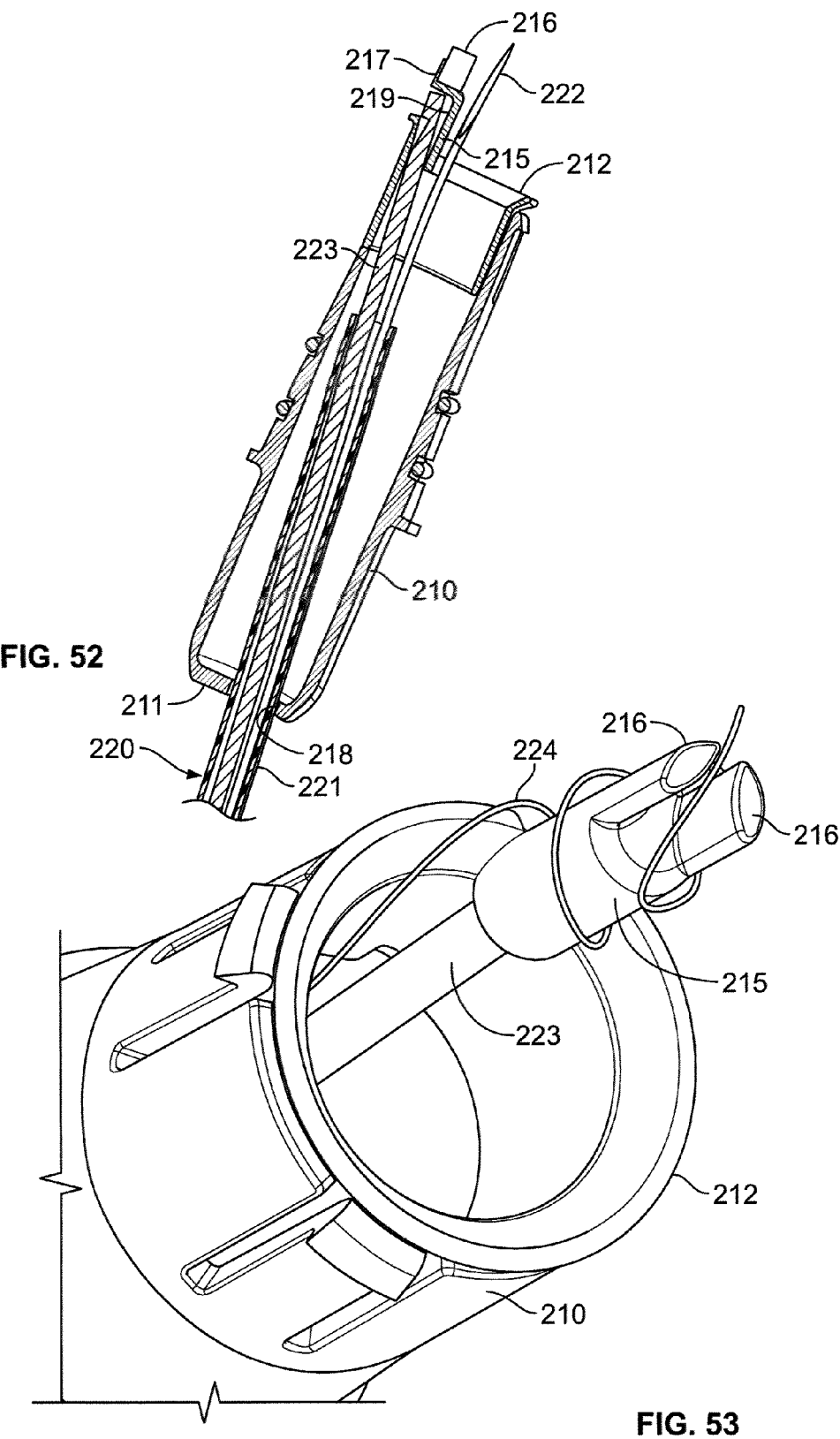
FIG. 52 is a cross-sectional diagram of the port assembly of FIG. 49 showing a cable being secured to the port assembly.
FIG. 53 is an enlarged view of a rear part of the port assembly of FIG. 49 showing a strength member secured to a retention member.
Figure 54:
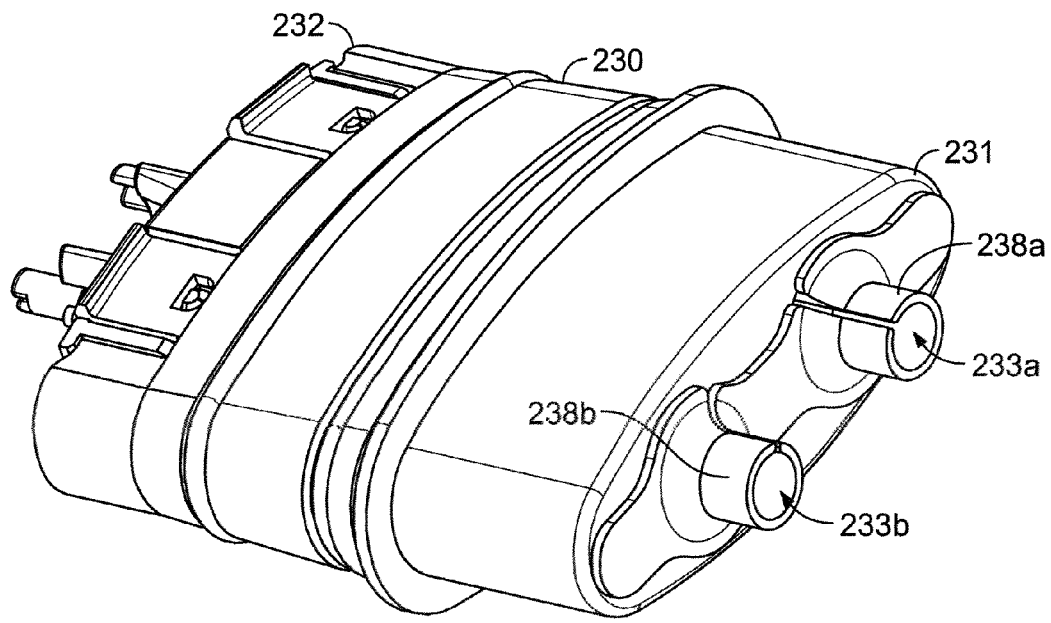
FIGS. 54 and 55 are perspective views of a second type of port assembly suitable for use with the enclosure of FIG. 1.
Figure 55:
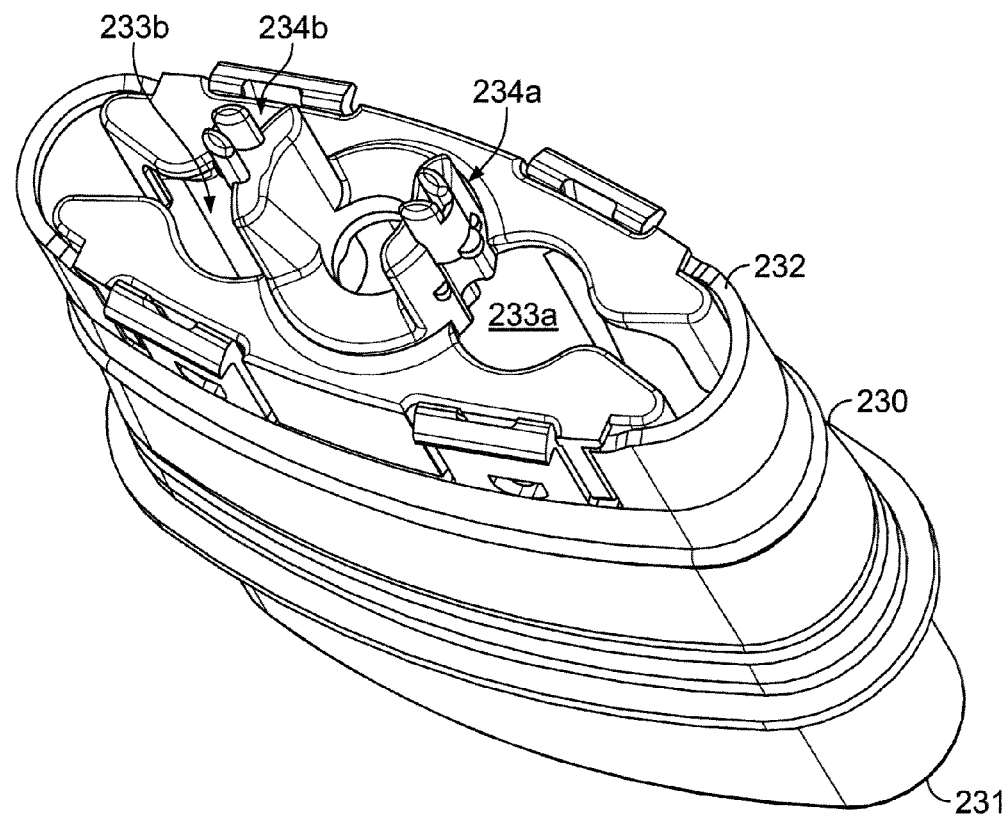

A cable routed through the port body passage 213 extends at an angle from the aperture 218 to the retaining arrangement 214. For example, FIG. 52 shows a fiber optic cable 220 routed through the cable port body 210. The fiber optic cable 220 includes a jacket 221 surrounding one or more optical fibers and a strength member 223. In the example shown, the optical fibers of the fiber optic cable 220 are retained in loose tubes 222. In other implementations, however, the optical fibers may be retained in ribbons or may have not buffer tubes. In certain implementations, the fiber optic cable 220 also includes additional strength members (e.g., aramide yarn) 224.

The strength member retaining arrangement 214 provides structure to which the strength members 223, 224 of the fiber optic cables 220 may be anchored to secure the cable 220 to the first port assembly 107. The retaining arrangement 214 includes a flange 215 that defines a recess 219 in which a central strength member 223 of the cable 220 may be disposed. The strength member 223 may be held in the recess 219 with epoxy or other adhesive. Angling the cable 220 via the offset aperture 218 at the first end 211 of the port body 210 guides the cable towards a side of the second end 212, thereby facilitating gluing the strength member 223 within the recess 219.

The strength member retaining arrangement 214 also includes two teeth 216 that extend outwardly from the flange 215 generally parallel to the longitudinal axis of the port body 210. The teeth 216 are angled to form a narrow channel therebetween. A wall 217 extends across at least part of the channel. For example, in some implementations, the wall 217 extends from the flange 215 to an end of the teeth 216. In other implementations, however, the wall 217 extends over only part of the height of the teeth (see FIG. 50). To secure a cable 220 to the port body 210, the additional strength members 224 of the cable 220 may be wrapped (e.g., one, two, or three times) around the flange 215 and slid between the teeth 216 towards the flange 215 (see FIG. 53).

The wall 217 between the teeth 216 is sufficiently frangible to enable the strength members 224 to cut a slit through the wall 217 so that the strength members 224 are captured in the slit. For example, in one implementation, the wall 217 is significantly thinner than the teeth 216. In some implementations, the wall 217 has a thickness ranging from about 0.25 mm to about 0.7 mm. In certain implementations, the wall 217 has a thickness ranging from about 0.35 mm to about 0.5 mm. In certain implementations, the wall 217 has a thickness of about 0.3 mm. In certain implementations, the wall 217 has a thickness of about 0.4 mm. In certain implementations, the wall 217 has a thickness of about 0.5 mm. In certain implementations, the wall 217 has a thickness of about 0.6 mm.

Figure 56:
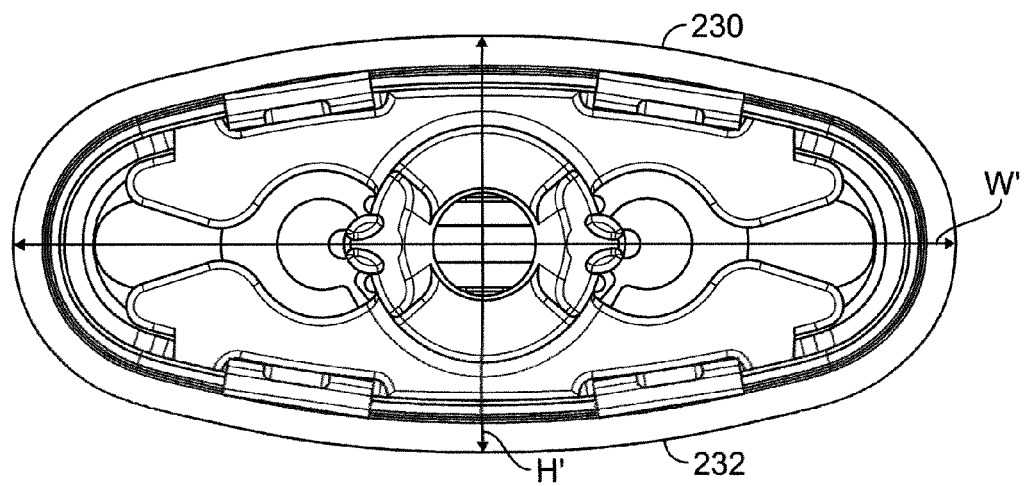
FIG. 56 is an elevational end view of the port assembly of FIG. 55.
Figure 57:
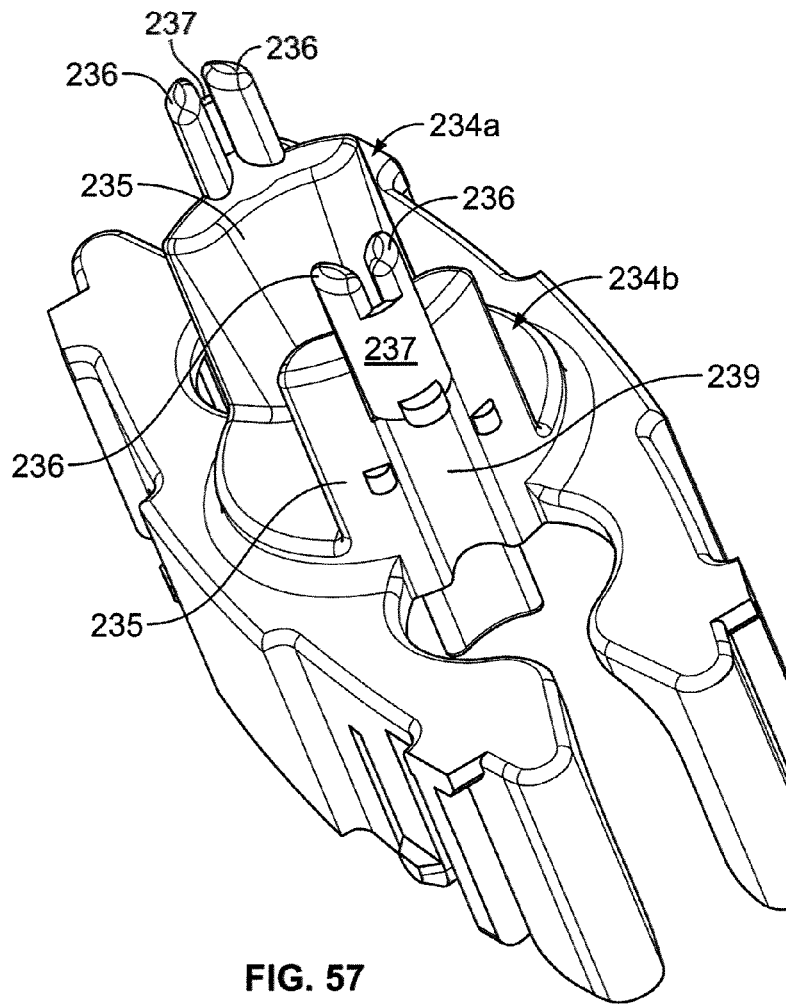
FIG. 57 is a perspective view of a cable retention arrangement suitable for use with the port assembly of FIGS. 54 and 55.
Figure 58:
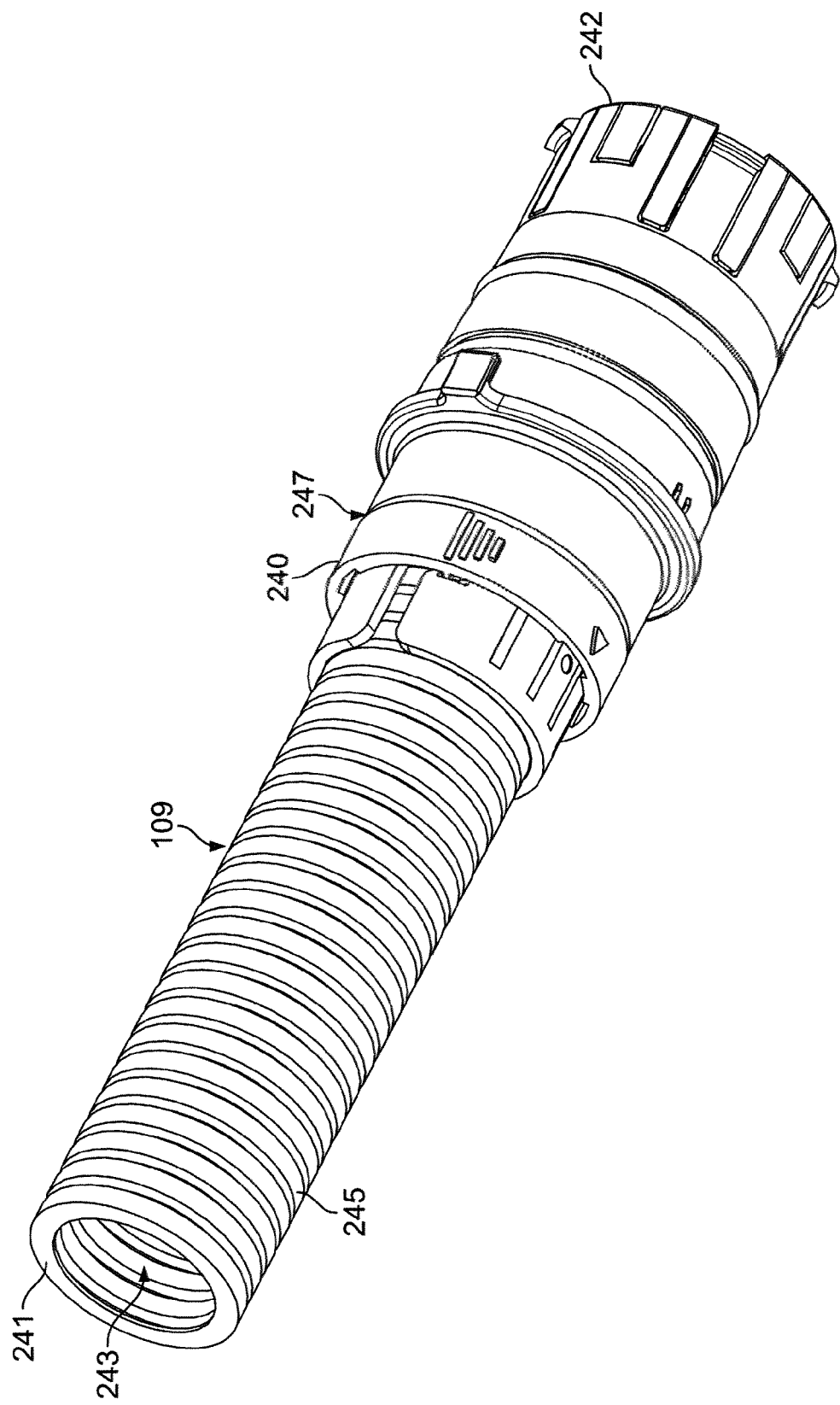
FIGS. 58 and 59 are perspective views of an example third type of port assembly suitable for use with the enclosure of FIG. 1.
Figure 59:
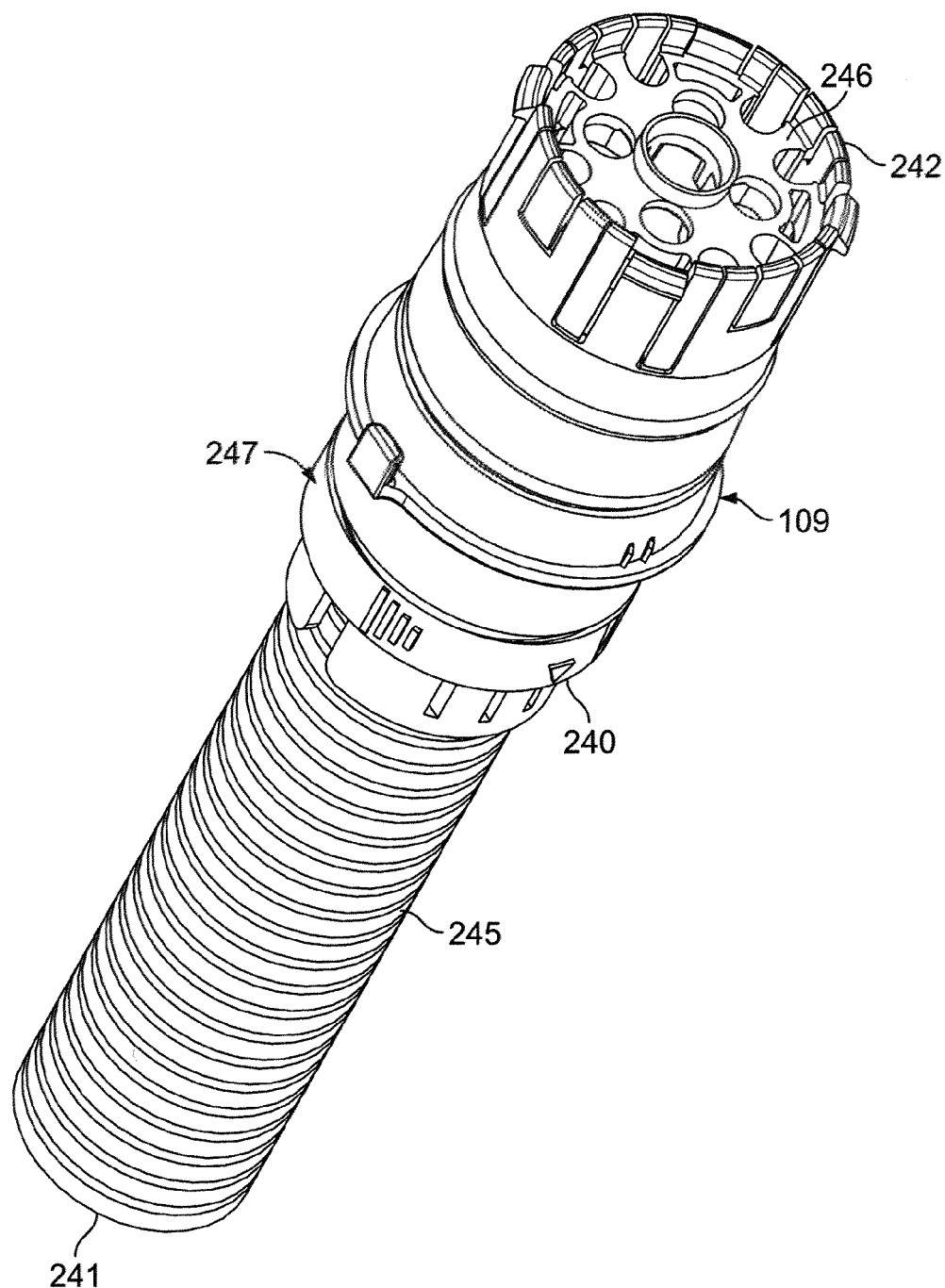

FIGS. 54-57 show a second example port assembly 108 that is suitable for sealing one or more fiber optic cables entering the enclosure through the oblong input port 146. The second example port assembly 108 includes a body 230 extending between a first end 231 and a second end 232. The second port body 230 has a generally oblong shape that is sized and shaped to fit within the second input port 146. A height H' of the second port body 230 is less than a width W' of the second port body 230. In certain implementations, the height H' of the second port body 230 is less than half of the width W' as shown in FIG. 56. In the example shown, two apertures 238a, 238b are disposed at the first end 231 of the second port body 230. Each aperture 238a, 238b leads to a passage 233a, 233b, respectively, that passes through the second port body 230 to the second end 232.

As shown in FIGS. 2 and 3, the second port body 230 is disposed within the cable port 146 defined by the second duct 202 at the first end 114 of the base 101. The first end 231 of the second port body 230 extends outwardly from the duct 202 and the second end 232 of the second port body 230 extends into the interior 104 of the enclosure 103 from the duct 202. Cables passing through the second example port assembly 108 are routed through a guide member 225 (FIGS. 1 and 11) to the first retention arrangement 187 of the base plate 180 of the splice tray assembly 106.

At least one strength member retaining arrangement 234 is disposed at the second end 232 of the second port body 230. In the example shown, first and second retaining arrangements 234a, 234b are disposed at the second end 232. The first retaining arrangement 234a is positioned to be accessible to cables routed through the first passage 233a from the first aperture 218a and the second retaining arrangement 234b is positioned to be accessible to cables routed through the second passage 233b from the second aperture 218b. In the example shown, the retaining arrangements 234a, 234b are positioned at adjacent sides of the passages 233a, 233b.

Each of the strength member retaining arrangements 234a, 234b provides structure to which the strength members of fiber optic cables may be anchored to secure the cables to the second port assembly 108. The retaining arrangement 234a, 234b each includes a flange 235 that defines a recess 239 (FIG. 57) in which a central strength member of a fiber optic cable may be disposed. The strength member may be held in the recess 239 with epoxy or other adhesive.

Each strength member retaining arrangement 234a, 234b also includes two teeth 236 that extend outwardly from the flange 235 generally parallel to the longitudinal axis of the second port body 230. The teeth 236 are angled to form a narrow channel therebetween. A wall 237 extends across at least part of the channel. For example, in some implementations, the wall 237 extends from the flange 235 to an end of the teeth 236. In other implementations, however, the wall 237 extends over only part of the height of the teeth 236 (see FIG. 57).

To secure a cable to the second port body 230, the additional strength members of the cable may be wrapped (e.g., one, two, or three times) around the flange 235 of the corresponding retaining arrangement 234a, 234b and slid between the teeth 236 towards the respective flange 235. The wall 237 between the teeth 236 is sufficiently frangible to enable the strength members to cut a slit through the wall 237 so that the strength members are captured in the slit. For example, in one implementation, the wall 237 is significantly thinner than the teeth 236.

In some implementations, the wall 237 has a thickness ranging from about 0.25 mm to about 0.7 mm. In certain implementations, the wall 237 has a thickness ranging from about 0.35 mm to about 0.5 mm. In certain implementations, the wall 237 has a thickness of about 0.3 mm. In certain implementations, the wall 237 has a thickness of about 0.4 mm. In certain implementations, the wall 237 has a thickness of about 0.5 mm. In certain implementations, the wall 237 has a thickness of about 0.6 mm.

FIGS. 58-61 show one example implementation 240 of a third port assembly 109 that is suitable for sealing one or more fiber optic cables entering the enclosure 103 through one of the output ports 147. As shown in FIGS. 2 and 3, the example third port assembly 240 is disposed within the cable port 147 defined by the third duct 203 at the first end 114 of the base 101. One end of the third port assembly 240 extends outwardly from the duct 203 and the opposite end of the third port assembly 240 extends into the interior 104 of the enclosure 103 from the duct 203. Cables passing through the third example port assembly 240 are routed to the second retention arrangement 288 of the base plate 180 of the splice tray assembly 106.

The third port assembly 240 includes a body 241 having a first end and a second end. The first end of the body 241 is configured to extend over a first end of a corrugated conduit 242. In certain implementations, the corrugated conduit 242 is flexible and/or may limit the maximum bend radius of the optical fibers passing through the third port assembly 109. A first manager 243 is disposed at the second end of the body 241. The first manager 243 defines a plurality of apertures through which tubes of optical fibers are routed to organize the tubes exiting the third port assembly 240. A second manager 244 is disposed at the first end of the corrugated conduit 242 towards the first end of the body 241.

The third port assembly 240 receives tubes (e.g., loose fiber tubes and/or blown fiber tubes) for receipt of fibers during a fiber installation process. The body 241 of the third port assembly 240 defines a chamber for receiving resin between the first and second managers 243, 244. In certain implementations, the first tube manager 243 defines a center passage (FIG. 59) for receipt of the poured resin. The resin seals around the tubes when it hardens to hold the tubes in place within the body 241. The hardened resin also inhibits disassembly of the third port assembly 240.

Figure 60:
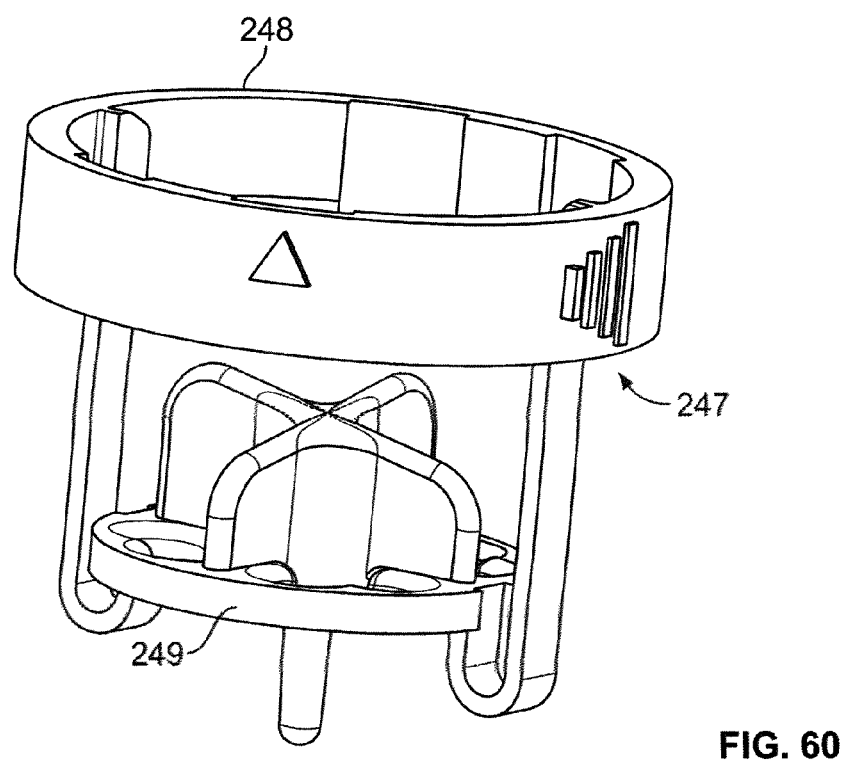
FIGS. 60 and 61 are perspective views of an example manager suitable for use with the third type of port assembly shown in FIGS. 58 and 59.
Figure 61:
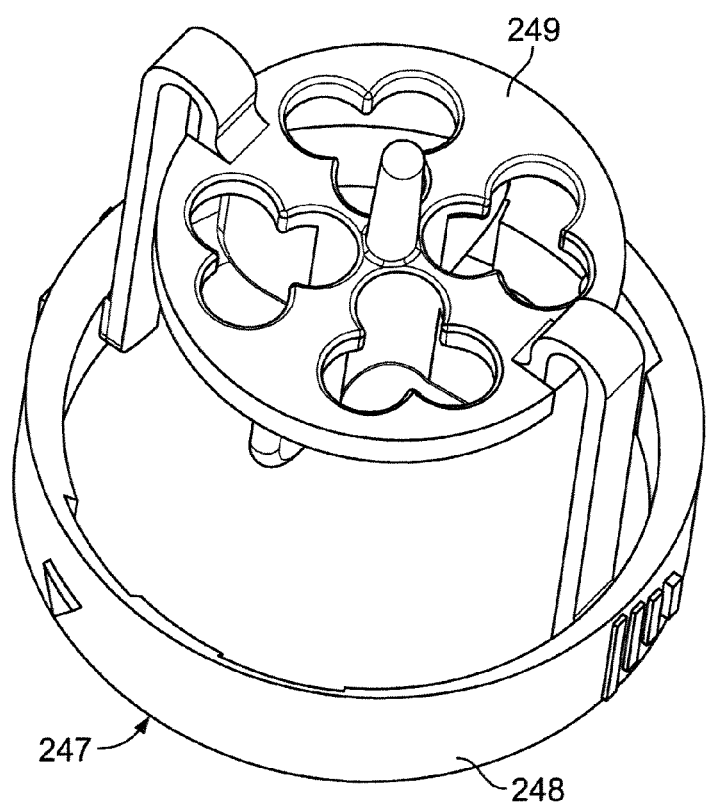

As shown in FIGS. 60 and 61, the second manager 244 is configured to organize the tubes extending through the conduit 242 to the body 241. The second manager 244 includes a cross-piece 246 spaced from a ring 245. Arms 247 extend between the ring 245 and the cross-piece 246. In the example shown, two arms 247 are disposed on opposite sides of the circumference of the ring 245. In certain implementations, the arms 247 extend from the ring 245, past the cross-piece 246, and loop back to the cross-piece 246.

The ring 245 fits around the second end of the body 241 and around the conduit 242 to secure the body 241 to the conduit 242. The cross-piece 246 defines apertures 248 through which the loose tubes may be routed to guide the tubes through the third port assembly 240. In the example shown, the apertures 248 are clover shaped so that three loose tubes fit within each aperture 248. A guide arrangement 249 extends from the cross-piece 246 towards the ring 245. A center post extends from the cross-piece 246 away from the ring 245.

To assemble the third port assembly 240, fiber tubes are routed through the conduit 242. The second manager 244 is disposed so that the cross-piece 246 is laid across one end of the conduit 242 with the guide arrangement 249 extending into the conduit 242. For example, the end of the conduit 242 may seat in the looped-back portion of the arms 247 of the second manager 244. The tubes are routed through the apertures 248 in the cross-piece 246. The ring 245 is disposed around the conduit 242. The body 241 is slid over the tubes until one end of the body 241 slides between the ring 245 and the conduit 242. The body 241 is rotated relative to the ring 245 to lock the example third port assembly 240 together.

Figure 62:
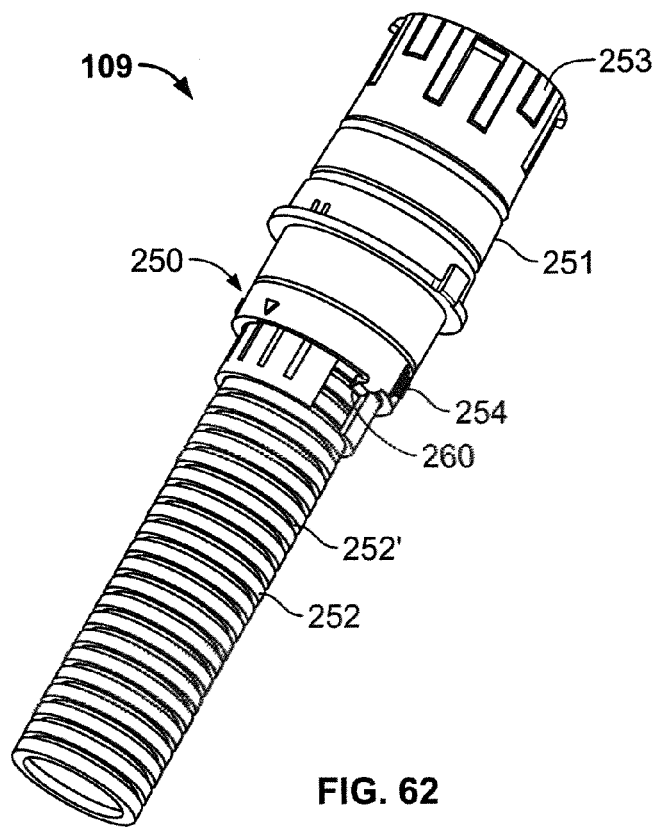
FIG. 62 is a perspective view of another example third type of port assembly suitable for use with the enclosure of FIG. 1.

FIGS. 62-3 show an alternative implementation 250 of an example third port assembly 109 that is suitable for use with the enclosures 103 described herein. The example third port assembly 250 also includes a body 251 having a first end that is configured to extend over a first end of a corrugated conduit 252. In certain implementations, the corrugated conduit 252 is flexible and/or may limit the maximum bend radius of the optical fibers passing through the third port assembly 250. A first manager 253 is disposed at a second end of the body 251. The first manager 253 defines a plurality of apertures through which tubes of optical fibers are routed to organize the tubes exiting the third port assembly 250. A second manager 254 is disposed at the first end of the corrugated conduit 252 towards the first end of the body 251.

Figure 63:
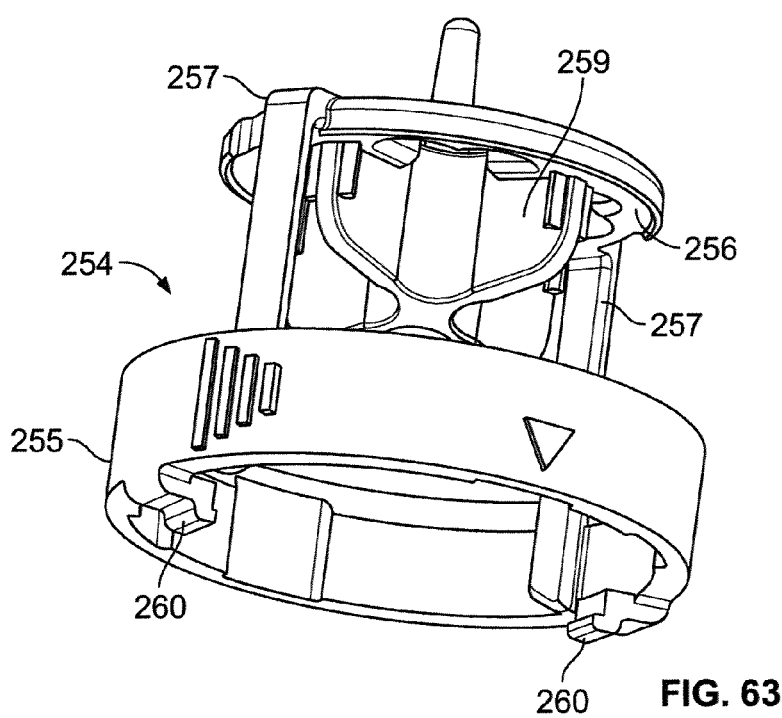
FIG. 63 is a perspective view of another example manager suitable for use with the third types of port assemblies shown in FIGS. 58, 59, and 62.

As shown in FIG. 63, the second manager 254 is configured to organize the tubes extending through the conduit 252 to the body 251. The second manager 254 includes a cross-piece 256 spaced from a ring 255. Arms 257 extend between the ring 255 and the cross-piece 256. In the example shown, two arms 257 are disposed on opposite sides of the circumference of the ring 255. In certain implementations, the arms 257 extend from the ring 255 to the cross-piece 256 without extending past the cross-piece 256.

The ring 255 is sized to fit around the second end of the body 251 and around the conduit 252 to secure the body 251 to the conduit 252. Feet 260 protrude inwardly from the ring 255 to provide detents (FIG. 63) that are sized to fit within the slots 252' (FIG. 62) of the corrugated conduit 252. The cross-piece 256 defines apertures 258 through which the loose tubes may be routed to guide the tubes through the third port assembly 250. In one example implementation, the apertures 258 are clover shaped so that three loose tubes fit within each aperture 258. A guide arrangement 259 extends from the cross-piece 256 towards the ring 255. A center post extends from the cross-piece 256 away from the ring 255.

To assemble the third port assembly 250, fiber tubes are routed through the conduit 252. The second manager 254 is disposed so that the cross-piece 256 is laid across one end of the conduit 252 with the guide arrangement 259 extending into the conduit 252. The feet 260 prevent or reduce resin leakage during assembly before curing. In certain implementations, the feet 260 of the second manager 254 lock with the slots 252' defined in the exterior surface of the corrugated conduit 252 to restrain the second manager 254 from moving relative to the conduit 252 in an axial direction during assembly. The tubes are routed through the apertures 258 in the cross-piece 256 of the second manager 254. The body 251 of the third port assembly 250 is slid over the tubes until one end of the body 251 slides between the ring 255 and the conduit 252. The body 251 is rotated relative to the ring 255 to lock the example third port assembly 250 together.

Additional information pertaining to example implementations of the third example port assembly 109 is provided in Exhibit B, which is attached to the end of this disclosure. The disclosure of Exhibit B is hereby incorporated herein by reference in its entirety.

LIST OF REFERENCE NUMERALS AND CORRESPONDING FEATURES 100 splice enclosure assembly
101 base
102 cover
103 enclosure
104 interior
105 latch arrangement
106 splice tray assembly
107 first input cable port assembly
108 second input cable port assembly
109 output cable port assembly
110 top
111 bottom
112 first side
113 second side
114 first end
115 second end
116 gasket
117 gasket channel
118 tongue
119 tabs
120 first section
121 second section 122 transitional section
123 clip member
124 abutment section
124A concave section
124B convex surface
125 grip section
126 notches
127 tensioning member
128 legs
129 first end
130 top surface
131 central raised surface
132 inner channel
133 raised outer surface
134 outer channel
135 outer lip
136 vertical notches
137 raised structures
138 sidewalls
139 vertical recesses
141 recess
142 bottom surface
143 rear wall
144 sidewalls
145 round input port
146 oblong input port
147 output ports
150 splice trays
150A first splice tray
150N another splice tray
151 splice area
152 first entrance
153 recessed channel
154 second entrance
155 retaining fingers
156 second routing channel
157 first routing channel
158 spool
159 contoured edge
160 groove plates
161 base
162 walls
163 latching tabs
164 shoulders
165 tube routing guides
166 fiber routing guides
167 splice tray mounting structures
168 shorter curved flange
169 taller curved flange
170 cavity
171 splitter mounting area
172 input aperture
173 output apertures
174 ramps
175 retaining arrangement
176 bend radius limiters
177 first routing path
178 second routing path
180 base plate
181 bottom surface
182 side walls
183 apertures
184 tabs
185 latch
186 rest
187 first retention arrangement
188 second retention arrangement
189 splice tray mounting structures
190 cushioning strip
192 optical splitter
193 splitter input fiber
194 splitter output fibers
195 loose tube
200 ducts
201 first duct
202 second duct
203 output ducts
209 tear-off sealing member
210 body
211 first end
212 second end
213 through passage
214 strength member retaining arrangement
215 flange
216 teeth
217 wall
218 aperture
219 recess
220 fiber optic cable
221 jacket
223 strength member
224 additional strength members
225 guide member
230 body
231 first end
232 second end
233a, 233b passages
234 strength member retaining arrangement
234a first retaining arrangement
234b second retaining arrangement
235 flange
236 teeth
237 wall
238a, 238b apertures
239 recess
240 third port assembly
241 body
242 corrugated conduit
243 first manager
244 second manager
245 ring
246 cross-piece
247 arms
248 aperture
249 guide arrangement
250 alternative third port assembly
251 body
252 corrugated conduit
252' slots
253 first manager
254 second manager
255 ring
256 cross-piece
257 arms
258 aperture
259 guide arrangement
260 feet
A central longitudinal axis

The invention claimed is:

1. A telecommunications apparatus comprising:
an enclosure defining a plurality of cable ports bounded by cable port walls;
a first portion of each cable port wall being disposed inside the enclosure;

a second portion of each cable port wall being disposed outside of the enclosure; and a port assembly including a body defining a passage extending between opposite first and second ends, the body being disposed within the cable port wall of a first of the cable ports so that the first end of the body extends into the enclosure from the first portion of the cable port wall and the second end of the body extends external of the enclosure from the second portion of the cable port wall, the body being configured to seal one or more fiber optic cables entering the enclosure through the first cable port.

2. The telecommunications apparatus of claim 1, wherein at least one of the cable port walls defines an oblong shape.

3. The telecommunications apparatus of claim 1, wherein the first portion of each cable port wall includes half of the cable port wall and wherein the second portion of each cable port wall includes half of the cable port wall.

4. The telecommunications apparatus of claim 1, wherein the port assembly also includes:
a post about which a strength member of the one or more fiber optic cables can be wrapped, and
a structure defining a retention slit for receiving the strength member to anchor the one or more fiber optic cables to the enclosure, the retention slit frictionally retaining the strength member to prevent the strength member from unwrapping from the post.

5. The telecommunications apparatus of claim 4, wherein the body defines multiple openings for receiving telecommunications cables, and wherein the port assembly includes multiple posts for securing strength members of the one or more fiber optic cables to anchor the one or more fiber optic cables to the enclosure.

6. The telecommunications apparatus of claim 4, wherein the structure can be cut by the strength member to form the retention slit.

7. The telecommunications apparatus of claim 1, further comprising a fiber management device disposed within the enclosure, the fiber management device including:
a base having a front side and a back side;
a plurality of fiber management trays pivotally mounted at the front side of the base; and
an optical splitter mounted at the back side of the base, the optical splitter having first and second sets of output fibers that are looped about 180 degrees in opposite directions about a bend radius limiter before being passed through one or more output apertures of the base to the fiber management trays at the front side of the base.

8. The telecommunications apparatus of claim 7, wherein the base has an input aperture through which a splitter input fiber can be routed, and wherein the output apertures are disposed in a row extending between opposite ends of the base, each output aperture being elongated in a direction extending between opposite sides of the base.

9. The telecommunications apparatus of claim 8, wherein one or more bend radius limiters are positioned to provide a first routing path and a second routing path, the first routing path extends from the splitter, along the first end of the base, past the row of output apertures, around a bend radius limiter towards the second end of the base, and towards the output apertures, the second routing path extends from the splitter, towards the second end of the base, along the second end past the row of output apertures, around a bend radius limiter towards the first end of the base, and towards the output apertures.

10. The telecommunications apparatus of claim 9, wherein splitter output fibers routed to the output apertures located at the second end of the base follow the first routing path and splitter output fibers routed to the output apertures located at the first end of the base follow the second routing path.

11. The telecommunications apparatus of claim 8, wherein a retaining arrangement is disposed at each output aperture, each retaining arrangement defines a slit aligned with the output aperture that guides a respective splitter output fiber through the aperture and onto the top surface of the base.

12. The telecommunications apparatus of claim 1, further comprising a fiber management tray including:
a tray body defining a first optical fiber entrance/exit location and a second optical fiber entrance/exit location, the tray body also defining a plurality of fiber storage loop paths and a splice holder location,
the tray body further including a crossing location on a top side of the tray body for crossing a fiber receiving tube routed onto the tray body through the first optical fiber entrance/exit location and an optical fiber routed onto the tray body through the second optical fiber entrance/exit location, the crossing location including a first surface for supporting the fiber receiving tube and a second surface for supporting the optical fiber, the second surface being recessed relative to the first surface.

13. The telecommunications apparatus of claim 12, wherein the second surface is defined at a bottom of a groove defined at the top side of the tray body, and wherein the cable receiving tube crosses over the groove at the crossing location.

14. The telecommunications apparatus of claim 1, wherein the cable port assembly defines a central axis and a single cable receiving opening, the cable receiving opening having a center that is offset from the central axis.

15. The telecommunications apparatus of claim 14, wherein the cable port assembly includes a cable anchor location for securing a strength member of a fiber optic cable routed through the cable receiving opening, the cable anchor location and the center of the cable receiving opening being on opposite sides of the central axis of the cable port assembly.

16. The telecommunications apparatus of claim 1, further comprising:
a plurality of fiber management trays pivotally mounted within the enclosure, the enclosure including a first housing piece and a second housing piece; and
a resilient member mounted to the first housing piece, the resilient member pressing against the fiber management trays when the first and second housing pieces are secured together so as to resist pivotal movement of the fiber management trays when the enclosure is closed.

17. The telecommunications apparatus of claim 16, wherein the resilient member is foam or has foam-like characteristics.

18. The telecommunications apparatus of claim 16, wherein the fiber management trays include pivot ends positioned opposite from free ends, wherein pivot axes of the fiber management trays are located at the pivot ends, and wherein the resilient member is pressed against the free ends.

19. The telecommunications apparatus of claim 1, wherein the cable port assembly includes an insert adapted for insertion in the cable port, the insert including:

a corrugated conduit for receiving a plurality of fiber tubes;

a body having a first end and a second end, the first end of the body being sized to fit around the conduit;

a first manager coupled to the second end of the body, the first manager defining apertures through which the fiber tubes can be routed out of the insert; and a second manager configured to couple together the body and the corrugated conduit, the second manager including a cross-section defining apertures through which the fiber tubes can be routed, the second manager also including inwardly extending feet having detents that fit within slots defined in the corrugated conduit.

20. A telecommunications apparatus comprising:

an enclosure defining a plurality of cable ports bounded by cable port walls;

a first portion of each cable port wall being disposed inside the enclosure;

a second portion of each cable port wall being disposed outside of the enclosure;

a fiber management device disposed within the enclosure, the fiber management device including:
  a base having a front side and a back side;
  a plurality of fiber management trays pivotally mounted at the front side of the base; and
  an optical splitter mounted at the back side of the base, the optical splitter having first and second sets of output fibers that are looped about 180 degrees in opposite directions about a bend radius limiter before being passed through one or more output apertures of the base to the fiber management trays at the front side of the base.

21. A telecommunications apparatus comprising:

an enclosure defining a plurality of cable ports bounded by cable port walls;

a first portion of each cable port wall being disposed inside the enclosure;

a second portion of each cable port wall being disposed outside of the enclosure;

a fiber management tray including:
  a tray body defining a first optical fiber entrance/exit location and a second optical fiber entrance/exit location, the tray body also defining a plurality of fiber storage loop paths and a splice holder location,
  the tray body further including a crossing location on a top side of the tray body for crossing a fiber receiving tube routed onto the tray body through the first optical fiber entrance/exit location and an optical fiber routed onto the tray body through the second optical fiber entrance/exit location, the crossing location including a first surface for supporting the fiber receiving tube and a second surface for supporting the optical fiber, the second surface being recessed relative to the first surface.

22. A telecommunications apparatus comprising:

an enclosure defining a plurality of cable ports bounded by cable port walls;

a first portion of each cable port wall being disposed inside the enclosure;

a second portion of each cable port wall being disposed outside of the enclosure;

an insert adapted for insertion in the cable port, the insert including:
  a corrugated conduit for receiving a plurality of fiber tubes;
  a body having a first end and a second end, the first end of the body being sized to fit around the conduit;
  a first manager coupled to the second end of the body, the first manager defining apertures through which the fiber tubes can be routed out of the insert; and
  a second manager configured to couple together the body and the corrugated conduit, the second manager including a cross-section defining apertures through which the fiber tubes can be routed, the second manager also including inwardly extending feet having detents that fit within slots defined in the corrugated conduit.

* * * * *